(12) United States Patent
Zhang et al.

(10) Patent No.: US 9,244,976 B1
(45) Date of Patent: Jan. 26, 2016

(54) JUST-IN-TIME ANALYTICS ON LARGE FILE SYSTEMS AND HIDDEN DATABASES

(75) Inventors: Nan Zhang, Fairfax, VA (US); Gautam Das, Irving, TX (US)

(73) Assignees: The George Washington University and Board of Regents, Washington, DC (US); The University of Texas System, Austin, TX (US)

( * ) Notice: Subject to any disclaimer, the term of this patent is extended or adjusted under 35 U.S.C. 154(b) by 691 days.

(21) Appl. No.: 13/402,764

(22) Filed: Feb. 22, 2012

Related U.S. Application Data

(63) Continuation-in-part of application No. 13/328,810, filed on Dec. 16, 2011.

(60) Provisional application No. 61/445,272, filed on Feb. 22, 2011, provisional application No. 61/423,939, filed on Dec. 16, 2010.

(51) Int. Cl.
   *G06F 17/30* (2006.01)

(52) U.S. Cl.
   CPC ............... *G06F 17/30442* (2013.01)

(58) Field of Classification Search
   CPC .............................................. G06F 17/30442
   USPC ......................................................... 707/769
   See application file for complete search history.

(56) References Cited

U.S. PATENT DOCUMENTS

| | | | |
|---|---|---|---|
| 6,947,934 B1 | 9/2005 | Chen et al. | |
| 7,136,851 B2 * | 11/2006 | Ma et al. | 707/770 |
| 7,185,011 B1 | 2/2007 | Dujari | |
| 7,730,060 B2 | 6/2010 | Chakrabarti et al. | |
| 7,761,528 B2 | 7/2010 | Shen et al. | |
| 7,801,913 B2 * | 9/2010 | Shrivastava et al. | 707/779 |
| 7,890,491 B1 * | 2/2011 | Simmen | 707/713 |
| 7,921,106 B2 | 4/2011 | Chen et al. | |
| 7,990,982 B2 | 8/2011 | Duffield et al. | |
| 8,094,585 B2 | 1/2012 | Liang et al. | |
| 8,234,297 B2 * | 7/2012 | He | 707/770 |
| 8,285,760 B1 | 10/2012 | Sina | |

(Continued)

OTHER PUBLICATIONS

Kevin Chen-Chuan Chang et al., "Structured Databases on the Web: Observations and Implications", Sep. 2004, SIGMOD Record, vol. 33, No. 3, pp. 61-70.*

(Continued)

*Primary Examiner* — Scott A Waldron
(74) *Attorney, Agent, or Firm* — Blank Rome LLP

(57) ABSTRACT

A just-in-time sampling-based system can, after consuming a small number of disk accesses or queries, produce extremely accurate answers for a broad class of aggregate and top-k queries over a file system or database without the requirement of prior knowledge. The system is efficient, accurate, and scalable. The system performs aggregate estimations of a hidden database through its web interface by employing techniques that use a small number of queries to produce unbiased estimates with small variance. It conducts domain discovery over a hidden database through its web interface by employing techniques which provide effective guarantees on the effectiveness of domain discovery. Systems and methods enhance forms used by mobile devices to access hidden databases. It employs data analytics to improve the usage of form fields, including providing context-sensitive auto-completion suggestions, highlighting selections in drop-down boxes and eliminating suggestions in drop-down boxes.

23 Claims, 42 Drawing Sheets

(56) References Cited

U.S. PATENT DOCUMENTS

| | | | |
|---|---|---|---|
| 2002/0032696 | A1 | 3/2002 | Takiguchi et al. |
| 2004/0111410 | A1* | 6/2004 | Burgoon et al. ............... 707/4 |
| 2004/0193594 | A1 | 9/2004 | Moore et al. |
| 2004/0249810 | A1* | 12/2004 | Das et al. ..................... 707/5 |
| 2004/0267793 | A1 | 12/2004 | Sato |
| 2005/0143059 | A1 | 6/2005 | Imura |
| 2006/0184572 | A1 | 8/2006 | Meek et al. |
| 2006/0212429 | A1 | 9/2006 | Bruno et al. |
| 2007/0226265 | A1 | 9/2007 | Nichols et al. |
| 2007/0260613 | A1 | 11/2007 | Ippili et al. |
| 2008/0109428 | A1 | 5/2008 | Suciu et al. |
| 2008/0195577 | A1* | 8/2008 | Fan et al. ..................... 707/2 |
| 2009/0063570 | A1 | 3/2009 | Nichols et al. |
| 2009/0240682 | A1 | 9/2009 | Balmin et al. |
| 2010/0077147 | A1 | 3/2010 | Liu |
| 2010/0132022 | A1 | 5/2010 | Venkatasubramanian |
| 2010/0142794 | A1 | 6/2010 | Gardi et al. |
| 2010/0169360 | A1 | 7/2010 | Cohen et al. |
| 2010/0287512 | A1 | 11/2010 | Gan et al. |
| 2010/0290617 | A1 | 11/2010 | Nath |
| 2010/0332520 | A1 | 12/2010 | Lu et al. |
| 2012/0130960 | A1* | 5/2012 | Nerger ...................... 707/690 |
| 2012/0137081 | A1 | 5/2012 | Shea |
| 2012/0197868 | A1* | 8/2012 | Fauser et al. ................ 707/714 |

OTHER PUBLICATIONS

Ping Wu et al., "Query Selection Techniques for Efficient Crawling of Structured Web Sources", 2006, IEEE ICDE '06, 10 pages.*

Andrei Broder et al., "Estimating Corpus Size via Queries", Nov. 2006, ACM CIKM '06, pp. 594-603.*

N. Agrawal et al., "Generating Realistic Impressions for File-System Benchmarking," ACM Transactions on Storage (TOS), 2009, pp. 1-14.

N. Agrawal et al., "A Five-Year Study of File-System Metadata," Proceedings of the 5th USENIX Conference on File and Storage Technologies, 2007, pp. 1-15.

S. Ames et al., "Design and Implementation of a Metadata-Rich File System," Tech. Rep. UCSC-SOE-10-07, Univ. of California, Santa Cruz and Lawrence Livermore National Laboratory, 2010, pp. 1-14.

D. Barbara et al., "The New Jerey Data Reduction Report," IEEE, 1997, pp. 1-43.

M. Kozak, "Survey Sampling: On Sample Allocation in Multivariate Surveys," 2006, Communications in Statistics—Simulation and Computation, 35:4, pp. 901-910.

S. Brandt et al., "Fusing Data management Services with File System," Proceedings of the 4th Annual Workshop on Petascale Data Storage (PDSW '09), New York, NY, USA, Nov. 15, 2009, ACM, pp. 1-5.

J. Callan, "Query-Based Sampling of Text Databases," ACM Transactions on Information Systems, Apr. 2001, pp. 97-130, vol. 19, No. 2.

B. D. Causey, "Computational Aspects of Optimal Allocation in Multivariate Stratified Sampling," Society for Industrial and Applied Mathematics, J. Sci. Stat. Comput., Jun. 1983, vol. 4, No. 2, pp. 322-329.

S. Chaudhuri et al., "Optimized Stratified Sampling for Approximate Query Processing," ACM Transactions on Database Systems, Jun. 2007, vol. 32, No. 2, Article 9, pp. 1-50.

S. Chaudhuri et al., "Effective Use of Block-Level Sampling in Statistics Estimation," Microsoft Research, Jun. 2004, 12 pages.

J. R. Chromy, "Design Optimization with Multiple Objectives," Proceedings on the Research Methods of the American Statistical Association,1987, pp. 194-199.

D. McCULLAGH, "Security Guide to Customs-Proofing Your Laptop," Politics and Law—CNET New, Mar. 2008, 5 pages, www.news.cnet.com/8301-13578_3-9892897-38.html.

G. Das, "Survey of Approximate Query Processing Techniques," International Conference on Scientific and Statistical Database Management (SSDBM '03), 2003, 16 pages.

A. Dasgupta et al., "A Random Walk Approach to Sampling Hidden Databases," Proceedings of the 2007 ACM SIGMOD international conference on Management of data (SIGMOD '07), Jun. 2007, pp. 629-640.

A. Dasgupta et al., Unbiased Estimation of Size and Other Aggregates Over Hidden Web Databases, Proceedings of the 2010 international conference on Management of data (SIGMOD), Jun. 2010, pp. 855-866.

A. Dasgupta et al., Leveraging Count Information in Sampling Hidden Databases, Proceedings of the 2009 IEEE International Conference on Data Engineering, 2009, 12 pages.

A. Dasgupta et al., "Privacy Preservation of Aggregates in Hidden Databases: Why and How?," Proceedings of the 35th SIGMOD international conference on Management of data, Jun. 29-Jul. 2, 2009, pp. 153-164.

D. Ellard et al., "Passive NFS Tracing of Email and Research Workloads," Proceedings of the 2nd USENIX Conference on File and Storage Technologies (FAST '03), Berkeley, CA, USENIX Association, 2003, 14 pages.

M. Garofalakis et al., "Approximate Query Processing: Taming the Terabytes!," Information Sciences Research Center, Bell Laboratories, Proceedings of the 27th International Conference on Very Large Data Bases (VLDB), 2001, pp. 169-212.

Y. L. Hedley et al., A Two-Phase Sampling Technique for Information Extraction from Hidden Web Databases, Proceedings of the 6th annual ACM international workshop on Web information and data management (WIDM '04), Nov. 2004, pp. 1-8.

Y. L. Hedley et al., "Sampling, Information Extraction and Summarisation of Hidden Web Databases," Data and Knowledge Engineering, 2006, 33 pages.

Y. Hua et al., "SmartStore: A New Metadata Organizationi Paradigm with Metadata Semantic-Awareness for Next Generation File Systems," CSE Techinical Reports, 2008, paper 65, 12 pages, http://digitalcommons.unl.edu/csetechreports/65.

H. H. Huang et al., "Just-In-Time Analytics on Large File Systems," Proceedings of the 9th USENIX conference on File and storage technologies, USENIX Association, 2011, pp. 1-14.

L. Huston et al., Diamond: A Storage Architecture for Early Discard in Interactive Search, Proceeding of the $3^{rd}$ USENIX Conference on File and Storage Techonologies, San Francisco, CA, Mar. 2004, 14 pages.

I. F. Ilyas et al., "A Survey of Top-k Query Processing Techniques in Relational Database Systems," University of Waterloo, ACM Computing Surveys, Oct. 2008, vol. 40, No. 4, article 11, 59 pages, http://doi.acm.org/10.1145/1391729.1391730.

P. G. Ipeirotis et al., "Distributed Search over the Hidden Web: Hierarchical Database Sampling and Selection," Colubmia University, Proceedings of the $28^{th}$ VLDB Conference, Hong Kong, China, 2002, 12 pages, http://www.cancer.gov/search/cancer_literature/.

P. Kogge et al., "ExaScale Computing Study: Technology Challenges in Achieving ExaScale Systems," DARPA Information Processing Techniques Office, Sep. 28, 2008, 297 pages.

A. W. Leung, "Organizing, Indexing, and Searching Large-Scale File Systems," Storage Systems Research Center, Baskin School of Engineering, and Univ. of California, Techinical Report UCSC-SSRC-09-09, Dec. 2009, 207 pages.

A. W. Leung et al., "Magellan: A Searchable Metadata Architecture for Large-Scale File Systems," Storage Systems Research Center, Baskin School of Engineering, and Univ. of California, Techinical Report UCSC-SSRC-09-07, Nov. 2009, 13 pages.

A. W. Leung et al., "Spyglass: Fast, Scalable Metadata Search for Large-Scale Storage Systems," USENIX Association, 7th USENIX Conference on File and Storage Technologies, 2009, pp. 153-166.

M. Lillibridge et al., "Sparse Indexing: Large Scale, Inline Deduplication Using Sampling and Locality," USENIX Association, 7th USENIX Conference on File and Storage Technologies, 2009, pp. 111-123.

L. Liu et al., "SmartScan: Efficient Metadata Crawl for Storage Management Metadata Querying in Large File Systems," Parallel Data Laboratory, Oct. 2010, pp. 1-17.

S. L. Lohr, "Sampling: Design and Analysis," Arizona State University, An International Thomson Publishing Co., Pacific Grove, 1999, pp. 1-494.

(56) References Cited

OTHER PUBLICATIONS

N. Murphy et al., "The Design and Implementation of the Database File System," Jan. 11, 2002, pp. 1-12.

J. Nunez et al., High End Computing File System and I/O R&D Gaps Roadmap, Los Alamos National Laboratory, LA-UR-08-2876, Aug. 2008, 14 pages.

F. Olken et al., Simple Random Sampling from Relational Databases, Computer Science Research Dept., Proceedings of the Twelfth International Conference on Very Large Data Bases, Aug. 1986, pp. 160-169.

F. Olken et al., "Random Sampling from Database Files: A Survey," Computer Science Research Dept., Proceedings of the fifth international conference on Statistical and scientific database management, 1990, pp. 92-111.

M. A. Olson et al., "The Design and Implementation of the Inversion File System," Univ. of California at Berkeley, 1993 Winter USENIX, Jan. 25-29, 1993, pp. 1-14.

R. Pike et al., "Plan 9 from Bell Labs," Computing Systems, 1995, vol. 8, No. 3, 22 pages.

Plan 9 File System Traces, pdos.csail.mit.edu/p9trace/, Apr. 27, 2012, 1 page, ftp://www.cs.bell-labs.com/p9trace.

M. Seltzer et al., "Hierarchical File Systems are Dead," Proceedings of the 12th conference on Hot topics in Operating Systems (HotOS '09), Harvard School of Engineering and Applied Sciences, 2009, pp. 1-5.

"Laptops Can Be Searched at the Border—Slashdot," Apr. 27, 2012, pp. 1-33, yro.slashdot.org/story/08/04/22/1733251/laptops-can-be-searched-at-the-border.

P. Stahlberg et al., "Threats to Privacy in the Forensic Analysis of Database Systems," Proceedings of the 2007 ACM SIGMOD international conference on Management of data (SIGMOD '07), New York, NY, ACM, Jun. 12-14, 2007, pp. 91-102.

A. Szalay, "New Challenges in Petascale Scientific Databases (Keynote Talk)," Proceedings of the 20th international conference on Scientific and Statistical Database Management (SSDBM '08), Speinger-Verlag, Berlin, Heidelberg, 2008, 1 page.

J. S. Vitter, "Random Sampling with a Reservoir," ACM Transactions on Mathematical Software, Mar. 1985, vol. 11, No. 1, pp. 37-57.

Y. Zhu et al., "HBA: Distributed Metadata Management for Large Cluster-Based Storage Systems," CSE Journal Articles, IEEE Transactions on Parallel and Distributed Systems, 2008, pp. 750-763.

SNIA NSF traces, "I/O Trace Data Files," http://iotta.snia.org/traces, 2012, 2 pages.

"Google Desktop Update," Sep. 2011, 5 pages, http://googledesktop.blogspot.com.

"Beagle (Software)," http://en.wikipedia.org/wiki/Beagle_(software), available for download at https://launchpad.net/beagle, Jan. 2009, 2 pages.

Office Action dated Sep. 25, 2012, cited in U.S. Appl. No. 13/328,810.

Office Action dated May 16, 2013, cited in U.S. Appl. No. 13/328,810.

Office Action dated Jul. 16, 2014, cited in U.S. Appl. No. 13/328,810.

\* cited by examiner

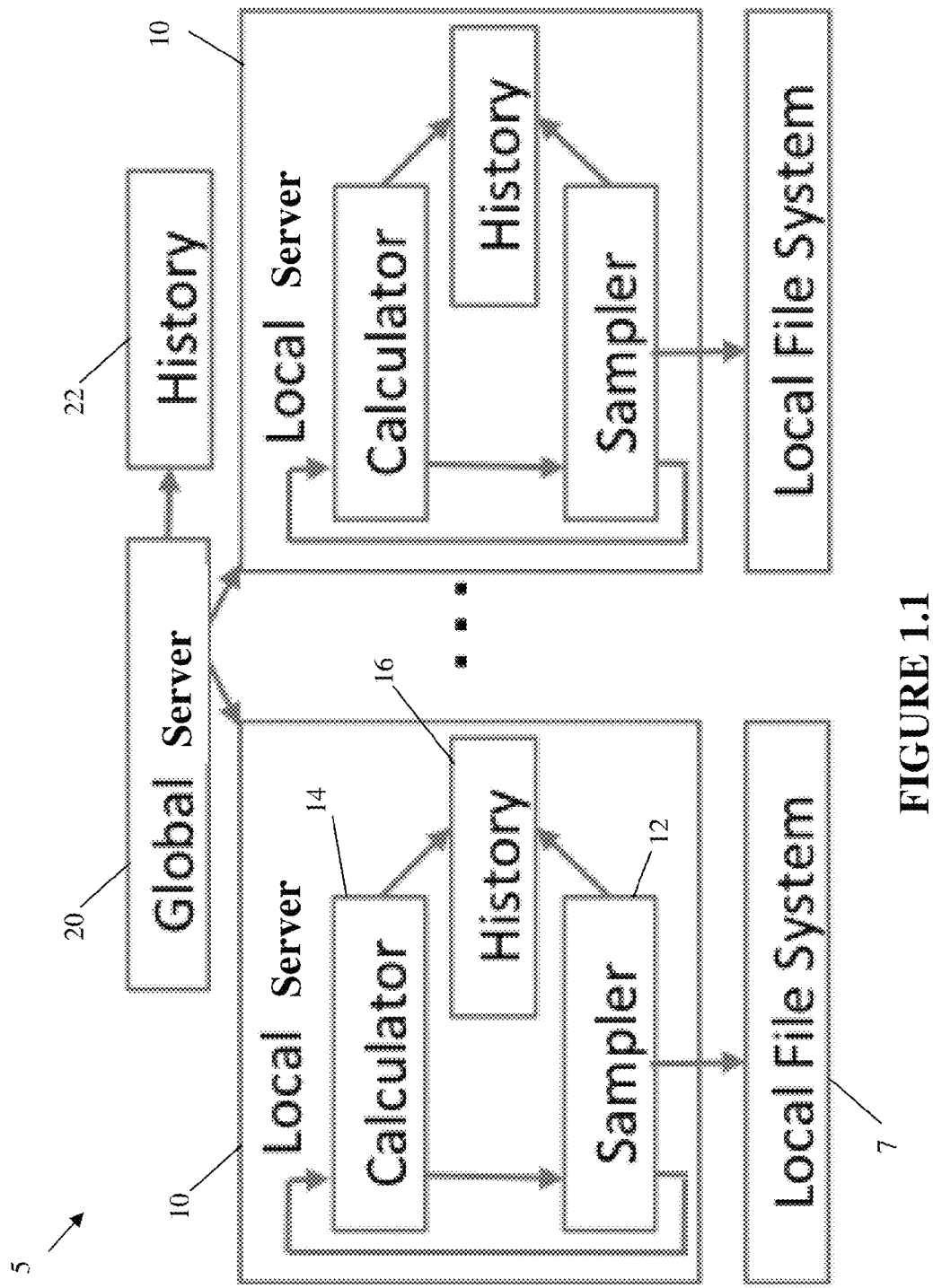
FIGURE 1.1

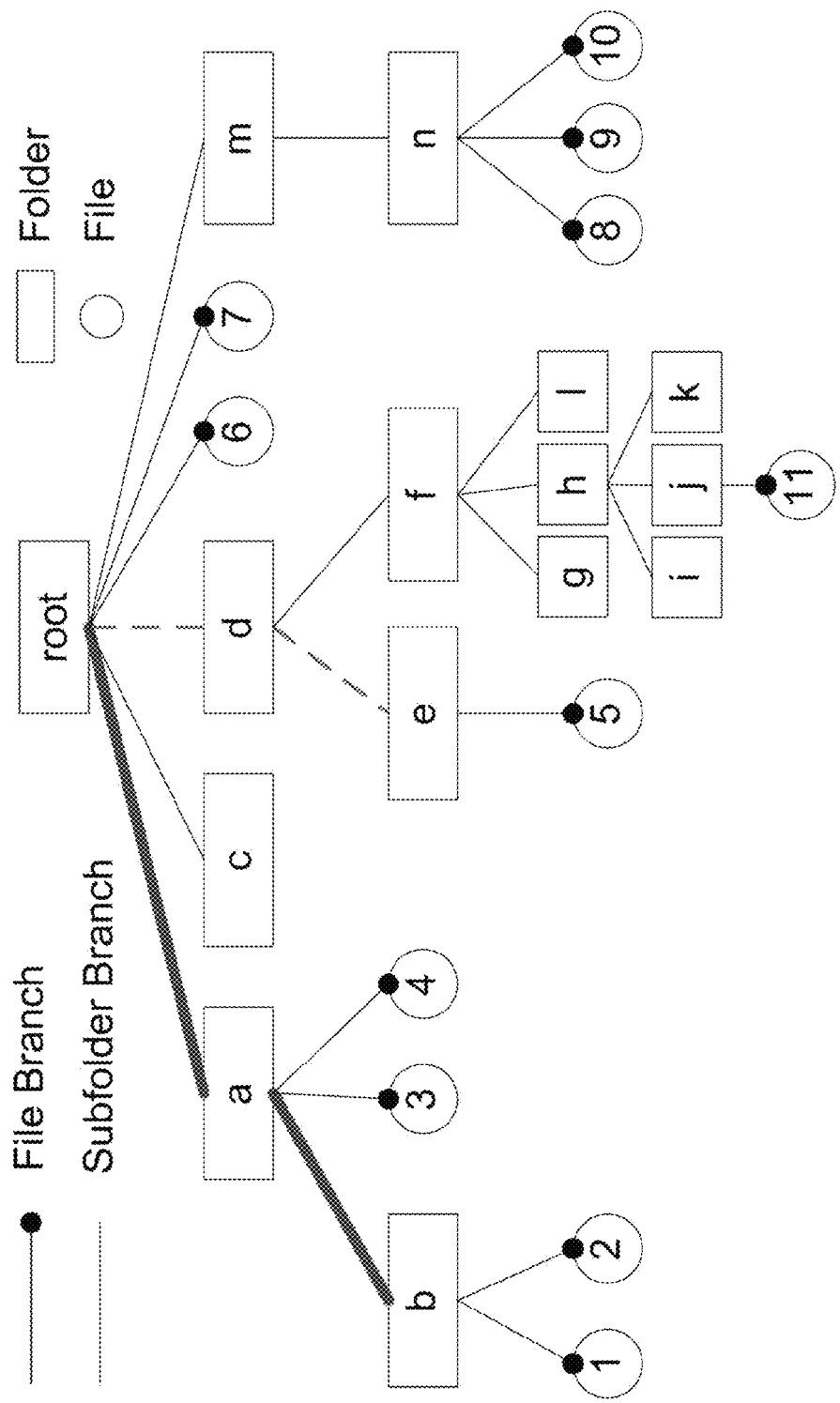
FIGURE 1.2

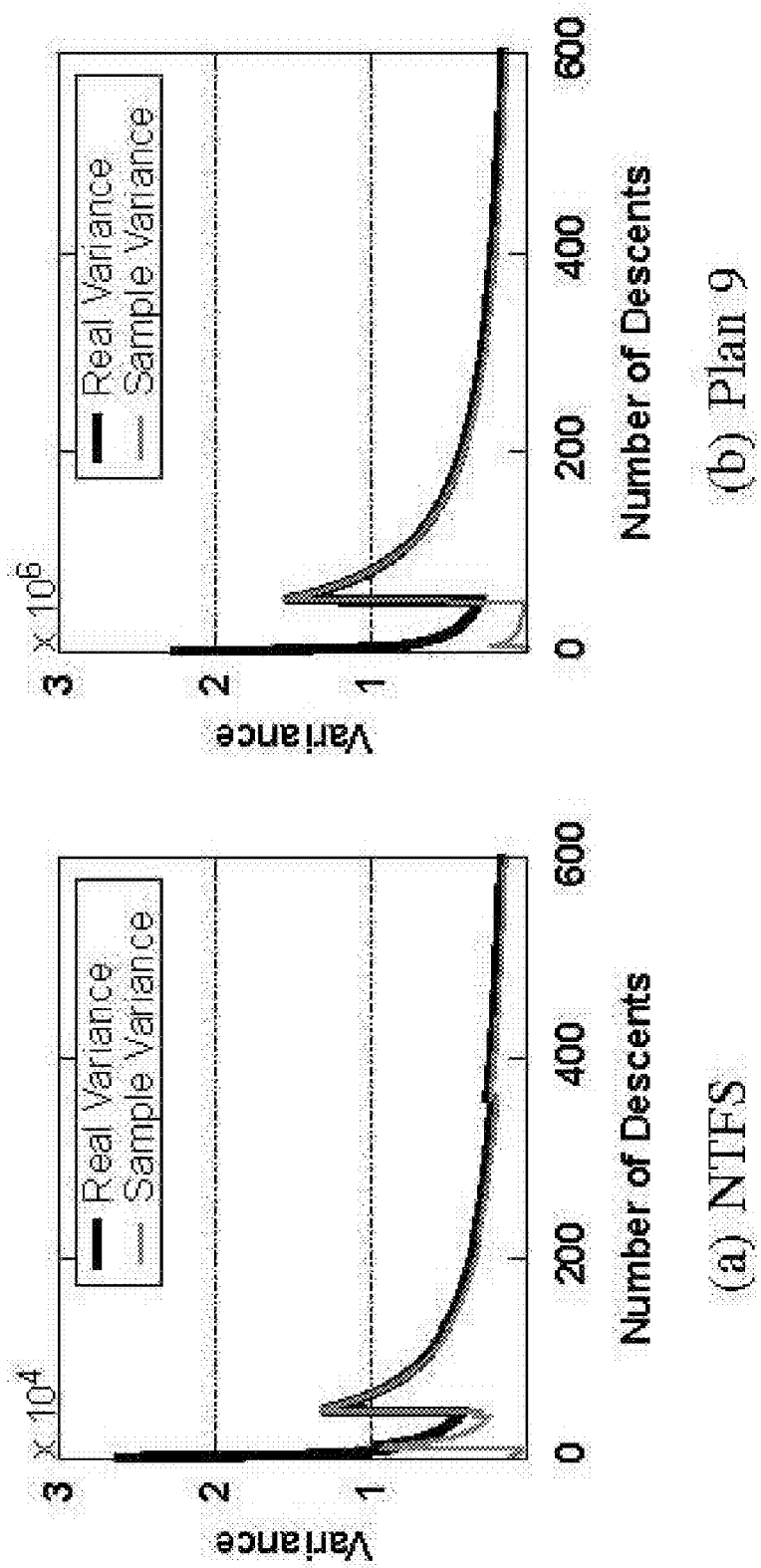
FIGURE 1.3

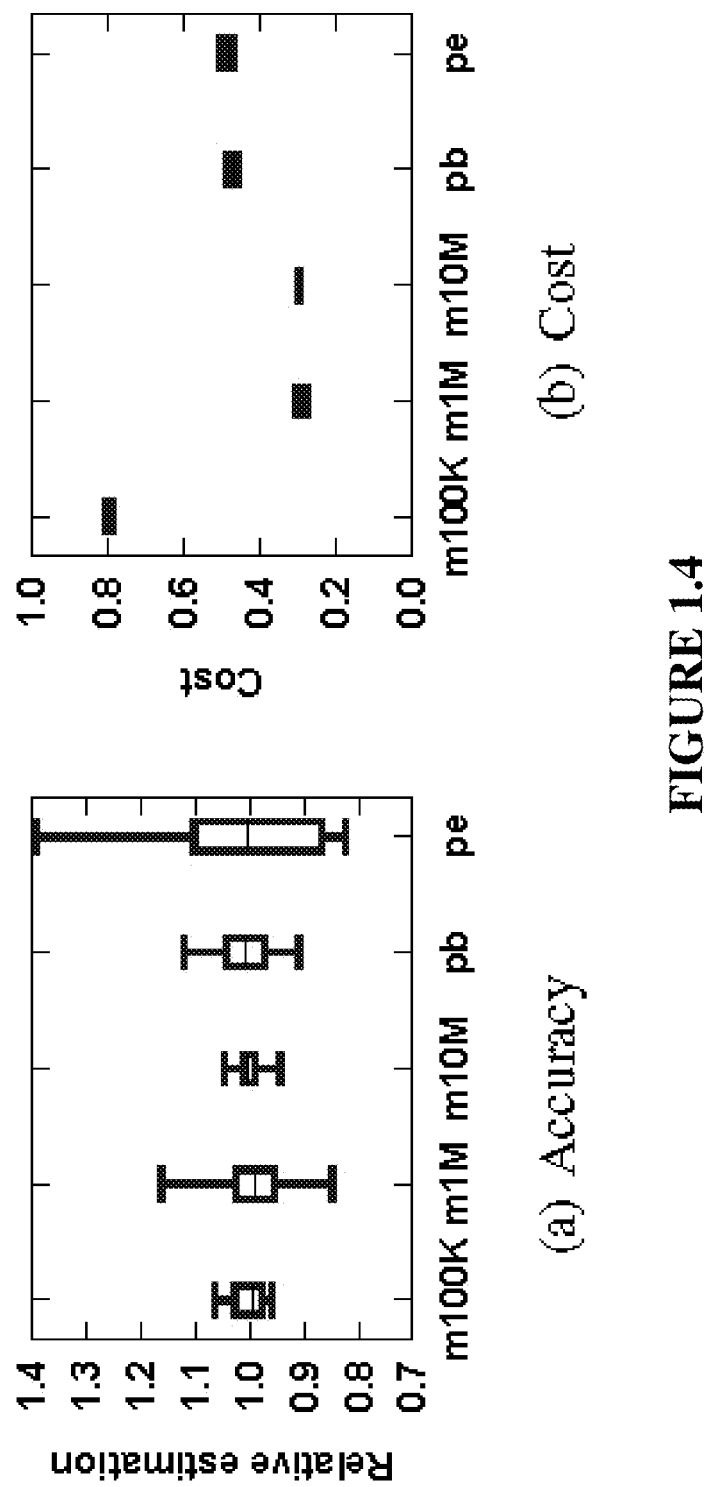
FIGURE 1.4

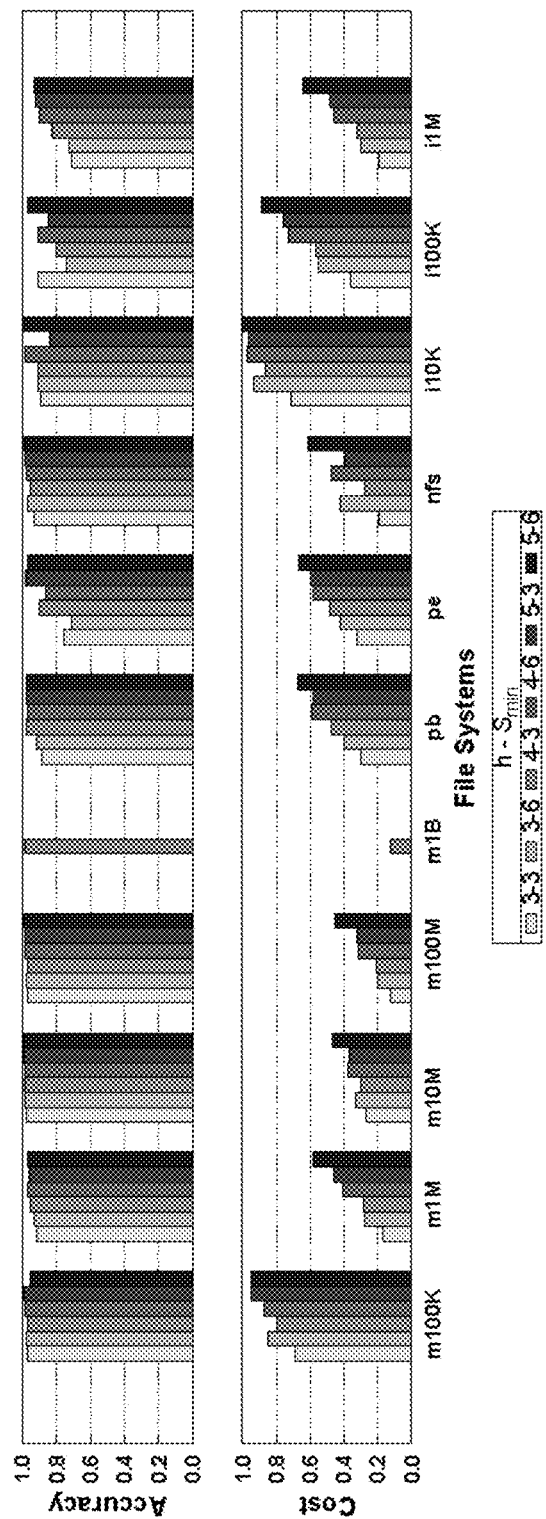
FIGURE 1.5(a)

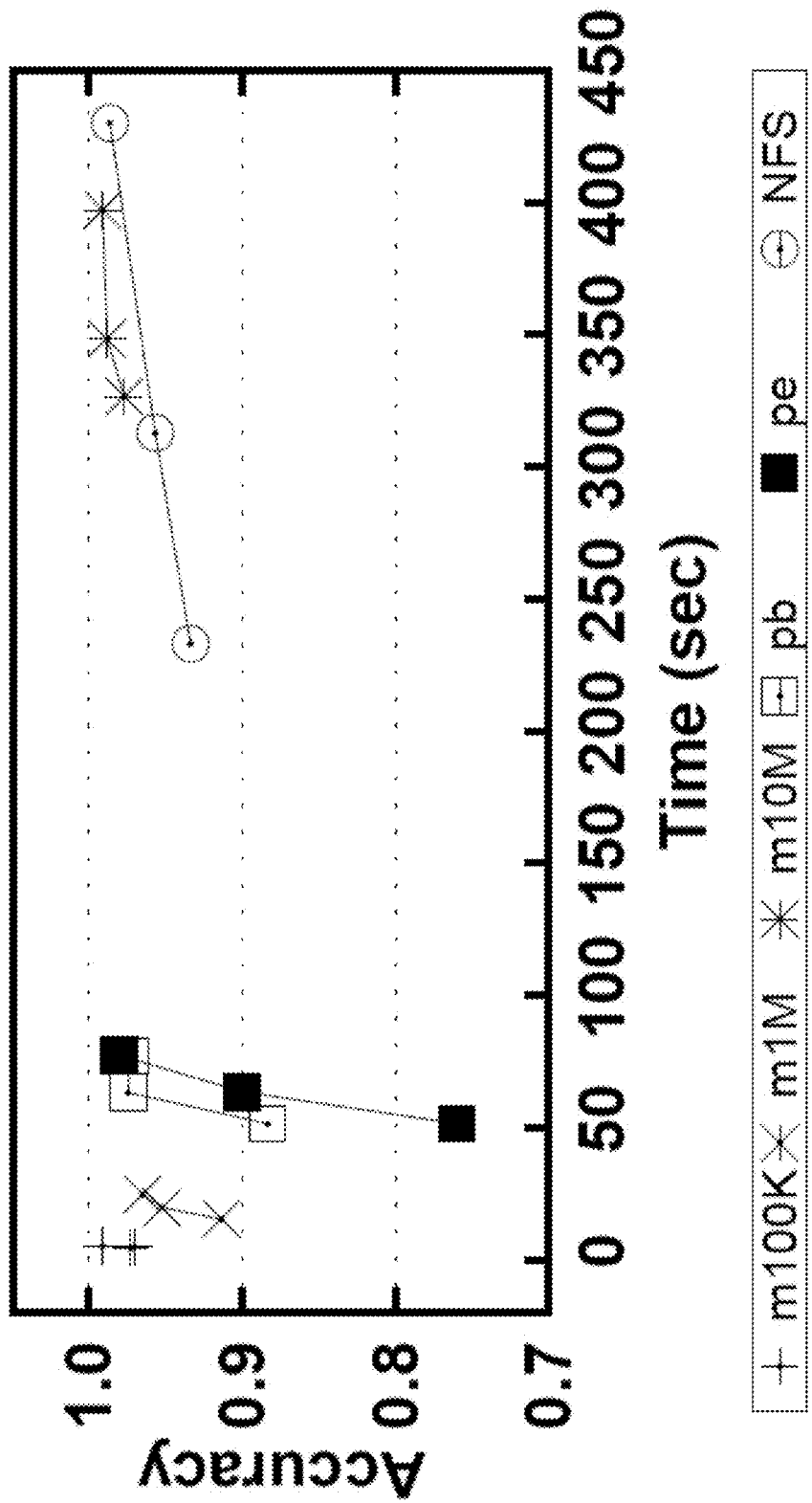
FIGURE 1.5(b)

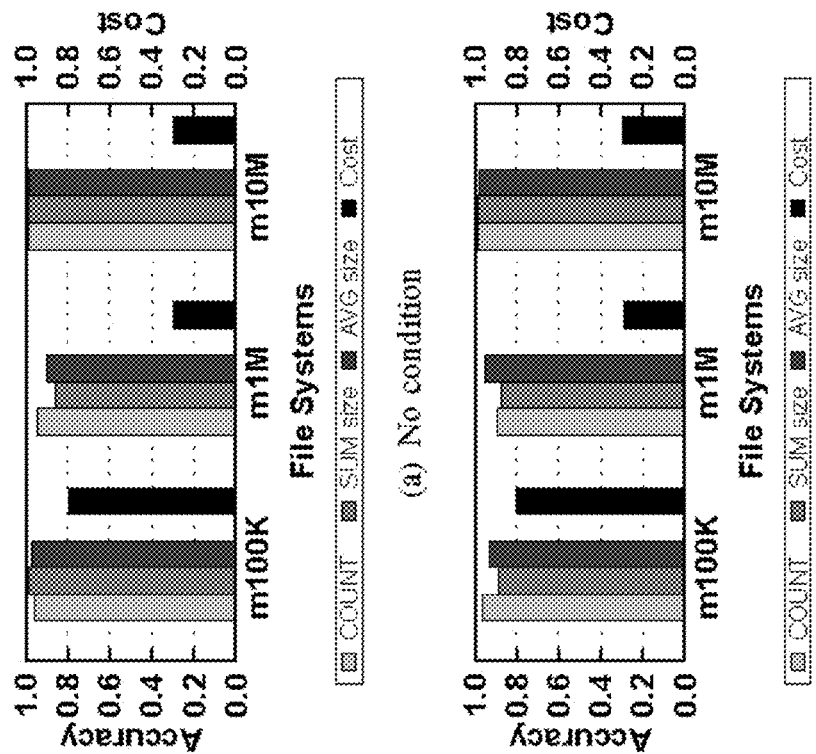
FIGURE 1.6

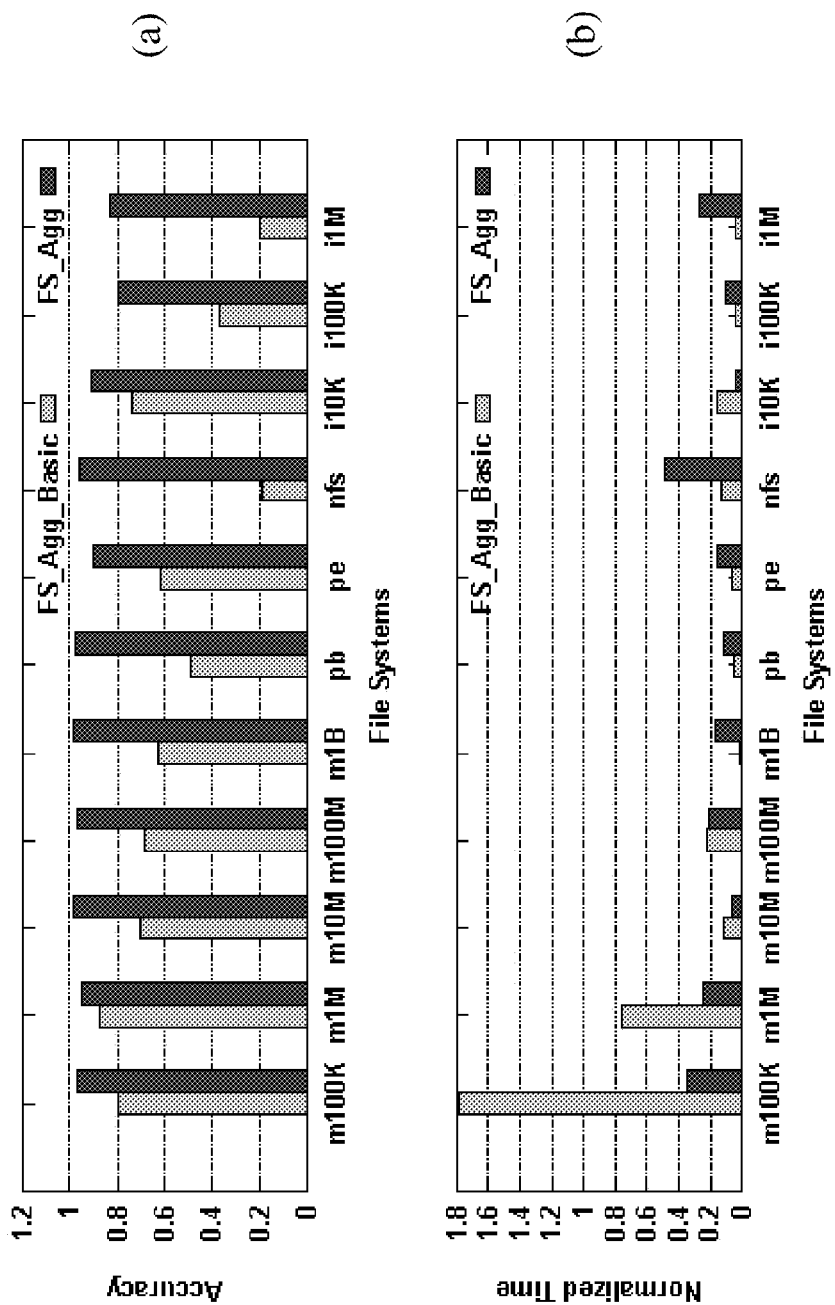
FIGURE 1.7

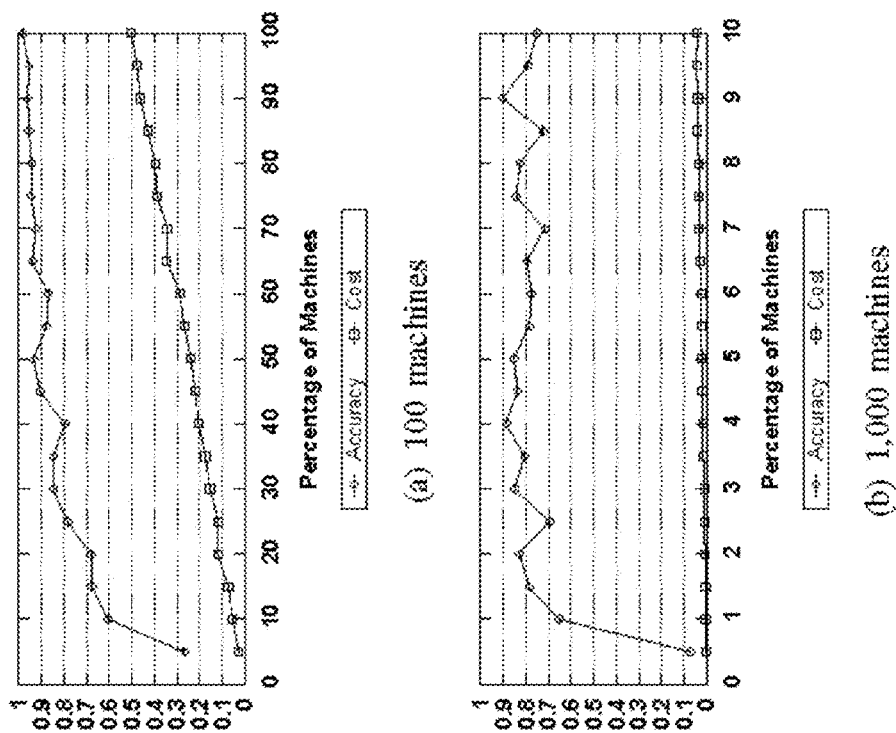
FIGURE 1.8

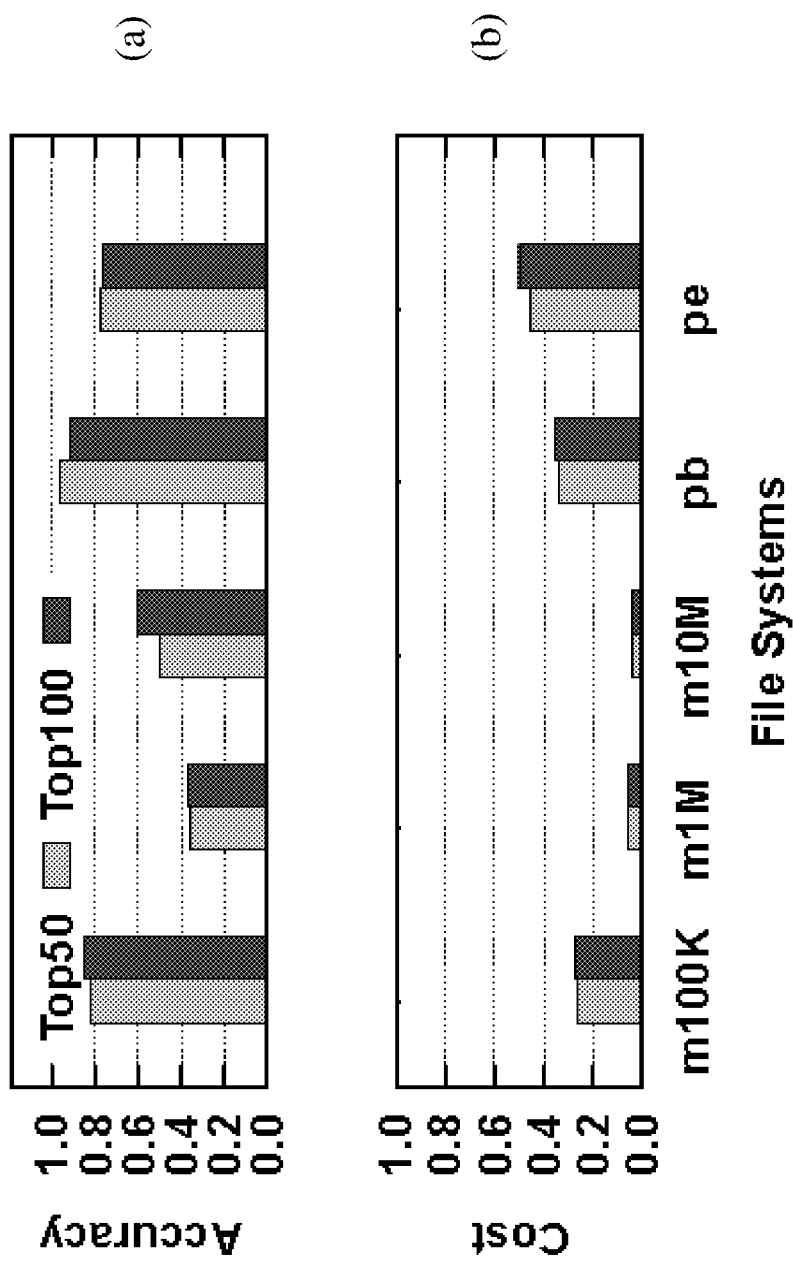
FIGURE 1.9

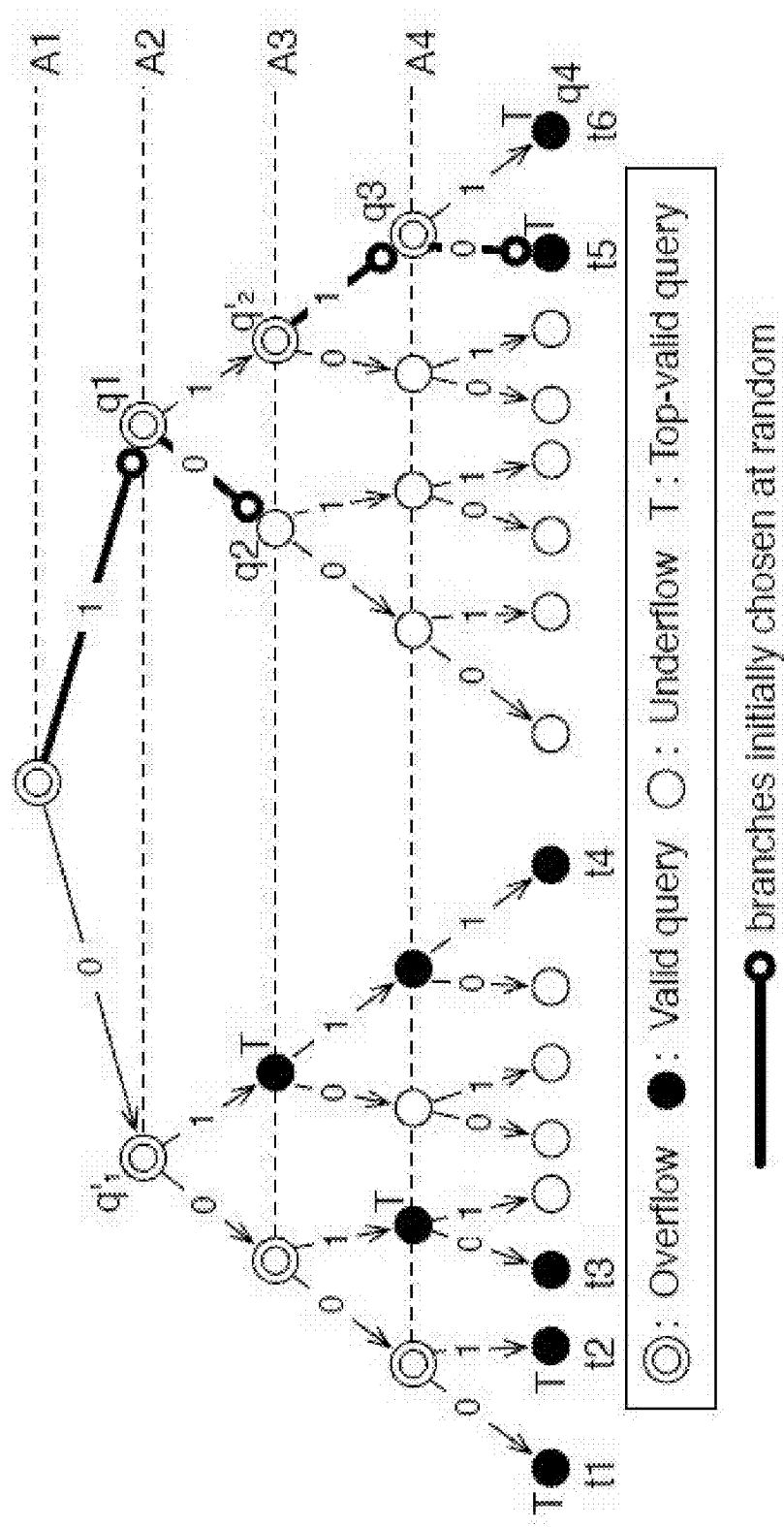
FIGURE 2.1

1: $q \leftarrow$ root node. $p \leftarrow 1$. $i \leftarrow 1$.
2: Randomly generate $v \in \{0, 1\}$.
3: Issue $q' \leftarrow q \wedge (A_i = v)$.  ▷ for Step 1 (random drill-down)
4: if $q'$ underflows then
5:    $q \leftarrow q \wedge (A_i = 1 - v)$. Goto 2.  ▷ Backtracking
6: else if $q'$ overflows then
7:    Issue $q \wedge (A_i = 1 - v)$.  ▷ for Step 2 (computing $p(q)$)
8:    if $q \wedge (A_i = 1 - v)$ is nonempty then
9:      $p \leftarrow p/2$.  ▷ Update $p(q)$
10:    end if
11:    $q \leftarrow q'$. $i \leftarrow i + 1$. Goto 2.
12: end if
13: return $\tilde{n} \leftarrow |q|/p$.  ▷ Return an estimation for database size

FIGURE 2.2

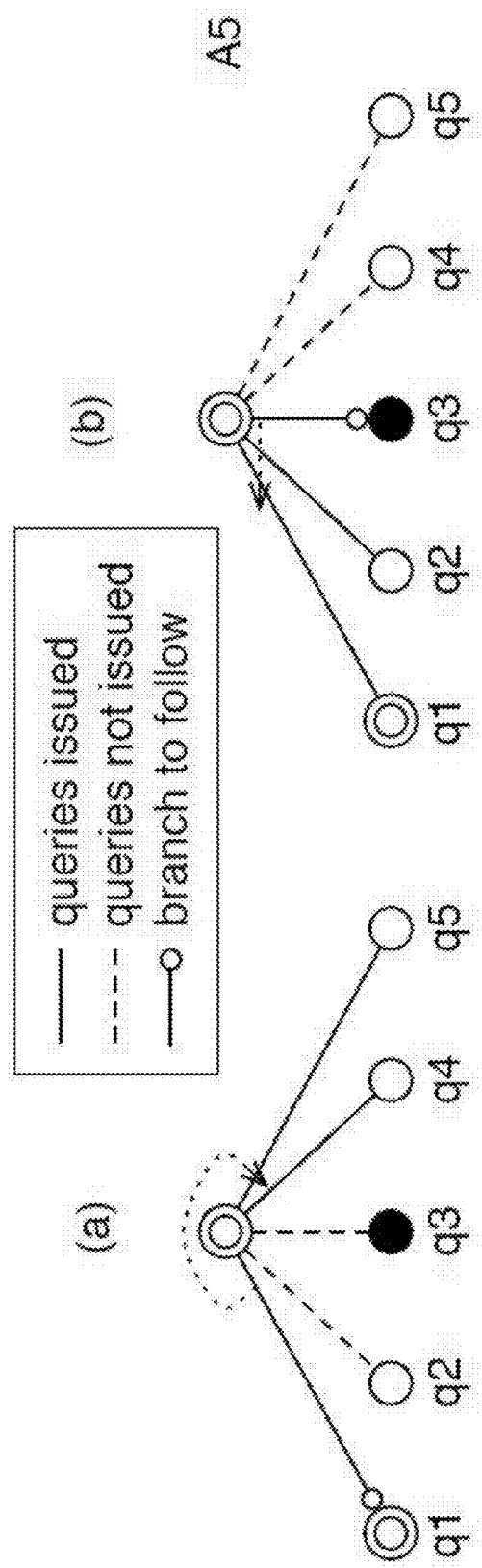
FIGURE 2.3

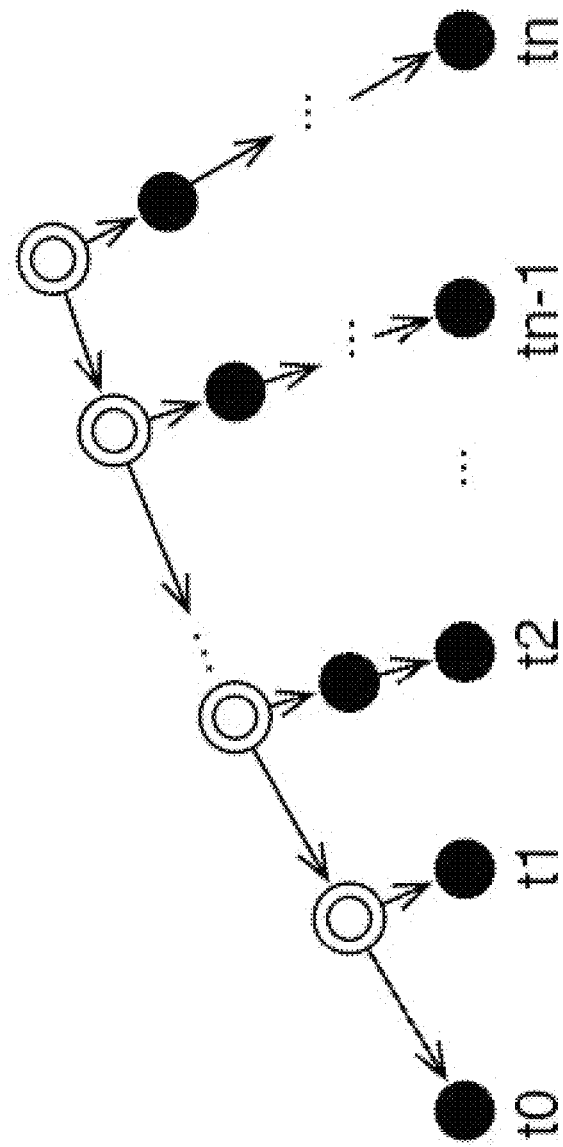
FIGURE 2.4

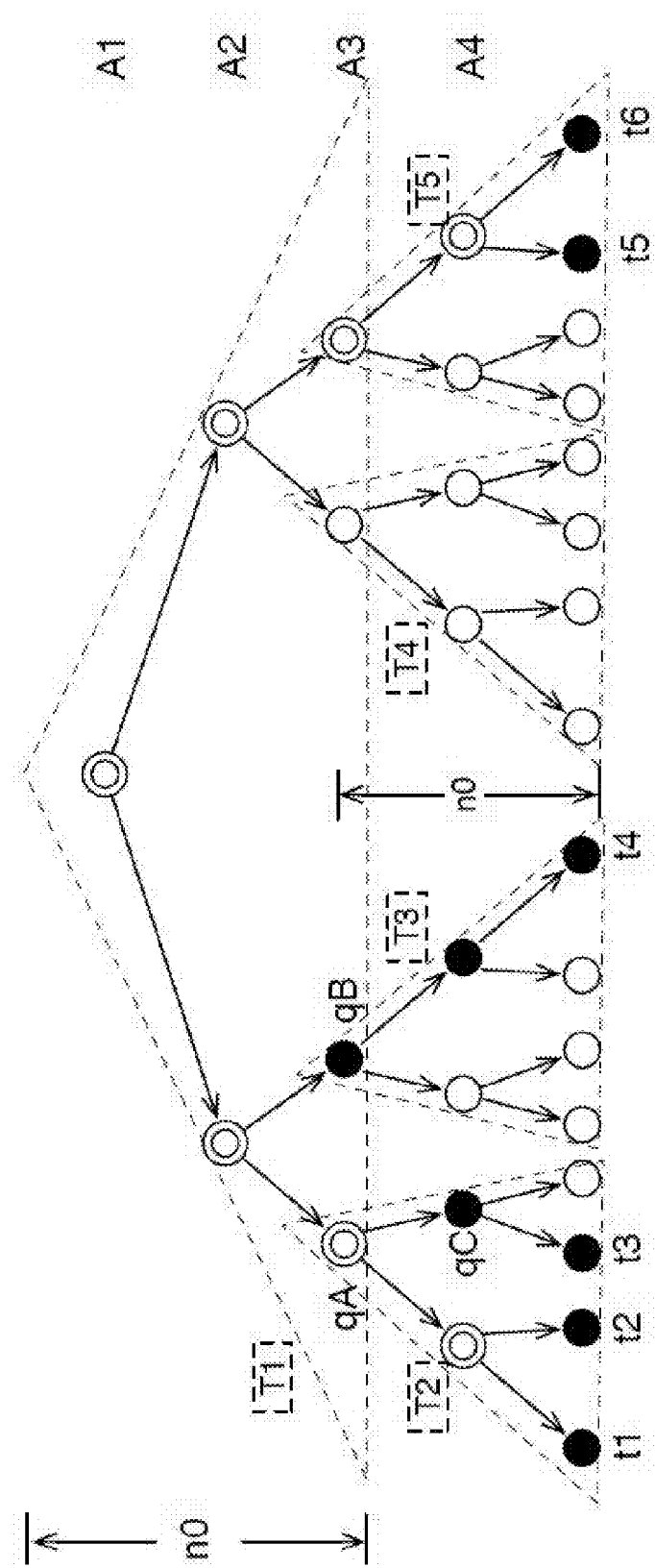
FIGURE 2.5

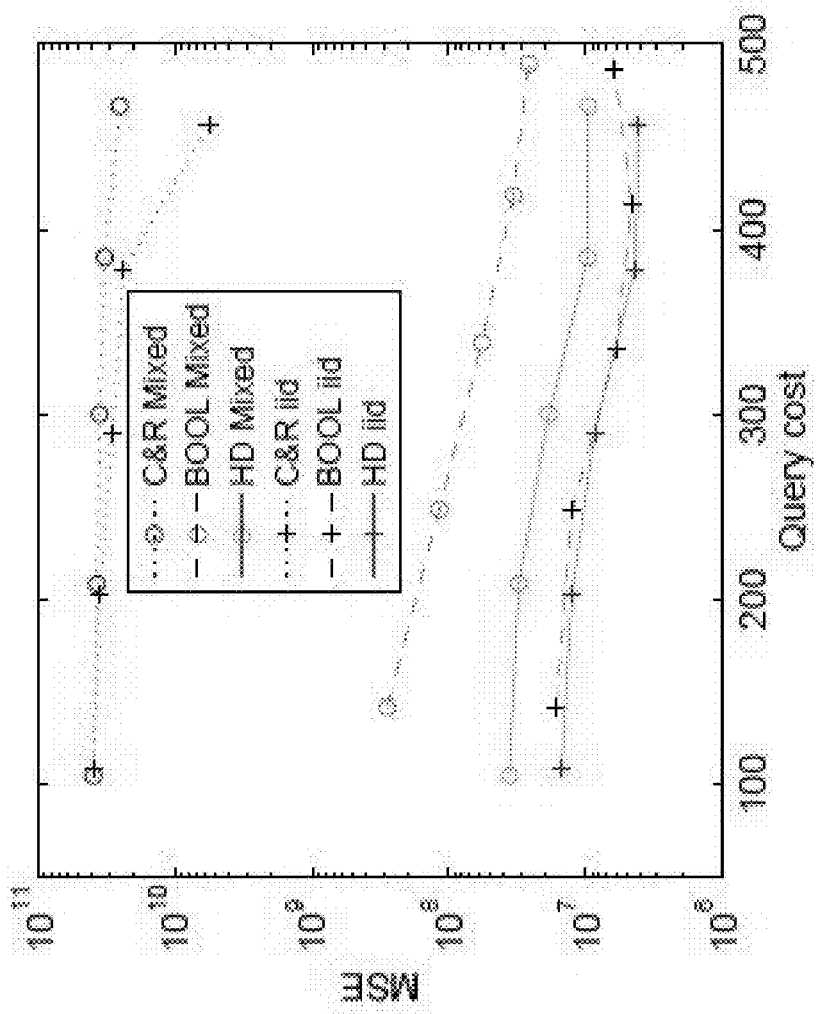
FIGURE 2.6

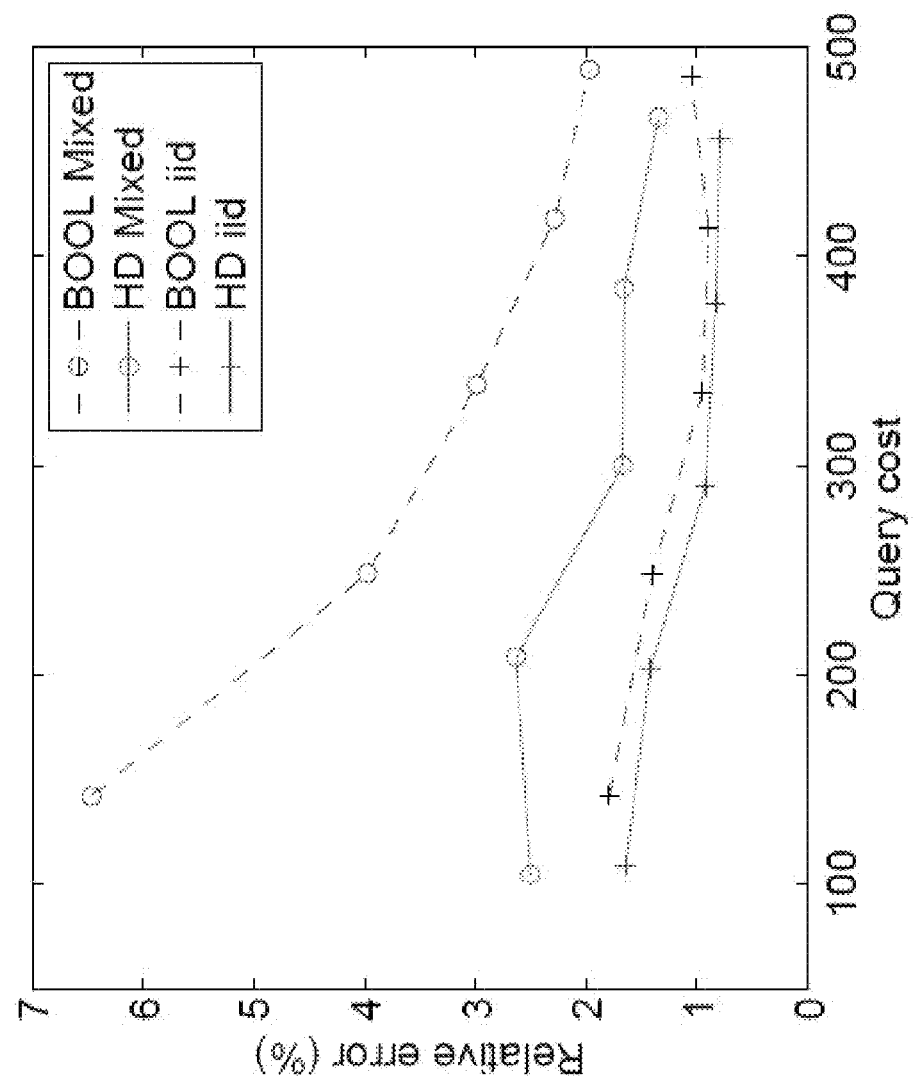
FIGURE 2.7

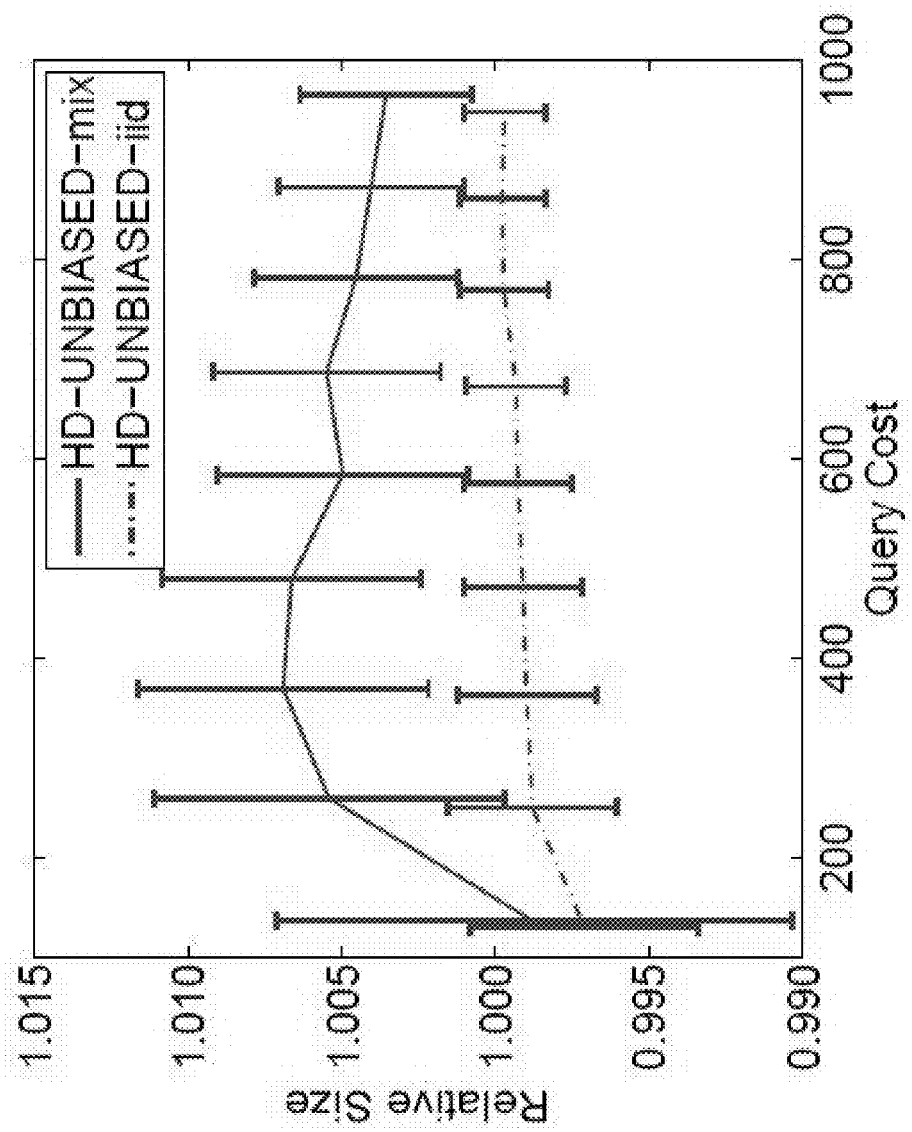
FIGURE 2.8

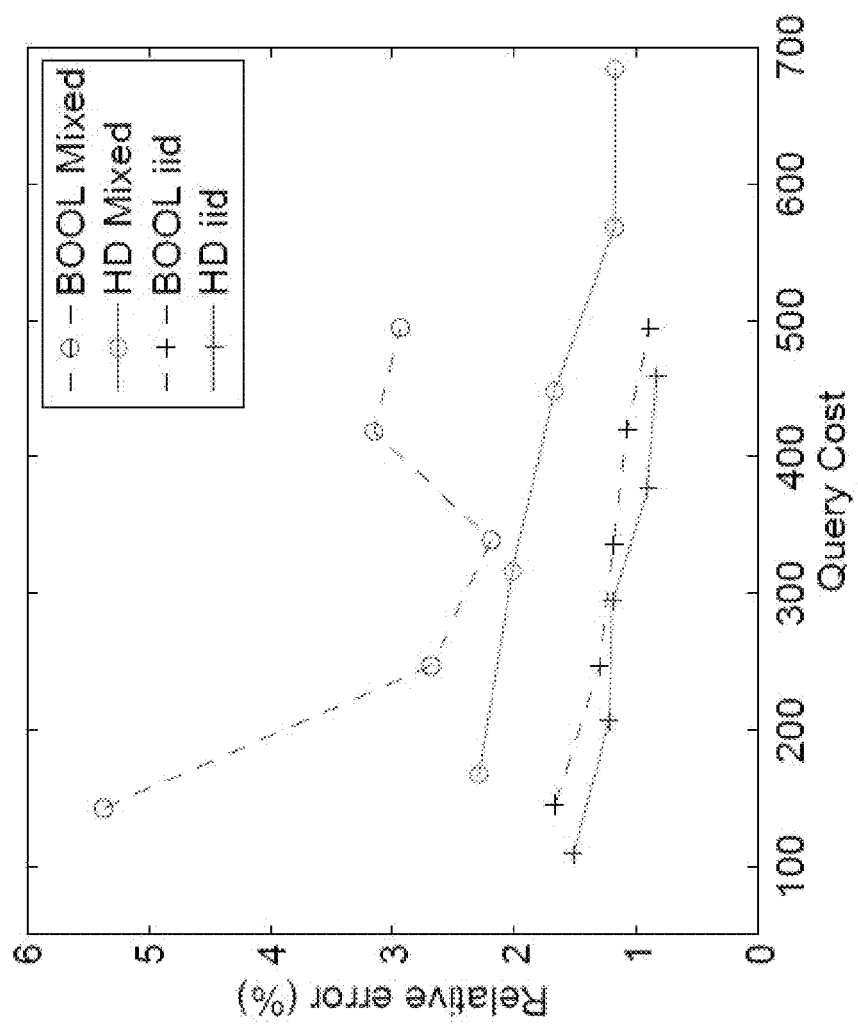
FIGURE 2.9

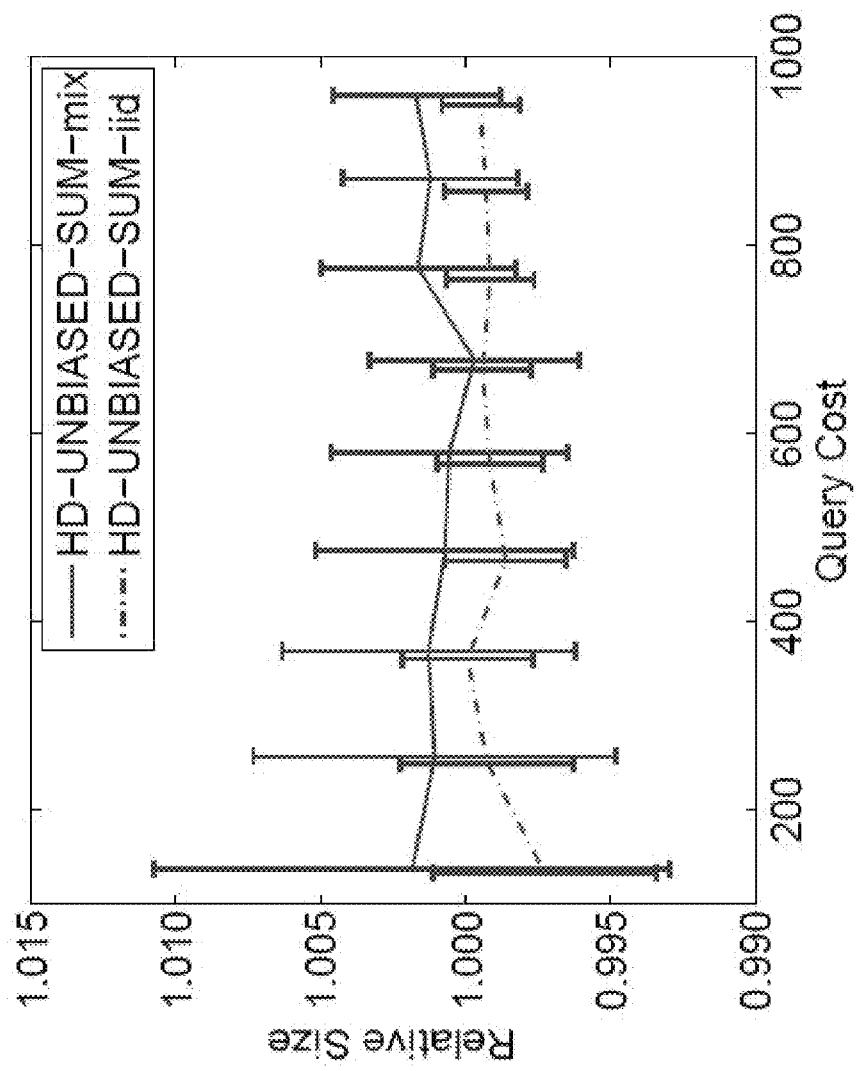
FIGURE 2.10

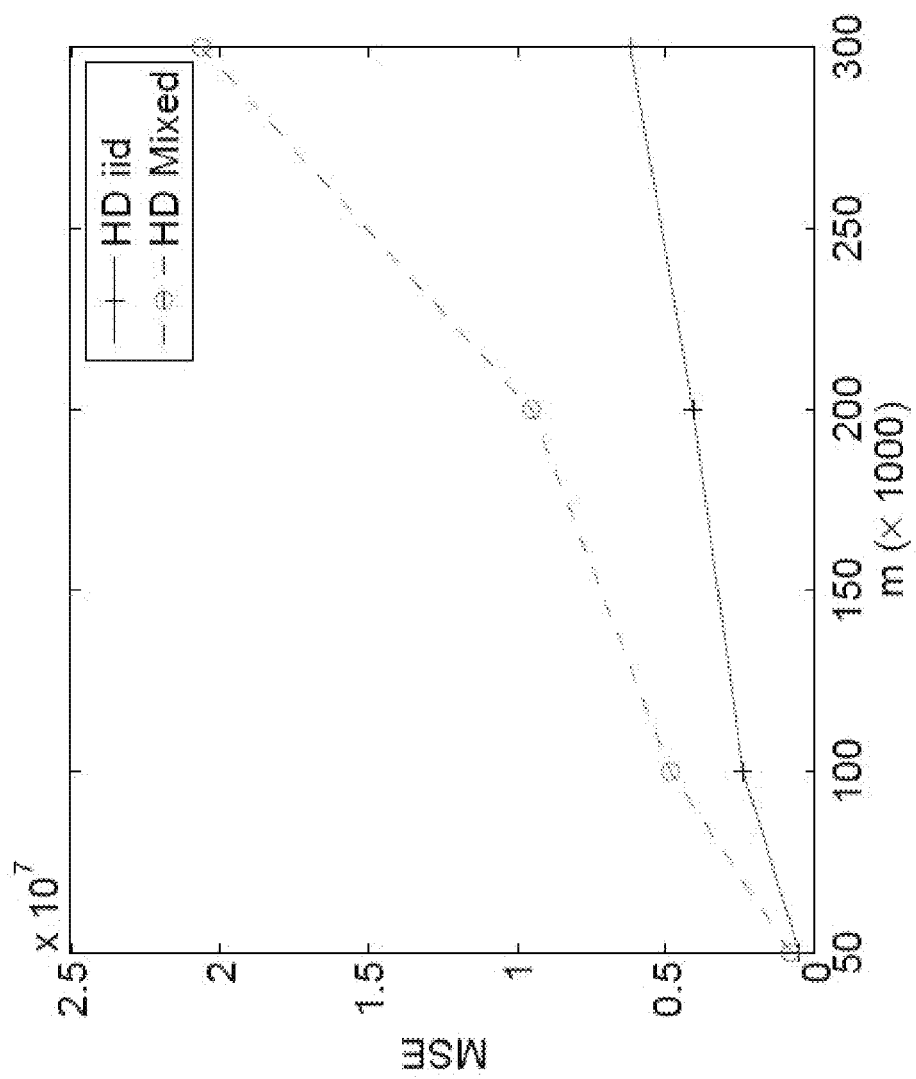
FIGURE 2.11

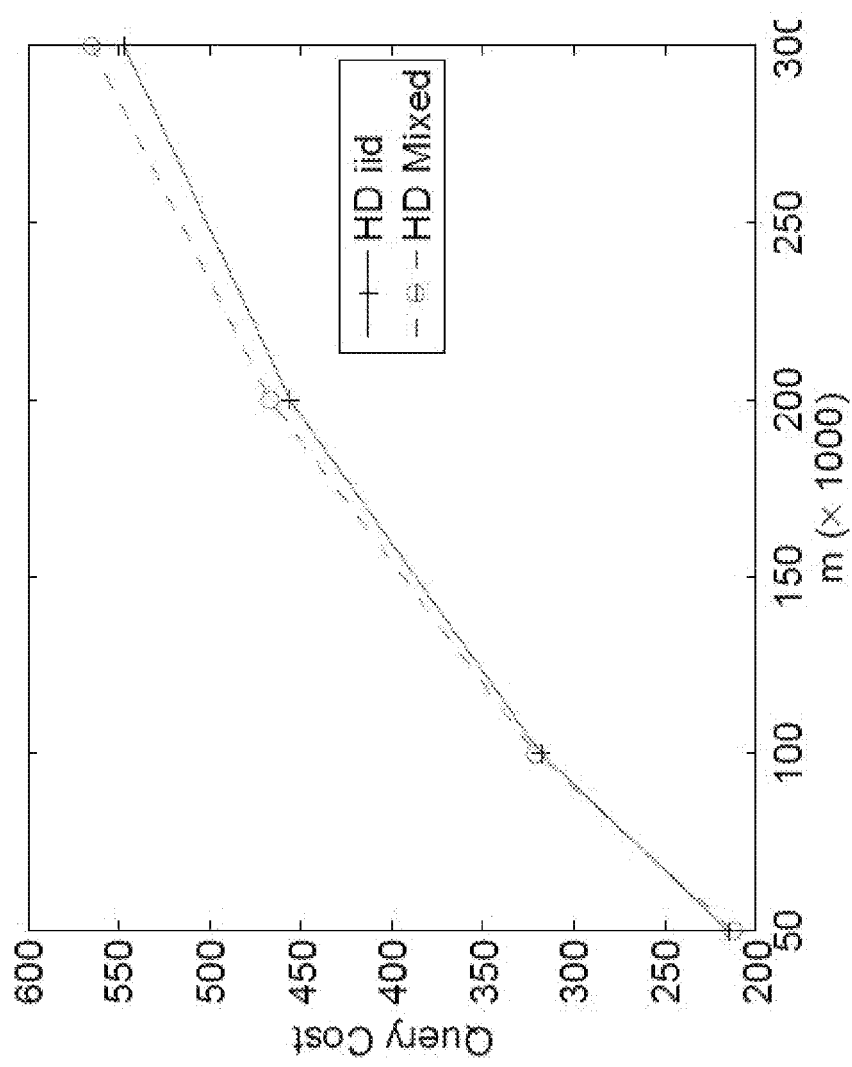
FIGURE 2.12

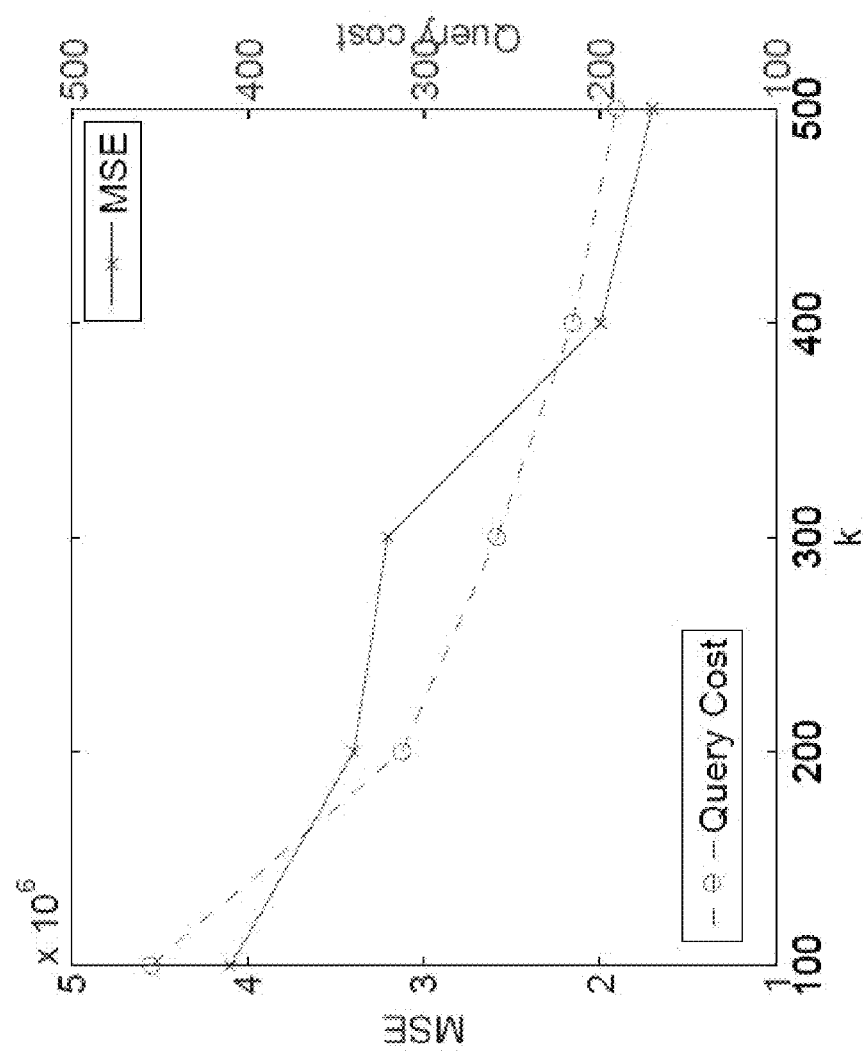
FIGURE 2.13

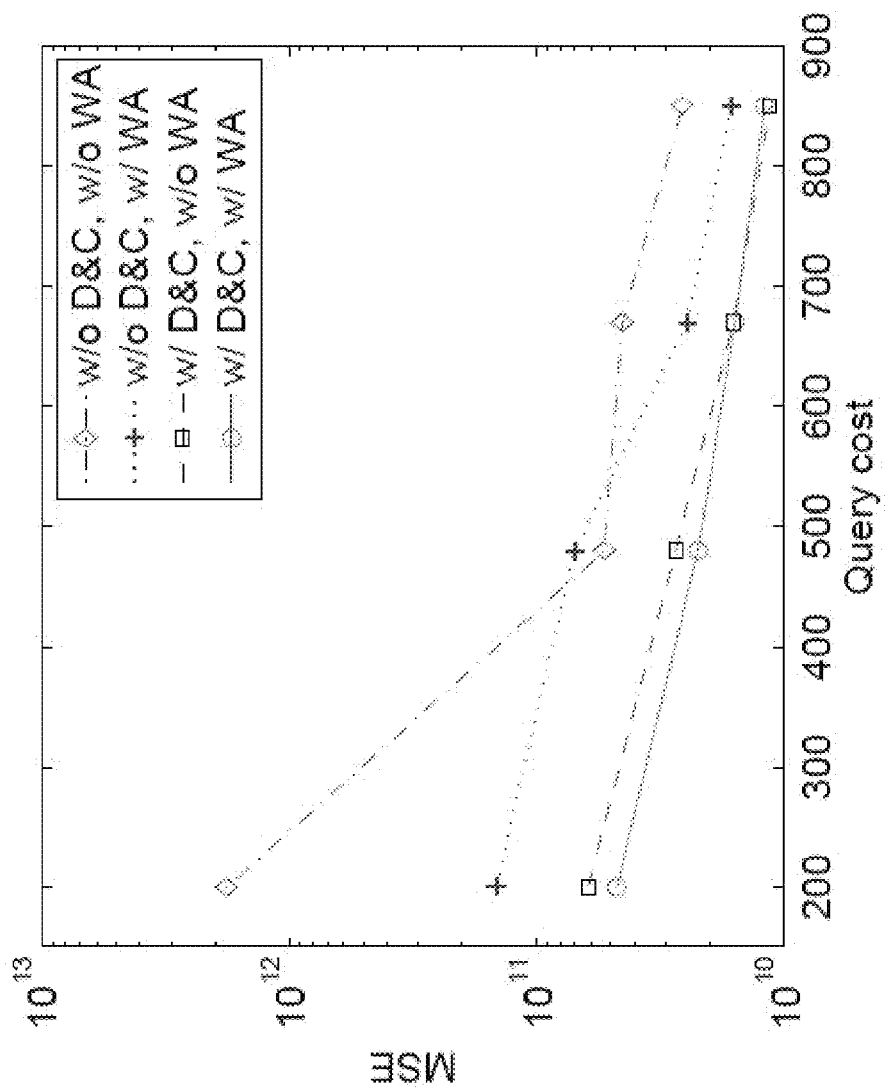
FIGURE 2.14

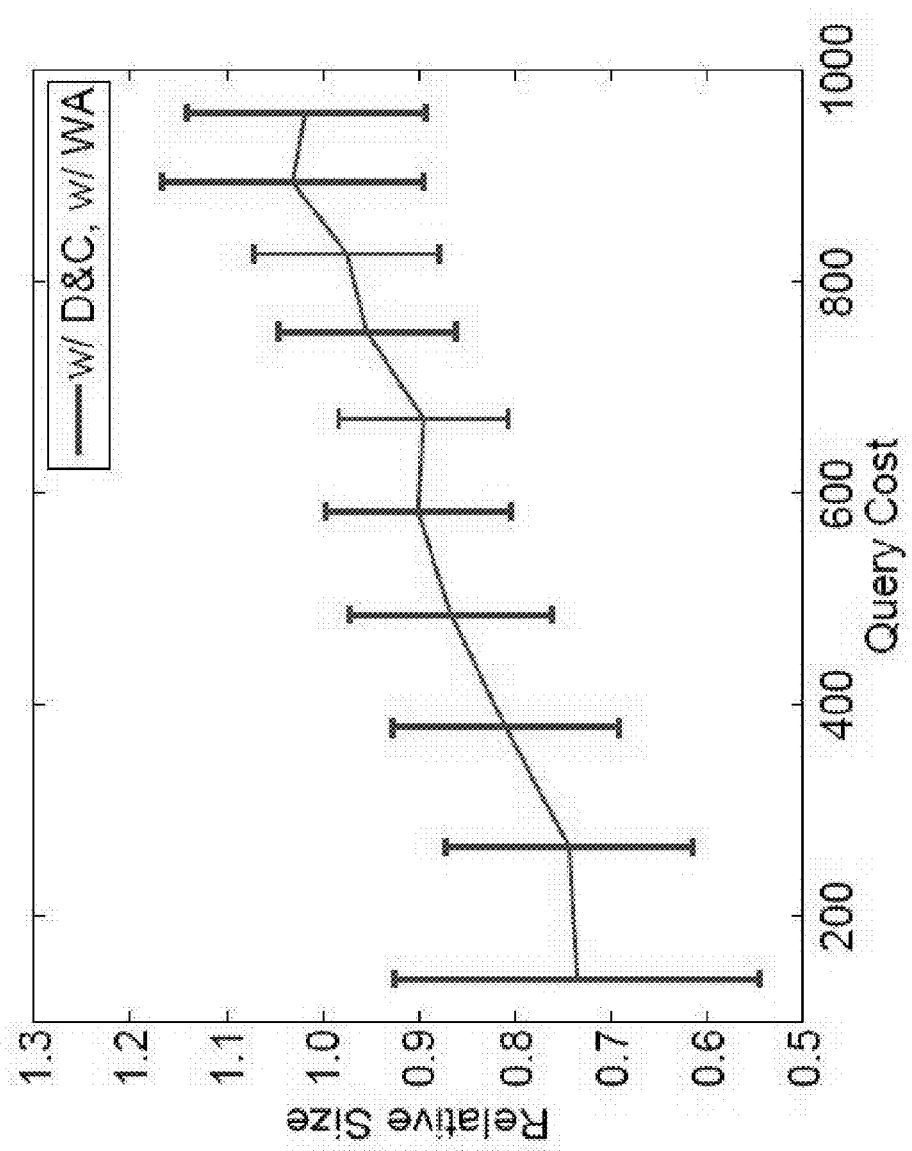
FIGURE 2.15

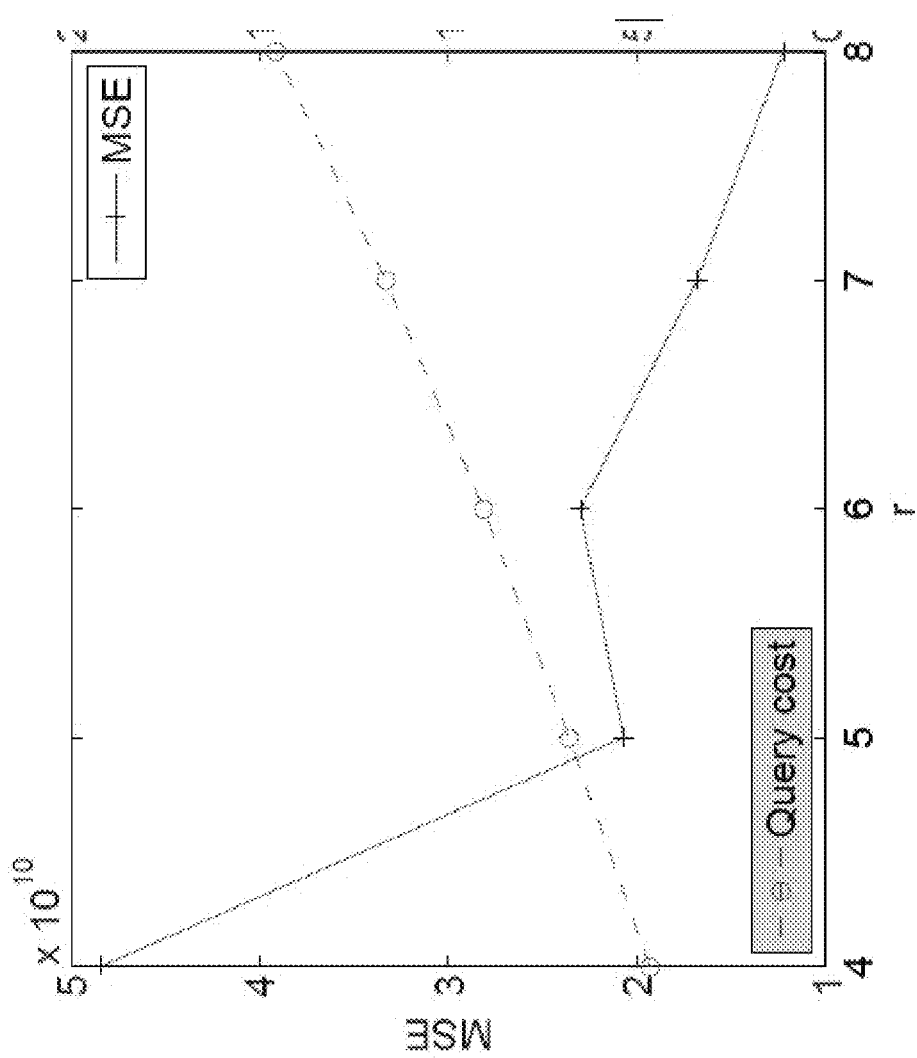
FIGURE 2.16

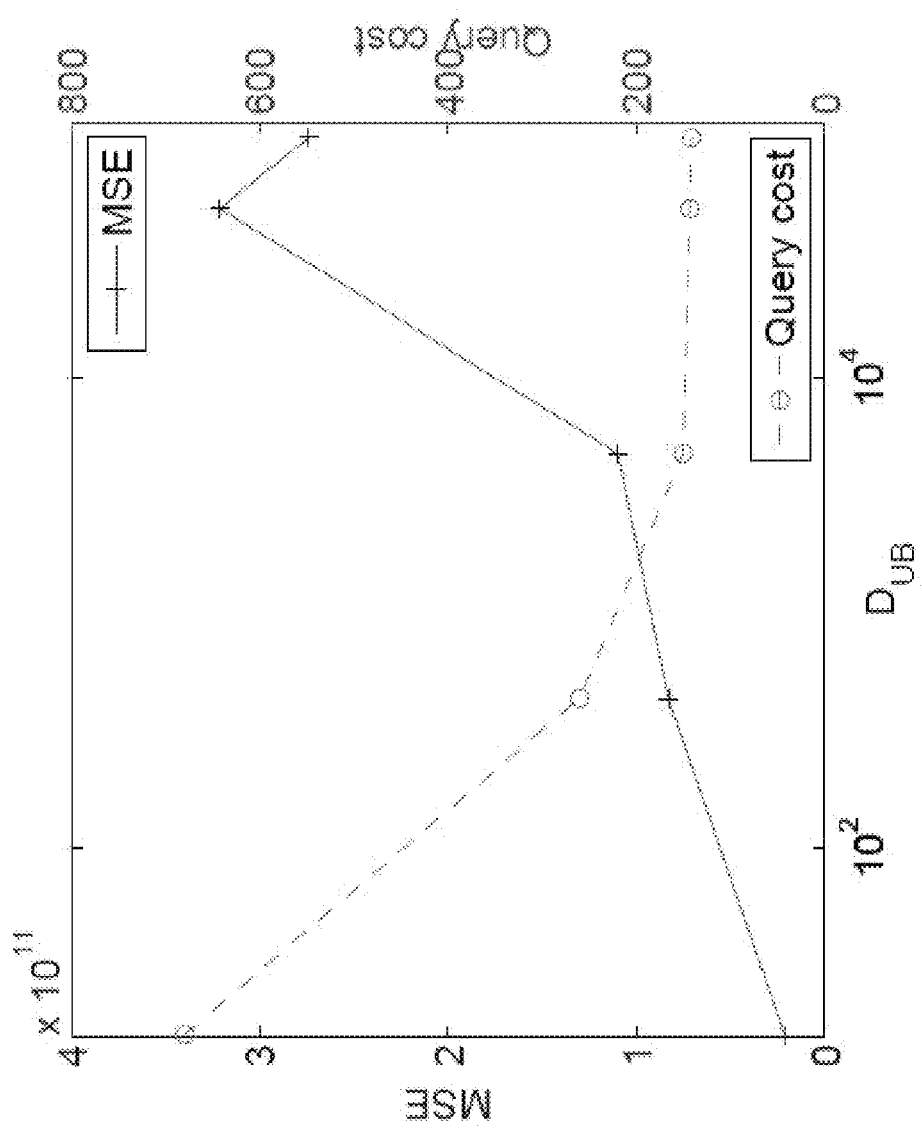
FIGURE 2.17

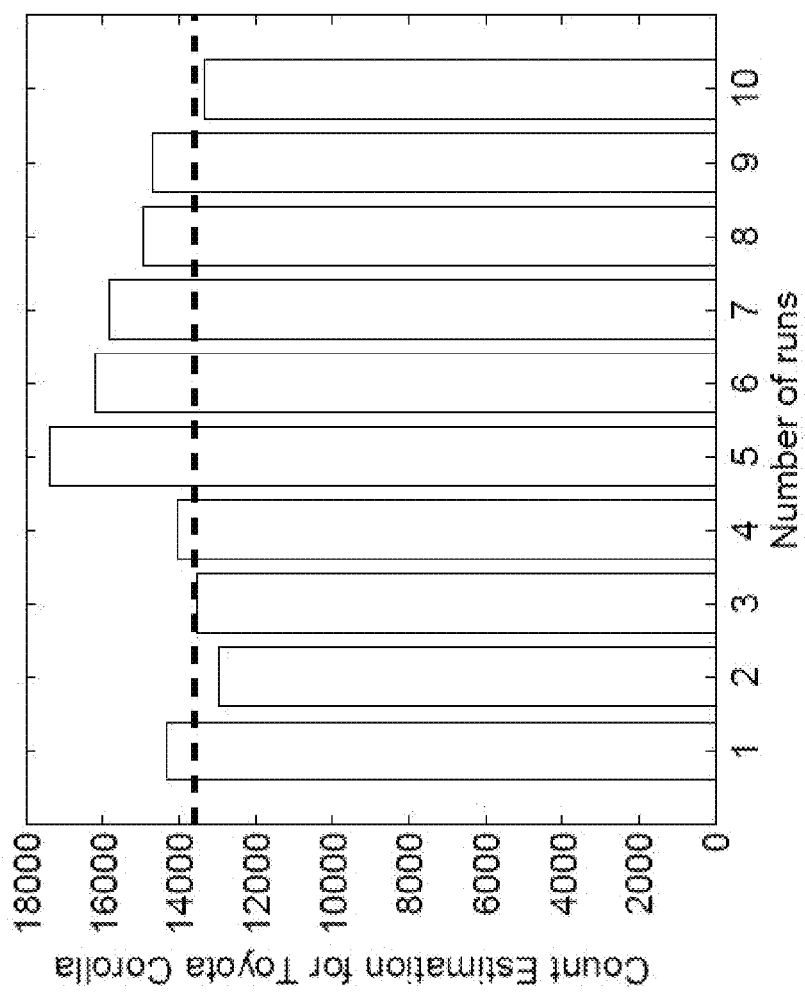
FIGURE 2.18

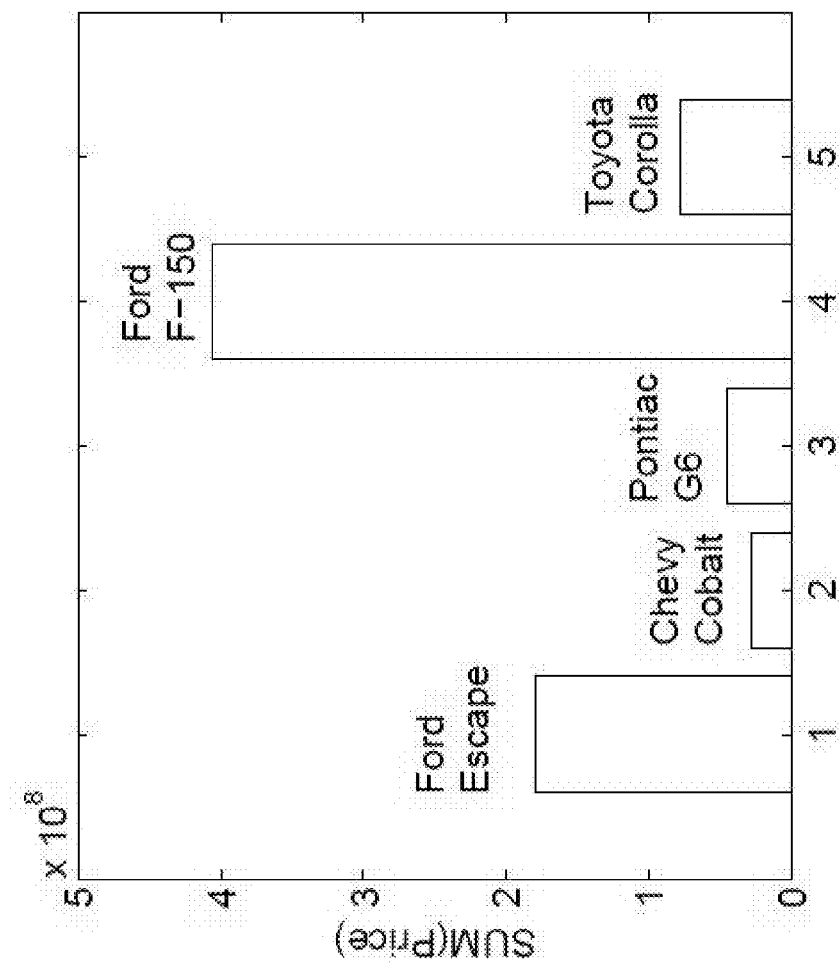
FIGURE 2.19

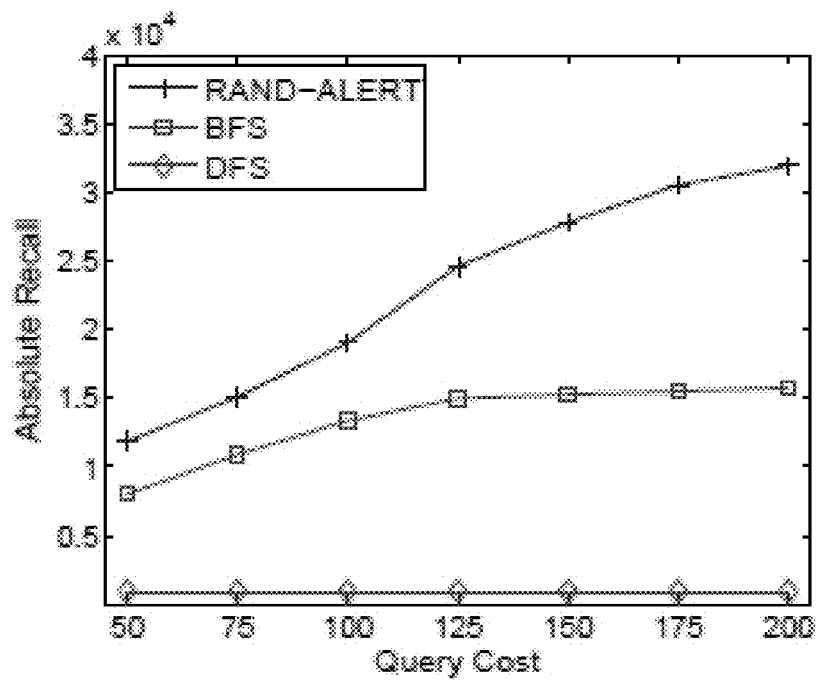
Figure 3.1
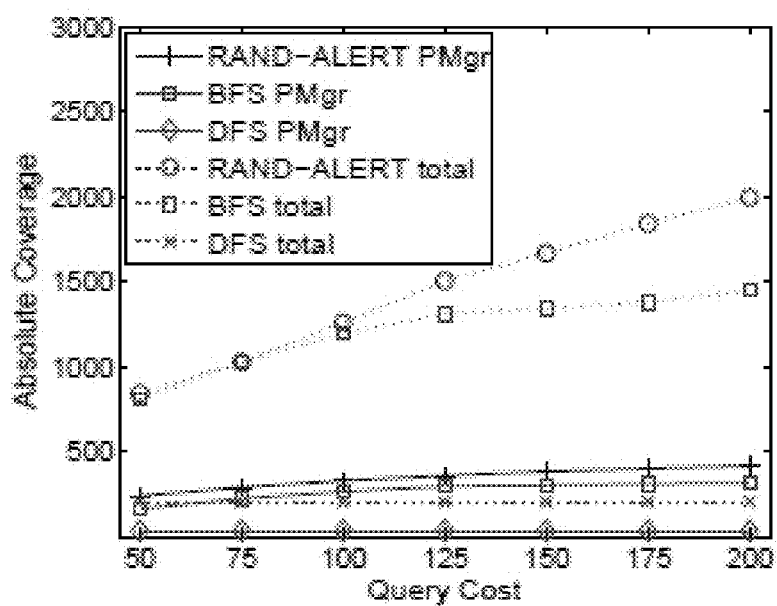
Figure 3.2

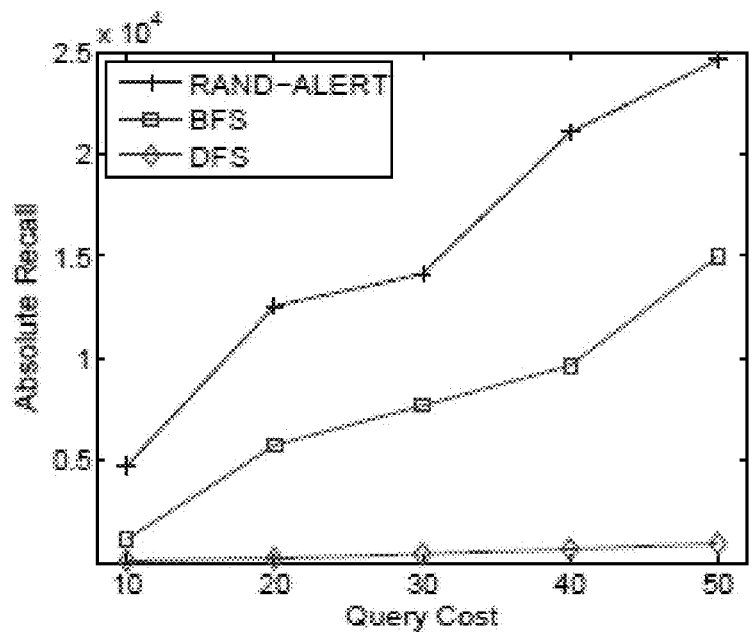
Figure 3.3
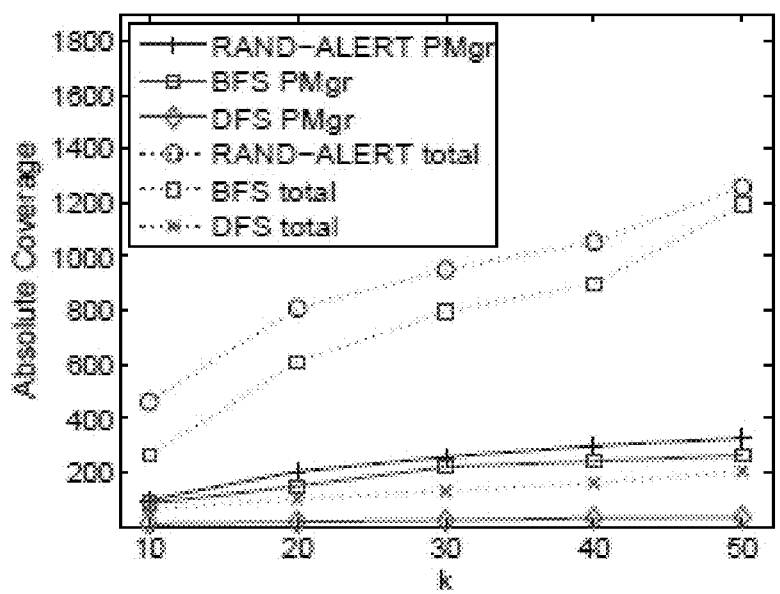
Figure 3.4

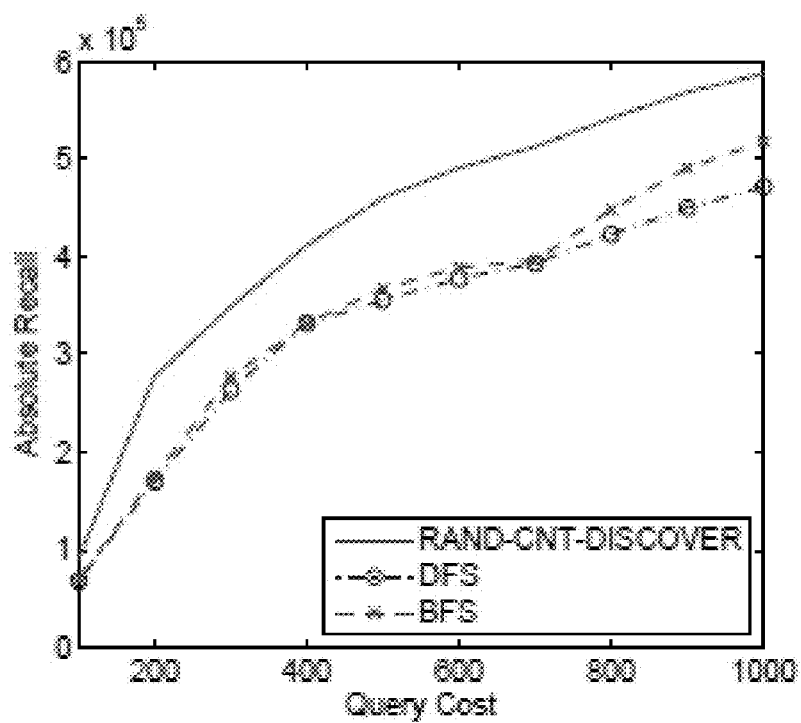
Figure 3.5
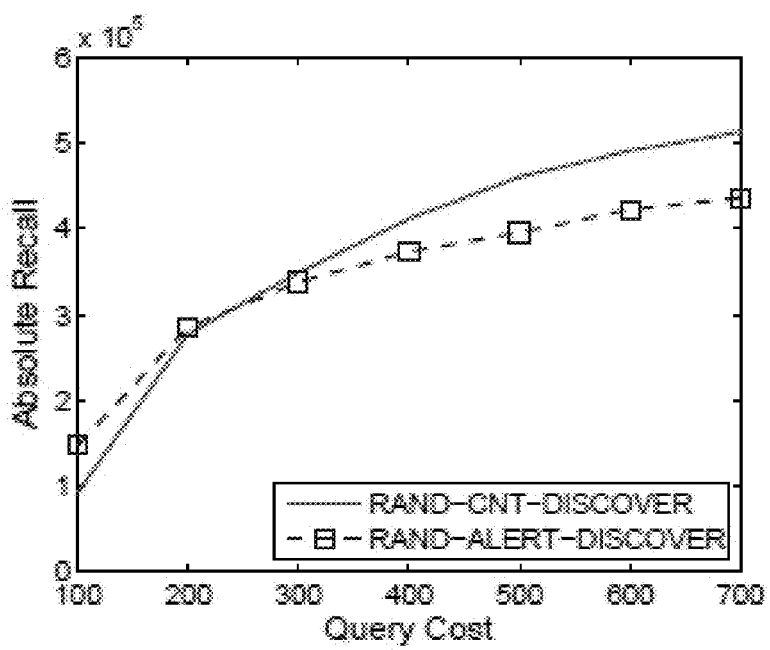
Figure 3.6

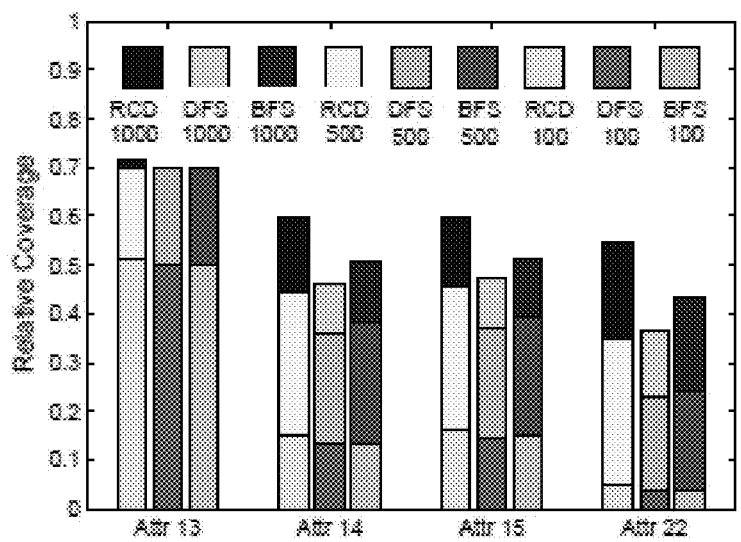
Figure 3.7
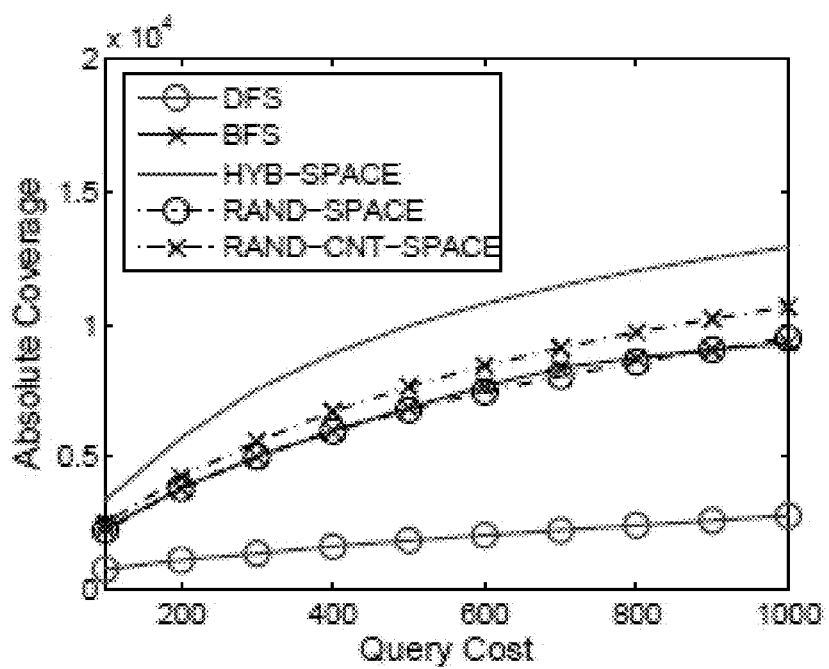
Figure 3.8

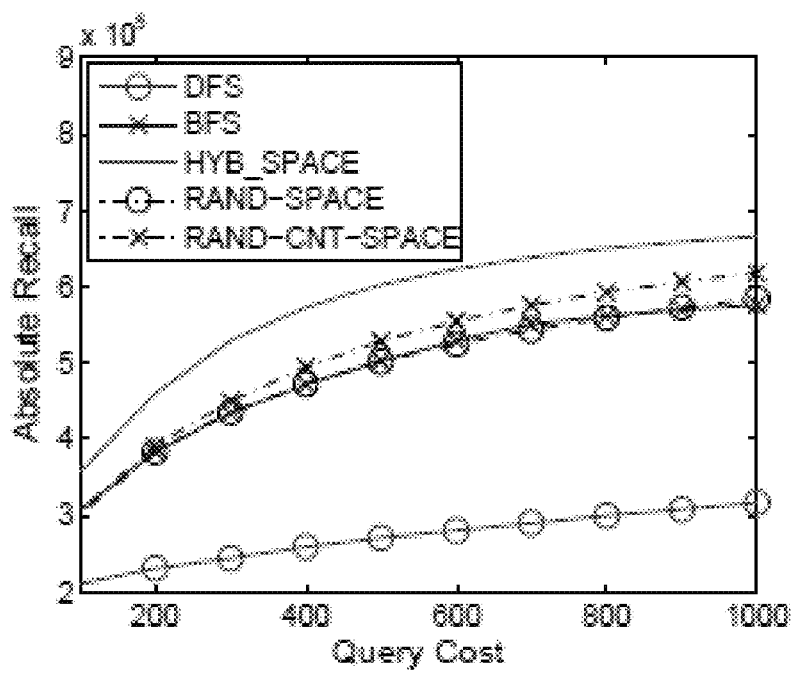
Figure 3.9
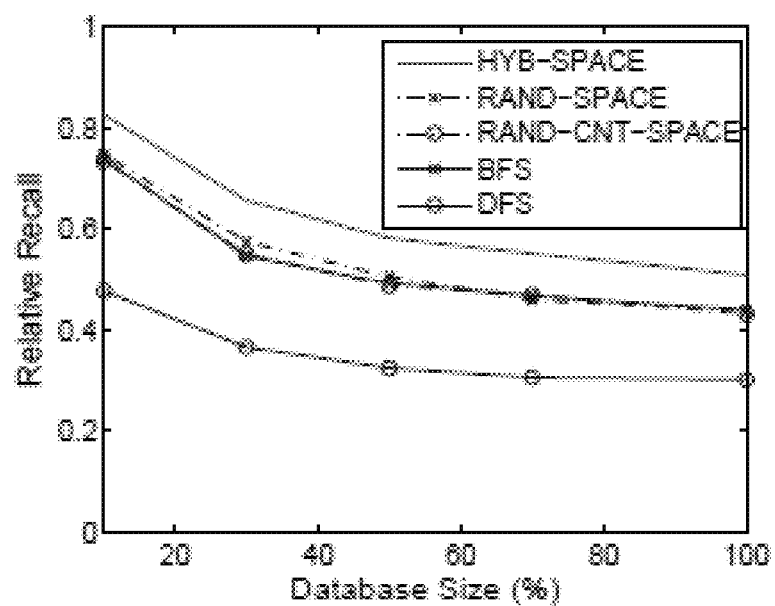
Figure 3.10

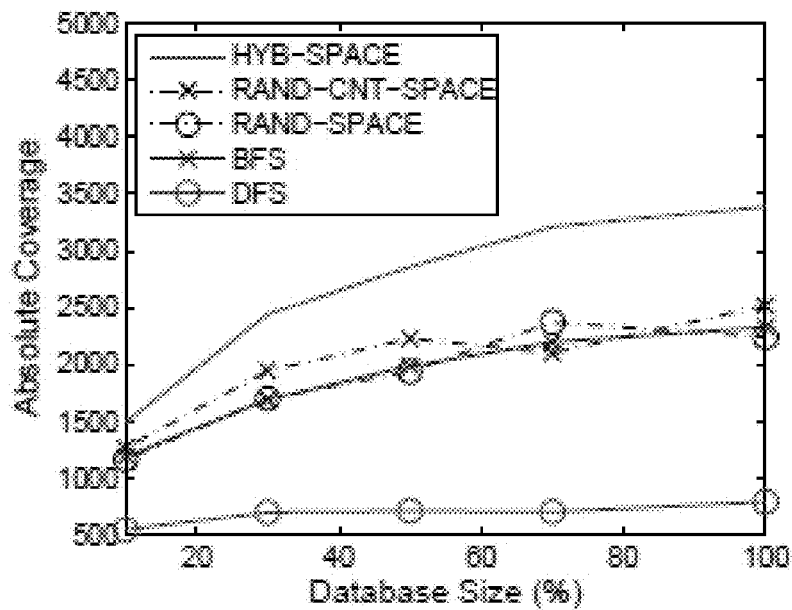
Figure 3.11
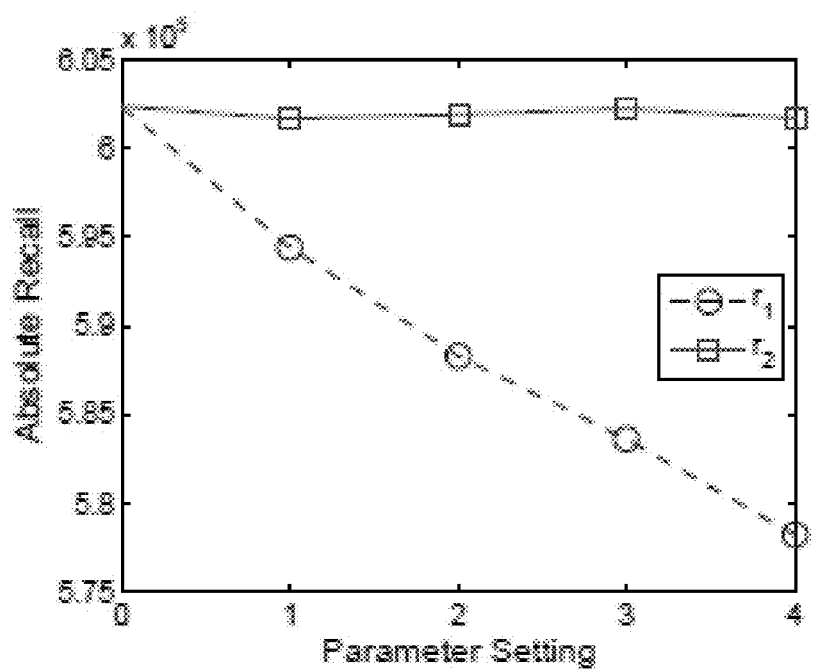
Figure 3.12

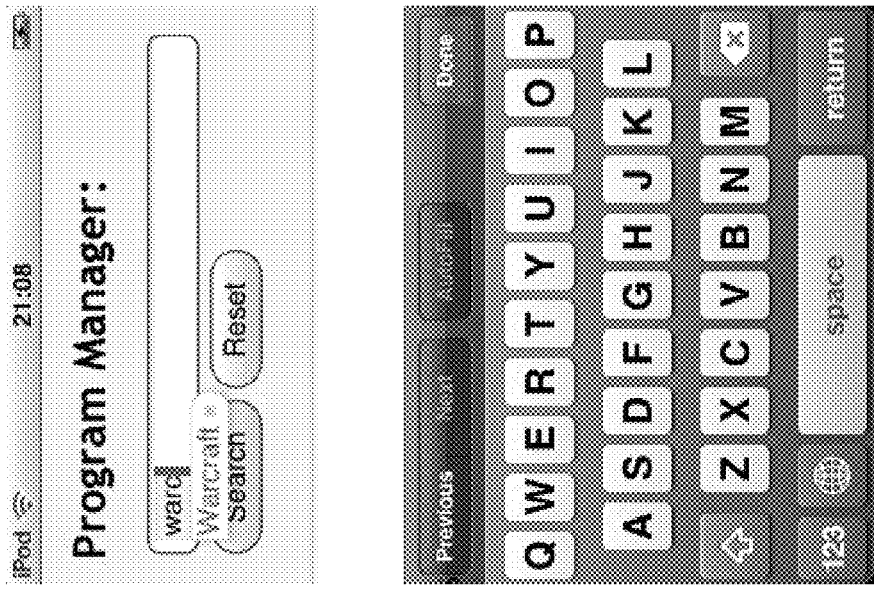
FIGURE 4.1B
PRIOR ART
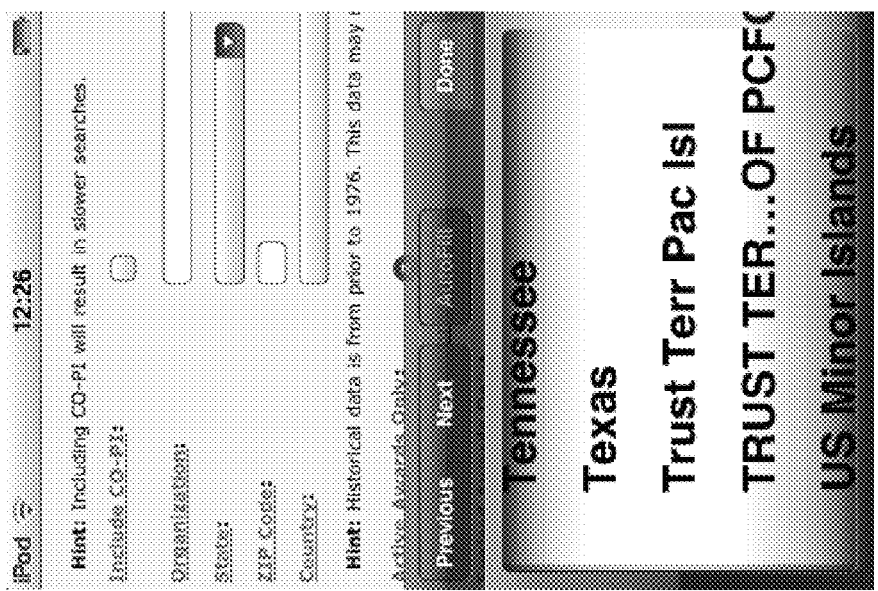
FIGURE 4.1 A
PRIOR ART

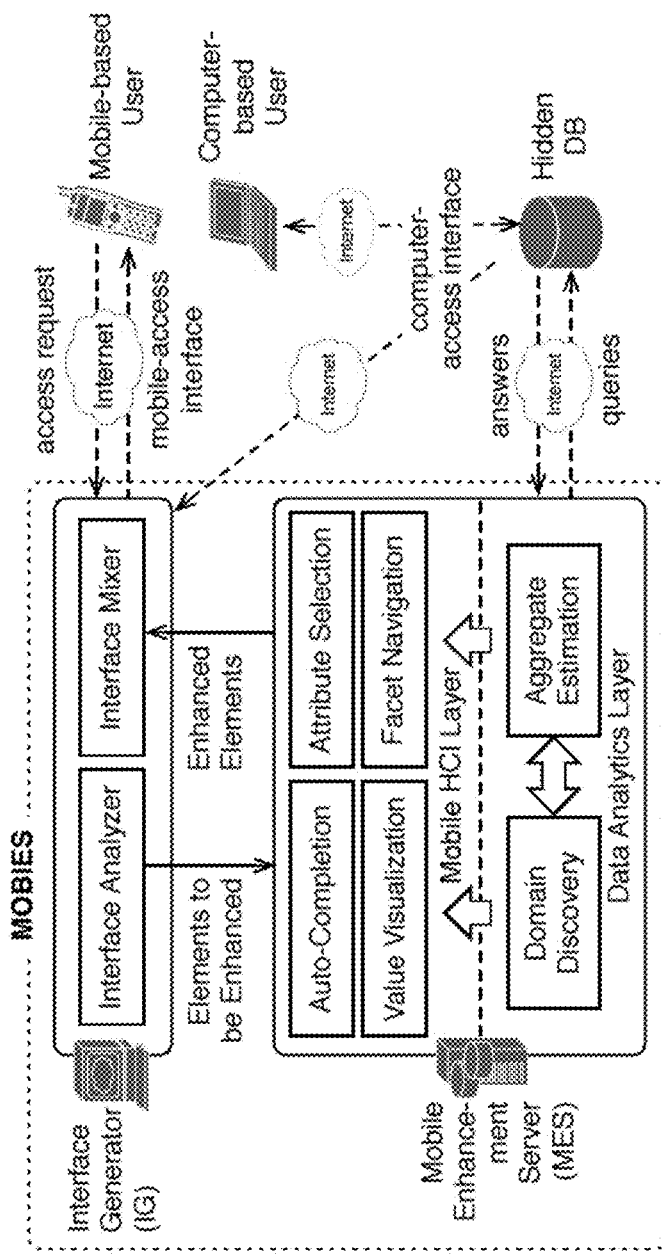
FIGURE 4.2

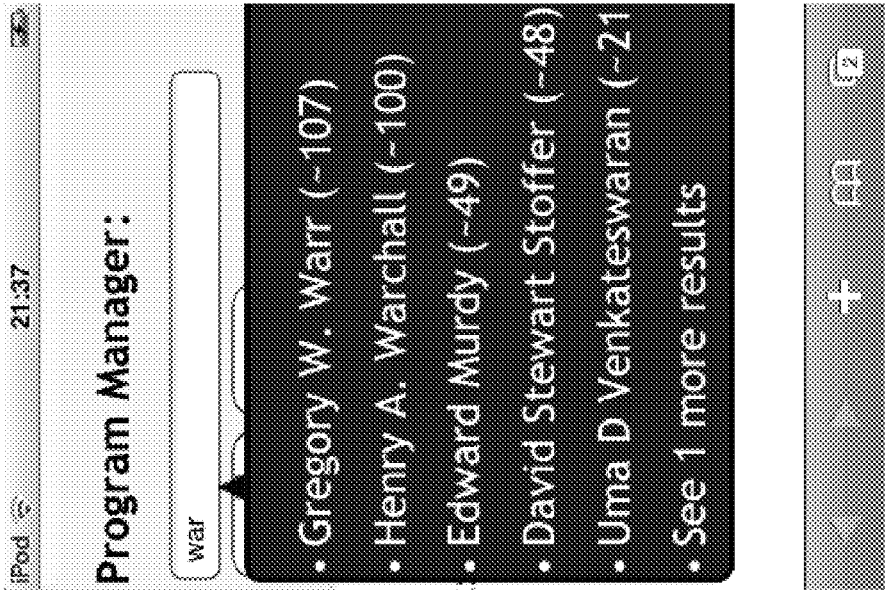
FIGURE 4.3B
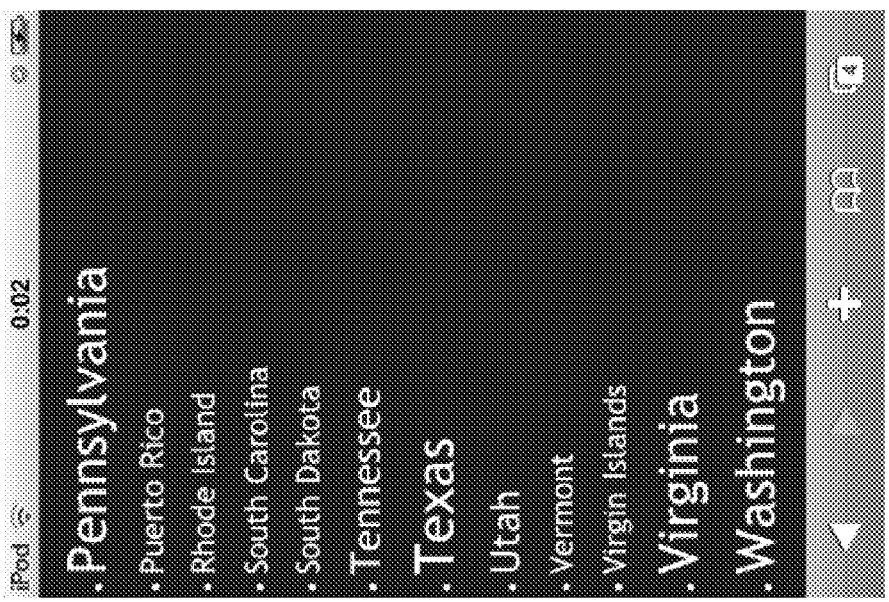
FIGURE 4.3A

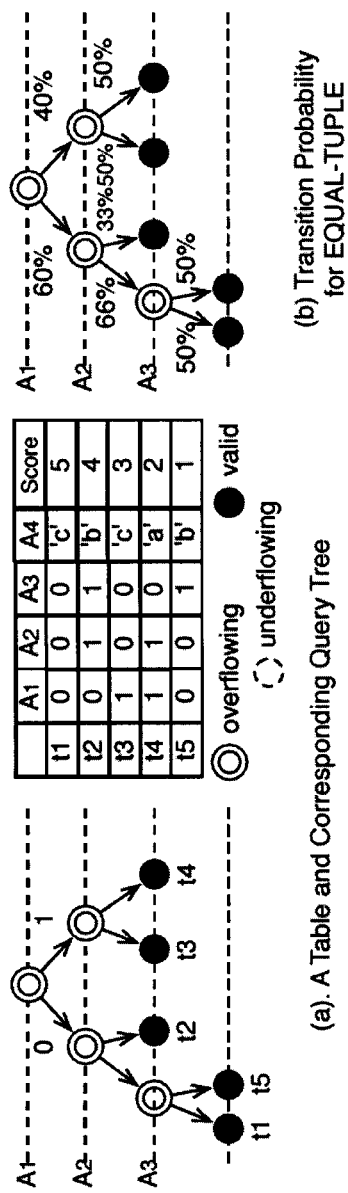
FIGURE 4.4

FIGURE 4.5

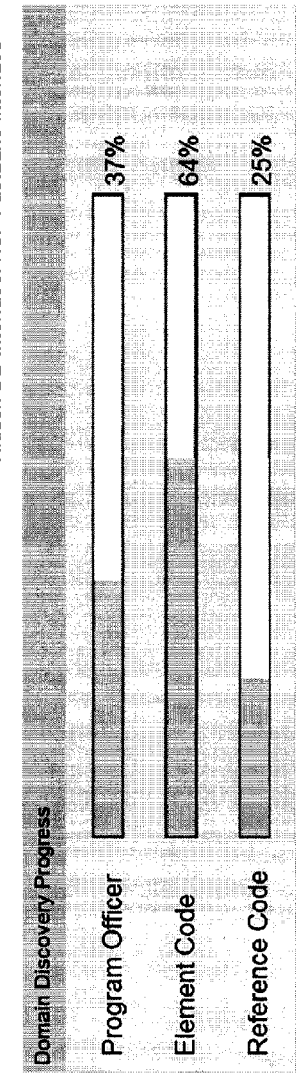
FIGURE 4.6A
FIGURE 4.6B

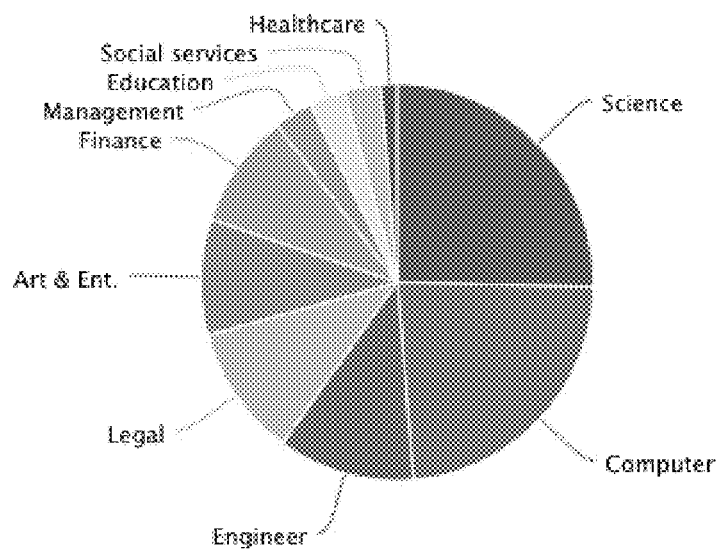
Figure 5.1. Estimated Occupation Distribution of Online Users Interested in Mathematica

US 9,244,976 B1

JUST-IN-TIME ANALYTICS ON LARGE FILE SYSTEMS AND HIDDEN DATABASES

CROSS-REFERENCE TO RELATED APPLICATIONS

This application claims priority to U.S. Provisional Patent Application No. 61/445,272, filed Feb. 22, 2011, and is a continuation-in-part of U.S. patent application Ser. No. 13/328,810, filed Dec. 16, 2011, which claims priority to U.S. Provisional Patent Application No. 61/423,939, filed Dec. 16, 2010. The entire contents of those applications are incorporated herein by reference.

GOVERNMENT LICENSE RIGHTS

This invention was made with Government support under Grant/Contract No. NSF IIS-0845644 and NSF CNS-0915834 awarded by the National Science Foundation. The Government has certain rights in this invention.

BACKGROUND OF THE INVENTION

1. Field of the Invention

Exemplary embodiments of the present invention are directed to enhancing interfaces for accessing hidden databases, such as mobile-access interfaces to forms.

2. Description of the Related Art

Today a file system with billions of files, millions of directories and petabytes of storage is no longer an exception [32]. As file systems grow, users and administrators are increasingly keen to perform complex queries [40], [50], such as "How many files have been updated since ten days ago?", and "Which are the top five largest files that belong to John?". The first is an example of aggregate queries which provide a high-level summary of all or part of the file system, while the second is top-k queries which locate the k files and/or directories that have the highest score according to a scoring function. Fast processing of aggregate and top-k queries are often needed by applications that require just-in-time analytics over large file systems, such as data management, archiving, etc. The just-in-time requirement is defined by two properties: (1) file-system analytics must be completed with a small access cost—i.e., after accessing only a small percentage of directories/files in the system (in order to ensure efficiency), and (2) the analyzer holds no prior knowledge (e.g., pre-processing results) of the file system being analyzed. For example, in order for a librarian to determine how to build an image archive from an external storage media (e.g., a Blue-ray disc), he/she may have to first estimate the total size of picture files stored on the external media—the librarian needs to complete data analytics quickly, over an alien file system that has never been seen before.

Unfortunately, hierarchical file systems (e.g., ext3 and NTFS) are not well equipped for the task of just-in-time analytics [46]. The deficiency is in general due to the lack of a global view (i.e., high-level statistics) of metadata information (e.g., size, creation, access and modification time). For efficiency concerns, a hierarchical file system is usually designed to limit the update of metadata information to individual files and/or the immediately preceding directories, leading to localized views. For example, while the last modification time of an individual file is easily retrievable, the last modification time of files that belong to user John is difficult to obtain because such metadata information is not available at the global level.

Currently, there are two approaches for generating high-level statistics from a hierarchical file system, and thereby answering aggregate and top-k queries: (1) The first approach is to scan the file system upon the arrival of each query, e.g., the find command in Linux, which is inefficient for large file systems. While storage capacity increases at approximately 60% per year, storage throughput and latency have much slower improvements. Thus the amount of time required to scan an off-the-shelf hard drive or external storage media has increased significantly over time to become infeasible for just-in-time analytics. The above-mentioned image-archiving application is a typical example, as it is usually impossible to completely scan an alien Blue-ray disc efficiently. (2) The second approach is to utilize prebuilt indexes which are regularly updated [3], [7], [27], [35], [39], [43]. Many desktop search products belong to this category, e.g., Google Desktop [24] and Beagle [5].

While this approach is capable of fast query processing once the (slow) index building process is complete, it may not be suitable or applicable to many just-in-time applications. For instance, index building can be unrealistic for many applications that require just-in-time analytics over an alien file system. Even if index can be built up-front, its significant cost may not be justifiable if the index is not frequently used afterwards. Unfortunately, this is common for some large file systems, e.g., storage archives or scratch data for scientific applications scarcely require the global search function offered by the index, and may only need analytical queries to be answered infrequently (e.g., once every few days). In this case, building and updating an index is often an overkill given the high amortized cost.

There are also other limitations of maintaining an index. For example, prior work [49] has shown that even after a file has been completely removed (from both the file system and the index), the (former) existence of this file can still be inferred from the index structure. Thus, a file system owner may choose to avoid building an index for privacy concerns.

Similar to a large file system, a hidden database with billions of tuples, each defined by thousands of attributes is now common. As hidden databases grow, users and administrators are increasingly keen to perform complex queries such as aggregate and top-k queries which provide a high-level summary of all or part of the database. Fast processing of aggregate and top-k queries are often needed by applications that require just-in-time analytics over large hidden databases. Just-in-time analytics, therefore, are desirable for hidden databases as well as large file structures.

Crawling and Sampling from Hidden Databases:

There has been prior work on crawling as well as sampling hidden databases using their public search interfaces. Several papers have dealt with the problem of crawling and downloading information present in hidden text based databases [1, 8, 23]. [2, 20, 25] deal with extracting data from structured hidden databases. [11] and [24] use query based sampling methods to generate content summaries with relative and absolute word frequencies while [17, 18] uses two phase sampling method on text based interfaces. [10, 12] discuss top-k processing which considers sampling or distribution estimation over hidden sources. In [13, 14] techniques have been developed for random sampling from structured hidden databases leading to the HIDDEN-DB-SAMPLER algorithm. Techniques to thwart such sampling attempts have been developed in [15].

Sampling and Size Estimation for Search Engine's Corpse:

The increase in popularity of search engines has motivated the research community to develop techniques to discover its contents. [21, 28] studied the estimation by capture-recapture method to identify the index size of a search engine. [7] employed Monte Carlo methods to generate a near-uniform sampling from the search engine's corpus, while taking into consideration the degrees of documents and cardinalities of queries. With approximate document degrees, techniques for measuring search engine metrics were proposed in [5]. Sampling online suggestion text databases were discussed in [6] to significantly improve the service quality of search engines and to study users' search patterns.

Information Integration and Extraction for Hidden Databases:

A significant body of research has been done on information integration and extraction over deep web data sources such as hidden databases—see tutorials in [29, 32]. Nonetheless, to the best of our knowledge, the only prior work which directly tackles the attribute domain discovery problem is [25]. In particular, it proposes a crawling-based technique, the disadvantage of which has been extensively discussed in subsection 3.2.3. Much other work though is related but orthogonal to attribute domain discovery. Since there is no space to enumerate all related papers, we only list a few examples closely related to this section. Parsing and understanding web query interfaces has been extensively studied (e.g., [33, 40]). The mapping of attributes across different web interfaces has also been addressed (e.g., [36]). Also related is the work on integrating query interfaces for multiple web databases in the same topic-area (e.g., [34, 35]). This section provides results orthogonal to these existing techniques as it represents the first formal study on attribute domain discovery over hidden databases.

Data Analytics Over Hidden Databases:

There has been prior work on crawling, sampling, and aggregate estimation over the hidden web, specifically over text [6, 8] and structured [25] hidden databases and search engines [5, 21, 28]. In particular, sampling-based methods were used for generating content summaries [11, 18, 37], processing top-k queries [10], etc. Prior work (see [30] and references therein) considered sampling and aggregate estimation over structured hidden databases. A key difference between these techniques and this section is that the prior techniques assume full knowledge of all attribute domains, while this section aims to integrate domain discovery with aggregate estimation. As we demonstrated in subsection 3.6, our integrated approach significantly outperforms the direct application of previous techniques [30] after domain discovery.

Enhancement of Web Interfaces:

It is quite common for web databases to provide proprietary form-based interfaces, which may include control elements (e.g., textboxes, drop-down boxes, etc.) that allow users to enter data. For example, the NSF Fastlane Award database provides a search form (available at http://www.nsf.gov/awardsearch/tab.do?dispatch=4) having twenty-two control elements, including six drop-down boxes and nine textboxes. Although such forms are typically easy to complete using a conventional computer, such as a desktop or laptop, such forms are much more difficult to complete using smaller mobile devices, (e.g., personal data assistants (PDAs), smart phones, etc.), due to limitations such as smaller screen, limited keyboard size, touch-screen keyboard, and the like.

Although attempts have been made to address those limitations of mobile devices, those attempts have not adequately addressed all of the problems associated with accessing hidden databases via mobile devices. For example, FIGS. 1A and 1B illustrate two conventional techniques for form field input on a mobile device, which in the example is an Apple iPod Touch®. FIG. 1A illustrates the use of an enlarged spinning-wheel rendered to ease finger scrolling for the drop-down box element "PI State." Although the spinning-wheel provides for easier viewing and selection of the options from the drop-down box compared to the original web page, it also limits the number of options displayable at any given time. For example, in the the NSF FastLane form, there are seventy-four selectable values for the "PI State" drop-down box, which could require a mobile device user to perform a large number of screen swipes to select a value that is lower in the alphabet, such as "Tennessee" or "Texas." Furthermore, a close investigation of the database reveals that the popularities of selectable values may differ significantly. For instance, a search on a value such as "US Minor Islands" and "Palau" returns no tuples, whereas a search on a value such as "Pennsylvania" or "Texas" returns over 2000 tuples.

FIG. 1B is a screen shot of an auto-complete suggestion technique for a textbox. As illustrated in FIG. 1B, the dictionary-based auto-complete suggestion for the letters "warc" is "Warcraft", which is not an appropriate suggestion for the form field "Program Manager". Instead, the form field is requesting the entry of a person's name.

SUMMARY OF THE INVENTION

User interests can often be sufficiently satisfied by approximate (i.e., statistically accurate) answers. The just-in-time sampling-based system is provided that can, after consuming a small number of disk accesses, produce extremely accurate answers for a broad class of aggregate and top-k queries over a file system without the requirement of any prior knowledge. The system is efficient, accurate and scalable.

The present invention provides fast data analytics over large-scale file systems and storage devices. It removes the need of a long wait times for full scans of large-scale file systems and storage devices as well as the need for expensive pre-processing steps that would be required by an index-based approach. Other objects and advantages will also be evident.

To enable just-in-time analytics, one must be able to perform an on-the-fly processing of analytical queries, over traditional file systems that normally have insufficient metadata to support such complex queries. This is achieved by striking a balance between query answer accuracy and cost, i.e., by providing approximate (i.e., statistically accurate) answers which, with a high confidence level, reside within a close distance from the precise answer. For example, when a user wants to count the number of files in a directory (and all of its subdirectories), an approximate answer of 105,000 or 95,000, compared with the real answer of 100,000, makes little difference to the high-level knowledge desired by the user. The higher the cost a user is willing to pay for answering a query, the more accurate the answer can be.

To this end, the just-in-time query processing system produces accurate query answers based on a small number of samples (files or folders) that can be collected from a very large file system with a few disk accesses. The present system is file-system agnostic, i.e., it can be applied instantly over any new file system and work seamlessly with the tree structure of the system. The system removes the need of disk crawling and index building, providing just-in-time analytics without a priori knowledge or pre-processing of the file systems. This is desirable in situations when the metadata indexes are not available, a query is not supported by the index, or query processing is only scarcely needed.

Studies on sampling flat files, hashed files, and files generated by a relational database system (e.g., a B+-tree file)

started more than 20 years ago—see survey [1.42]- and were followed by a myriad of work on database sampling for approximate query processing in decision support systems—see tutorials [1.4], [1.16], [1.23]. A wide variety of sampling techniques, e.g., simple random sampling [1.41], stratified [1.10], reservoir [1.51] and cluster sampling [1.11], have been used. Nonetheless, sampling has not been used to support efficient aggregate and top-k query processing over a large hierarchical file system, i.e., one with numerous files organized in a complex folder structure (tree-like or directed acyclic graph).

The present invention includes two algorithms, FS_Agg and FS_TopK, for the approximate processing of aggregate and top-k queries, respectively. For just-in-time analytics over very large file systems, a random descent technique is provided for unbiased aggregate estimations and a pruning-based technique for top-k query processing. The specific characteristics of real-world file systems have been used to derive the corresponding enhancements to the present invention. In particular, according to the distribution of files in real-world file systems, a high-level crawling technique is provided to significantly reduce the error of query processing. Based on an analysis of accuracy and efficiency for the descent process, a breadth-first implementation is utilized to reduce both error and overhead. The system can be utilized, for instance, over both real-world (e.g., NTFS, NFS, Plan 9) and synthetic file systems and provide very reliable results—e.g., 90% accuracy at 20% cost. Furthermore, the invention is scalable to one billion files and millions of directories. Exemplary embodiments of the present invention employ data analytics to overcome the above-identified and other deficiencies of conventional techniques for interfaces used for completing form fields. Specifically, for drop-down boxes, exemplary embodiments of the present invention analyze the selection options in order to eliminate options that need not be displayed (e.g., when selection of those options will return an empty search), and to highlight other options based on popularity. Additionally, for textboxes, exemplary embodiments of the present invention analyze the form field to identify the type of input being requested so that appropriate auto-complete suggestions are provided.

We now briefly explain how the just-in-time technology can be readily used over a web database to obtain aggregate estimations. First, we note the similarity between the access interfaces of file systems and web databases: both are extremely restrictive interfaces that only allow a specific type of queries. For file systems, the queries are limited to a drill-down of the tree structure. For web databases, the queries are usually limited to a conjunctive query—i.e., a user specifies the desired value for one or a few attributes, and the system responses with a number of records matching all the user specified conditions (subject to fuzzy search allowances that may be enabled by the web database).

To apply the just-in-time technology to estimating aggregates over a web database, a key observation is that we can "translate" any file-access query on a file system to a record-search query on a web database. To understand how, consider each level of the file system as an attribute on the web database. We denote the i-th level as attribute Ai. Then, a file system query, e.g., /usr/X11/bin, can be translated to a web database query SELECT * FROM D WHERE A1=usr AND A2=X11 AND A3=bin, which, given its conjunctive form, can be readily issued through the web interface of the database. One can see that the reverse mapping also holds—i.e., given any conjunctive query supported by the database, one can always construct a file system tree (by treating each attribute as a separate level in the tree) and generate the equivalent file-system query.

As such, we can deploy the just-in-time analytics technology over a web database by first generating a query plan according to the tree structure, and then mapping all queries in the plan to queries over the web database. After issuing these queries and processing their results in the same way as in the file-system-version of just-in-time analytics, we can generate accurate aggregate estimations over web databases.

For each hidden database supported by an exemplary embodiment of the present invention, the present invention issues a small number of search queries through the original form-based interfaces to retrieve the analytical information required for mobile interface construction. Then, the present invention constructs a mobile-access interface based on the retrieved information, and makes the mobile-access interface available to mobile users.

To ensure responsiveness, the present invention requires a pre-processing stage to calculate the data analytics by sampling. Each constructed interface is updated periodically to synchronize with the databases. The present invention provides a generic solution in that the support for a hidden database can be easily added with minimal human intervention.

Other objects, advantages and novel features of the present invention will become apparent from the following detailed description of the invention when considered in conjunction with the accompanying drawings.

BRIEF DESCRIPTION OF THE DRAWINGS

FIG. 1.1 is a block diagram of the system architecture in accordance with a preferred embodiment of the invention;

FIG. 1.2 is a tree-like structure showing random descents;

FIG. 1.3 is a plot showing the variance approximation for two files systems, (a) NTFS and (b) Plan 9 (real and sample variances are overlapped when the number of descents is sufficiently large);

FIGS. 1.4(a), (b) are box plots of accuracy and cost;

FIG. 1.5(a) shows accuracy and cost of aggregate queries under different settings of the input parameters (label 3-3 stands for h of 3 and $s_{min}$ of 3, 3-6 for h of 3 and $s_{min}$ of 6, etc., while $p_{sel}$ is 50% for all cases;

FIG. 1.5(b) shows query accuracy vs. runtime in seconds;

FIGS. 1.6(a), (b) are plots of accuracy and cost of queries;

FIGS. 1.7(a), (b) are plots of query accuracy and time for Basic and FS_Agg;

FIGS. 1.8(a), (b) are plots showing distributed queries; and

FIGS. 1.9(a), (b) are plots showing accuracy and cost of Top-k queries on file size.

FIG. 2.1 is a query tree for the running example discussed in section 2 below;

FIG. 2.2 includes pseudocode for the BOOL-UNBIASED-SIZE algorithm discussed in section 2 below;

FIG. 2.3 illustrates an example of Smart Backtracking;

FIG. 2.4 illustrates a worst-case scenario for the BOOL-UNBIASED-SIZE estimation;

FIG. 2.5 illustrates an example of Tree-based Partitioning;

FIGS. 2.6-2.19 are charts displaying the experimental results discussed in subsection 2.6 below; and FIGS. 3.1-3.12 are charts displaying the experimental results discussed in subsection 3.6 below;

FIG. 4.1A is a screen shot of spinning-wheel for selecting a drop-down box element of a form;

FIG. 4.1B is a screen shot of an auto-complete suggestion for a textbox;

FIG. 4.2 is a block diagram of an exemplary architecture in accordance with an embodiment of the present invention;

FIG. 4.3A is a screen shot of selection for a drop-down box element of a form with highlighted selections and omission of certain selections in accordance with exemplary embodiments of the present invention;

FIG. 4.3B is a screen shot of an auto-complete suggestion for a textbox in accordance with exemplary embodiments of the present invention;

FIGS. 4.4A and 4.4B illustrate exemplary query trees for a hidden database D with 5 tuples;

FIGS. 4.5 illustrates an exemplary configuration panel in accordance with the present invention;

FIGS. 4.6A-4.6B illustrate exemplary configuration controls in accordance with the present invention;

FIG. 5.1 illustrates an estimated occupation distribution of online users interested in Mathematica in accordance with an embodiment of the present invention.

DETAILED DESCRIPTION OF THE PREFERRED EMBODIMENTS

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

The present invention is a system and method for estimating aggregates of a web database. The invention builds on the concept of estimating aggregates of large file systems, which was presented in the parent application Ser. No. 13/328,810. Section 1 of the present description describes the techniques for performing just-in-time analytics on large file systems in accordance with the '810 application and "Just-In-Time Analytics on Large File Systems," FAST 2011—USENIX Conference on File and Storage Technologies by H. Huang et al. Further to the present invention, those techniques are employed to perform just-in-time analytics on hidden databases such as web databases. Section 2 describes techniques for achieving highly accurate aggregate query estimations over hidden databases in accordance with "Unbiased Estimation of Size and Other Aggregates Over Hidden Web Databases," SIGMOD '10, Jun. 6-11, 2010 by A. Dasgupta et al. Section 3 describes techniques for performing attribute domain discovery for hidden web databases in accordance with "Attribute Domain Discovery for Hidden Web Databases," SIGMOD '11, Jun. 12-16, 2011, by X. Jin et al. Section 4 describes an application of aggregate query estimation and domain discovery to presenting an enhanced web interface on a mobile device for a hidden database in accordance with MOBIES: Mobile-Interface Enhancement Service for Hidden Web Database," SIGMOD '11, Jun. 12-16, 2011, by X. Jin et al. And, Section 5 describes the use of just-in-time analytics in conjunction with inference technology to estimate information about attributes in addition to those attributes for which we perform aggregate query estimation. The entire contents of the papers noted here are incorporated herein by reference.

1. Just-in-Time Analytics on Large File Systems and Hidden Databases

The analytical queries will be discussed, i.e., aggregate and top-k ones, with respect to non-limiting illustrative examples of the invention.

1.1 Aggregate Queries

In general, aggregate queries are of the form SELECT AGGR(T) FROM D WHERE Selection Condition, where D is a file system or storage device, T is the target piece of information, which may be a metadata attribute (e.g., size, timestamp) of a file or a directory, AGGR is the aggregate function (e.g., COUNT, SUM, AVG), and Selection Condition specifies which files and/or directories are of interest. First, consider a system administrator who is interested in the total number of files in the system. In this case, the aggregate query that the administrator would like to issue can be expressed as:

Q1: SELECT COUNT(files) FROM filesystem;

The operating system provides tools (e.g., Linux's find and Window's dir) to gather statistics for answering such a query. However, because each directory only maintains its local metadata, the operating system has to recursively scan the metadata portion of the file system (e.g., the Master File Table for NTFS), which may lead to a longer running time. Further, the administrator may be interested in knowing the total size of various types of document files, e.g., Q2: SELECT SUM(file.size) FROM filesystem WHERE file.extension IN {'txt', 'doc'};

If the administrator wants to compute the average size of all exe files from user John, the query becomes:

Q3: SELECT AVG(file.size) FROM filesystem WHERE file.extension='exe' AND file.owner='John';

Aggregate queries can also be more complex. The following example shows a nested aggregate query for scientific computing applications. Suppose that each directory corresponds to a sensor and contains a number of files corresponding to the sensor readings received at different times. A physicist may want to count the number of sensors that has received at least one reading during the last 12 hours:

Q4: SELECT COUNT(directories) FROM filesystem WHERE EXISTS (SELECT * FROM filesystem WHERE file.dirname=directory.name AND file.mtime BETWEEN (now-12 hours) AND now);

1.2 Top-k Queries

Top-k queries are in the form SELECT TOP k FROM D WHERE Selection Condition ORDER BY T DESCENDING/ASCENDING, where T is the scoring function based on which the top-k files or directories are selected. For example, a system administrator may want to select the 100 largest files:

Q5: SELECT TOP 100 files FROM filesystem ORDER BY file.size DESCENDING;

Another example is to find the ten most recently created directories that were modified yesterday:

Q6: SELECT TOP 10 directories FROM filesystem WHERE directory.mtime BETWEEN (now-24 hours) AND now ORDER BY directory.ctime DESCENDING;

To approximately answer a top-k query, one shall return a list of k items that share a large percentage of common ones with the precise top-k list. Current operating systems and storage devices do not provide APIs which directly support the above-defined aggregate and top-k queries.

The objective of just-in-time analytics over File Systems of the present invention, is to enable the efficient approximate processing of aggregate and top-k queries over a file system by using the file/directory access APIs provided by the operating system. To complete this, the efficiency and accuracy of query processing must be measured. For ease of description without limitation to the invention, the query efficiency is measured in two metrics: 1) query time, i.e., the runtime of query processing, and 2) query cost, i.e., the ratio of the number of directories visited by the present system to that of crawling the file system (i.e., the total number of directories in the system). For purposes of this illustration, it is assumed that one disk access is required for reading a new directory (of course, the invention can be utilized with any suitable systems, and can provide multiple disk accesses for reading one directory) without knowing the underlying distribution of files in the system. Thus, the query cost approximates the number of disk accesses required by the system. The two metrics, query time and cost, are positively correlated, i.e., the higher the query cost is, more directories the algorithm has to sample, leading to a longer runtime.

While the efficiency measures are generic to both aggregate and top-k query processing, the measures for query accuracy are different. For aggregate queries, the query accuracy is the relative error of the approximate answer apx compared with the precise one ans—i.e., |apx−ans|/|ans|. For top-k queries, the accuracy is the percentage of items that are common in the approximate and precise top-k lists. The accuracy level required for approximate query processing depends on the intended application.

1.3 System Architecture

In accordance with a non-limiting example of FIG. 1.1, the present invention has the following three properties: 1) scalability—the system 5 should work on file systems consisting of thousands to billions of files. It should also support local file systems 7 as well as distributed file systems which cover thousands of machines (i.e., local components 10) in a large organization. 2) accuracy—the system 5 should provide high accuracy for a large class of aggregate and top-k queries. 3) efficiency—the system 5 should minimize both the number of disk accesses and the run time. To this end, the system 5 features a two-level architecture which is depicted in FIG. 1.1. The lower level consists of local components 10 running independently to provide just-in-time analytics over the local file system 7. The upper level is a global component 20 which manages the execution of the local components 10 to produce global query answers.

As shown in FIG. 1.1, each local component 10 of the system 5 has three primary modules: a sampler 12 which draws samples from the local file system 7, a calculator 14 which estimates local query answers based on the samples, and a history module 16 which saves the historically issued queries and their answers. The main process of (approximate) query processing is handled by the sampler 12 and the calculator 14. Note that both modules 12, 14 can be launched in an iterative fashion (e.g., by taking a sample and re-calculating) to achieve a desired level of tradeoff between accuracy and cost. To determine whether to collect more samples to refine the estimation, the user-determined stopping condition can be specified on either accuracy or cost—e.g., an upper bound on the run time or the estimation variance. If an upper bound on the estimation variance is specified, the variance can be approximated with the sample variance after finite-population correction [1.15].

The history module 16 is designed to reduce the cost of sampling. It stores the previous estimations (generated by the sampler 12 and the calculator 14) over parts (e.g., subtrees) of the file system. The idea is that the sampler 12 (in future executions) can leverage the history to limit the search space to the previously unexplored part of the file system, unless it determines that the history is obsolete (e.g., according to a pre-defined validity period). Note that the history is continuously updated by the sampler 12 and the calculator 14 to include newly discovered directories and to update the existing estimations. The local history module 16 stores local history information on query and samples, while the global history module 22 stores global history information. A global system can have tens or hundreds of thousands of local components 10.

To support query processing over a distributed file system, the system 5 includes a global component 20 which manages the local components 10 for individual file systems. Here it is assumed that there exists a directory service which can be utilized by the system 5 to communicate with the distributed machines (i.e., local components 10). Note that to answer a global query, it is not necessary for the system 5 to sample every local file system 7, especially when there is a large number of them. A simple approach is for the global component 20 to choose a small number of file systems uniformly at random and then run the local components 10 over these selected systems. Based on the local results, the global calculator (which can be implemented as part of the history module 22) can estimate an aggregate result for the global system.

The local component 10 on each local file system 7 works independently, requiring neither synchronization nor communication (with each other). This makes the system 5 highly scalable to a distributed system. For example, in the event where a local system 10 becomes unavailable, busy, or takes a considerable amount of time for response, another local component 10 can be selected as a replacement, making the overall system 5 resilient to system and network faults, which are the norm in a distributed environment.

The system 5 preferably includes a computer processor or processing platform that is capable of performing the functions and operations of the invention including the algorithms (e.g., FS_Agg and FS_TopK). The computer processor or processing platform preferably includes an input device for receiving input form a user to execute the functions and operations, and it is preferably in electronic data communication with the large file system on which those analytics are performed, such as via a secured network connection, by reading and/or writing to/from a disk in a disk drive, or by other suitable electronic data exchange mechanism. The system 5 can be implemented on a website, over a network, or on a standalone computer. All or parts of those algorithms and/or file systems can be stored on or read from a memory, computer-readable medium, or other suitable storage device, such as a memory stick, downloadable file, or CD Rom.

For instance, the sampler 12 and calculator 14 can be implemented by one or more computer processors, the history module 16 can be stored at a cached in memory and the full content can be saved in memory. The local component 10 can be locally or remotely located with respect to the local file system 7. In addition, the calculator 14 can implement the operations described below. And, information communicated from the local components 10 to the global server 20 includes results from the calculation and/or sample information.

The following is an example of how the architecture shown in FIG. 1.1 can be used for mining web databases. Consider a system which draws aggregates from a large number of data sources on the web. As shown in FIG. 1.1, we dedicate one local component 10 (or analytics server or process) for each local database 7. For each local component 10, we have a sampler 12 that draws samples from the local database according to an input probability distribution. Initially, we have a pre-determined distribution as the input distribution. Then, based on the samples drawn from the local database, as well as the historic data (stored in the history module 16) from the local database, the calculator 14 of the local component 10 estimates big-picture aggregates from the local database, and also determines the best sampling distribution for the sampler to follow in th subsequent operations. The samples drawn so far are collected by the history module 16.

Similar to the local component 10 level, the global component 20 level uses the aggregate estimations reported by the local components to generate global big-picture aggregate estimates. Again, the global component 20 may adjust the workload of each local component 10 according to the current estimation (e.g., the local components 10 which report anomalous results may be asked to collect more samples), and all the aggregates collected (or generated so far) are stored in the global history module 22.

1.4 Aggregate Query Processing

This section describes FS_Agg, which is the algorithm for processing aggregate queries. A vanilla algorithm, FS_Agg_Basic, illustrates the main idea of aggregate estimation without bias through a random descent process within a file system. To make the vanilla algorithm practical over very large file systems, high-level crawling leverages the special properties of a file system to reduce the standard error of estimation, and breadth-first implementation improves both accuracy and efficiency of query processing. All three techniques are then combined to produce FS_Agg.

1.4.1 FS_Agg_Basic

In general, the folder organization of a file system can be considered as a tree or a directed acyclic graph (DAG), depending on whether the file system allows hard links to the same file. The random descent process discussed below can be applied to both cases with little change. For the ease of understanding, the case of tree-like folder structure is examined first, and then a simple extension to DAG is discussed at the end of this subsection.

FIG. 1.2 depicts a tree structure with root corresponding to the root directory of a file system, which we shall use as a running non-limiting example of the invention for ease of description. There are two types of nodes in the tree: folders (directories) and files. A file is always a leaf node. The children of a folder consist of all subfolders and files in the folder. The branches coming out of a folder node are called sub-folder-branches and file-branches, respectively, according to their destination type. A folder with no subfolder-branches is referred to here as a leaf-folder. Note that this differs from a leaf in the tree, which can be either a file or a folder containing neither subfolder nor file. The random descent process starts from the root and ends at a leaf-folder. At each node, a subfolder branch of the node is chosen uniformly at random for further exploration. During the descent process, all file branches encountered at each node along the path are evaluated, and an aggregate estimation is generated based on these file branches.

As a non-limiting illustration of the invention, consider an example of estimating the COUNT of all files in the system. At the beginning of random descent, the root is accessed by the sampler 12 to obtain the number of its file- and subfolder-branches $f_0$ and $s_0$, respectively, and record them as the evaluation for the root. Then, a subfolder-branch is randomly chosen for further descent, and this process is repeated until the system arrives at a folder with no subfolder. Suppose that the descent process continues for h (h≥1) steps, and the numbers recorded for the i-th step (i∈[1,h]) is $f_i$ and $s_i$, for the number of file- and subfolder-branches, respectively. Note that $s_h$=0 because each descent ends at a leaf-folder. The COUNT of all files is estimated as equation (1):

$$\tilde{n} = \sum_{i=0}^{h}\left(f_i \cdot \prod_{j=0}^{i-1} s_j\right), \quad (1)$$

WHERE $\Pi_{j=0}^{i-1} s_j$ is assumed to be 1 when i=0.

Two examples of the random descent process are shown in FIG. 1.2 and marked by heavy solid lines and dashed lines, respectively. The solid descent example starts at the root level, and the system randomly decides from amongst folders a, c, d, m and has chosen to examine folder a, then examines folder b. This produces $\langle f_0, f_1, f_2 \rangle = \langle 2, 2, 2 \rangle$, whereby there are 2 files (6, 7) at the root level, 2 files (3, 4) at the first sub-folder level (for folder a), and 2 files (1, 2) at the second sub-folder level (for folder b). This also produces $\langle s_0, s_1, s_2 \rangle = \langle 4, 1, 0 \rangle$, whereby there are 4 sub-folder branches (a, c, d, m) at the root level, 1 sub-folder branch (b) at the first sub-folder level, and zero subfolder branches at the second sub-folder level. Using equation (1), this leads to an estimation of 2+8+8=18. The sampled values (i.e., the 2, 2, 2 and the 4, 1, 0) are drawn by the sampler 12, the estimation is determined by the calculator 14 and stored in the history module 16. The dashed line descent example produces $\langle f_0, f_1, f_2 \rangle = \langle 2, 0, 1 \rangle$ and $\langle s_0, s_1, s_2 \rangle = \langle 4, 2, 0 \rangle$, leading to an estimation of 2+0+8=10. As shown in the figure, there an actual total of 11 files in the structure. By examining a single random descent through to a leaf folder, the solid line example estimates that there are a total of 18 files in the tree structure, and the dashed line example estimates that there are a total of 10 files in the tree structure.

Once the descent arrives at a leaf folder (folder b in the solid line example, and folder e in the dashed line example), the process ends. The random descent process need only be performed a single time, with only one folder being selected at a given level of the architecture. However, the process can be repeated multiple times (by restarting from the root) to produce a more accurate result (by taking the average of estimations generated by all descents). Thus, averaging the two examples provides an estimate of 14 total files ((18+10)/2). A random descent removes any user bias and normalizes the probability to obtain consistency throughout file system architecture.

The estimation produced by each random descent process is completely unbiased—i.e., the expected value of the estimation is exactly equal to the total number of files in the system. To understand why, consider the total number of files at the i-th level (with root being Level 0) of the tree (e.g., Files 1 and 2 in FIG. 1.2 are at Level 3), denoted by $F_i$. According to the definition of a tree, each i-level file belongs to one and only one folder at Level i−1. For each (i−1)-level folder $v_{i-1}$, let $|v_{i-1}|$ and $p(v_{i-1})$ be the number of (i-level) files in $v_{i-1}$ and the probability for $v_{i-1}$ to be reached in the random descent process, respectively. As shown by equation (2), $|v_{i-1}|/p(v_{i-1})$ is an unbiased estimation for F(i) because $$E\left(\frac{|v_{i-1}|}{p(v_{i-1})}\right) = \sum_{v_{i-1}} \left(p(v_{i-1}) \cdot \frac{|v_{i-1}|}{p(v_{i-1})}\right) = F_i. \quad (2)$$

With the random descent process, the probability $p(v_{i-1})$ is shown in equation (3):

$$p(v_{i-1}) = \prod_{j=0}^{i-2} \frac{1}{s_j(v_{i-1})}, \quad (3)$$

where $s_j(v_{i-1})$ is the number of subfolder-branches for each node encountered on the path from the root to $v_{i-1}$. The estimation in equation (1) is essentially the sum of the unbiased estimations in equation (2) for all $i \in [1,m]$, where m is the maximum depth of a file. Thus, the estimation generated by the random descent is unbiased.

The unbiasedness of the random decent process completely eliminates a major component of estimation error (note that the mean square error of estimation, MSE, is the sum of bias$^2$ and variance of estimation). Reducing the other component of estimation error, i.e., estimation variance, will be discussed below.

While the above example is for estimating the COUNT of all files, the same random descent process can be used to process queries with other aggregate functions (e.g., SUM, AVG), with selection conditions (e.g., COUNT all files with extension '.JPG'), and in file systems with a DAG instead of tree structure. The only change required for all these extensions is on the computation off, which is done by the calculator 14.

For the COUNT query, $f_i$ is set to the number of files in a folder. To process a SUM query over a file metadata attribute (e.g., file size), $f_i$ is set as the SUM of such an attribute over all files in the folder (e.g., total size of all files), which is performed by the calculator 14. In the running example, consider the estimation of SUM of numbers shown on all files in FIG. 1.2. The solid and dashed random walks will return $<f_0, f_1, f_2> = <15, 7, 3>$ and $<15, 0, 5>$, respectively, leading to the same estimation of 55, which is performed by the calculator 14. The unbiasedness of such an estimation follows in analogy from the COUNT case.

A simple way to process an AVG query is to estimate the corresponding SUM and COUNT respectively, and compute AVG as SUM/COUNT. Note, however, that such estimation is no longer unbiased, because the division of two unbiased estimations is not necessarily unbiased. While an unbiased AVG estimation may be desired for certain applications, we have proved a negative result that it is impossible to answer an AVG query without bias unless one accesses the file system for almost as many as times as crawling the file system. The details are shown in Just-In-Time Analytics on Large File Systems, IEEE Transactions on Computers, H. Huang et al., Vol. 6, No. 1, March 2011, the contents of which are hereby incorporated by reference. Estimating AVG as SUM/COUNT is in general very accurate.

To process a query with selection conditions, the only change required is on the computation of $f_i$. Instead of evaluating $f_i$ over all file branches of a folder, to answer a conditional query, we only evaluate $f_i$ over the files that satisfy the selection conditions. For example, to answer a query SELECT COUNT(*) FROM Files WHERE file.extension='JPG', $f_i$ is set as the number of files under the current folder with extension JPG. Similarly, to answer "SUM(file_size) WHERE owner=John", $f_i$ is set to the SUM of sizes for all files (under the current folder) which belong to John. Due to the computation off for conditional queries, the descent process may be terminated early to further reduce the cost of sampling. Again consider the query condition of (owner=John). If the random descent reaches a folder which cannot be accessed by John, then it has to terminate immediately because of the lack of information for further descent.

Finally, for a file system featuring a DAG (instead of tree) structure, the computation of $f_i$ can be changed. Almost all DAG-enabled file systems (e.g., ext2, ext3, NTFS) provide a reference count for each file which indicates the number of links in the DAG that point to the file. (In ext2 and ext3, for example, the system provides the number of hard links for each file. Note that for soft links, those can be ignored during the descent process. Thus, they bear no impact on the final estimation.) For a file with r links, if the original algorithm discussed above is used, then the file will be counted r times in the estimation. Thus, its impact is discounted on each estimation with a factor of 1/r. For example, if the query being processed is the COUNT of all files, then the system computes $f_i = \Sigma_{j \in F}(1/r(f))$, where F is the set of files under the current folder, and r(f) is the number of links to each file f. Similarly, to estimate the SUM of all file sizes, the system computes $f_i = \Sigma_{j \in F}(size(f)/r(f))$, where size(f) is the file size of file f. With this discount factor, an unbiased estimation is maintained over a DAG file system structure.

1.4.2 Disadvantages of FS_Agg_Basic

While the estimations generated by FS_Agg_Basic is unbiased for SUM and COUNT queries, the error of an estimation comes from not only bias but also variance (i.e., standard error). A problem of FS_Agg_Basic is that it may produce a high estimation variance for file systems with an undesired distribution of files, as illustrated by the following: the variance of estimation produced by a random descent on the number of h-level files $F_h$ is in equation (4):

$$\sigma(h)^2 = \left( \sum_{v \in L_{h-1}} \left( |v|^2 \cdot \prod_{j=0}^{h-2} s_j(v) \right) \right) - F_h^2. \quad (4)$$

where $L_{h-1}$ is the set of all folders at Level h−1, $|v|$ is the number of files in a folder v, and $s_j(v)$ is the number of subfolders for the Level-j node on the path from the root to v.

Consider an (h−1)-level folder v. If the random descent reaches v, then the estimation it produces for the number of h-level files is $|v|/p(v)$, where p(v) is the probability for the random descent to reach v. Let δ(h) be the probability that a random descent terminates early before reaching a Level-(h−1) folder. Since each random descent reaches at most one Level-(h−1) folder, the estimation variance for $F_h$ is in equations (5), (6) and (7):

$$\sigma(h)^2 = \delta(h) \cdot F_h^2 + \sum_{v \in L_{h-1}} p(v) \cdot \left( \frac{|v|}{p(v)} - F_h \right)^2 \quad (5)$$

$$= \delta(h) \cdot F_h^2 + \sum_{v \in L_{h-1}} \left( \frac{|v|^2}{p(v)} - 2|v|F_h + p(v) \cdot F_h^2 \right) \quad (6)$$

$$= \left( \sum_{v \in L_{h-1}} \frac{|v|^2}{p(v)} \right) - F_h^2 \quad (7)$$

Since $p(v) = 1/\Pi_{j=0}^{h-2} s_j(v)$, the process is proved.

The existence of two types of folders may lead to an extremely high estimation variance: One type is high-level leaf-folders (i.e., "shallow" folders with no subfolders). Folder c in FIG. 1.2 is an example. To understand why such folders lead to a high variance, consider equation (7). Note that for a large h, a high-level leaf-folder (above Level-(h−1)) reduces $\Sigma_{v \in Lh-1} p(v)$ because once a random descent reaches such a folder, it will not continue to retrieve any file in Level-h (e.g., Folder c in FIG. 1.2 stops further descents for h=3 or 4). As a result, the first item in (7) becomes higher, increasing the estimation variance. For example, after removing Folder c from FIG. 1.2, the estimation variance for the number of files on Level 3 can be reduced from 24 to 9.

The other type of "ill-conditioned" folders are those deep-level folders which reside at much lower levels than others (i.e., with an extremely large h). An example is Folder j in FIG. 1.2. The key problem arising from such a folder is that the probability for it to be selected is usually extremely small, leading to an estimation much larger than the real value if the folder happens to be selected. As shown, a larger h leads to a higher $\Pi s_j(v)$, which in turn leads to a higher variance. For example, Folder j in FIG. 1.2 has $\Pi s_j(v)$=4×2×3×3=72, leading to a estimation variance of 72−1=71 for the number of files on Level 5 (which has a real value of 1).

1.4.3 FS_Agg

To reduce the estimation variance, high-level crawling and breadth-first descent can be utilized to address the two above-described problems on estimation variance, high-level leaf-folders and deep-level folders, respectively. Also, the variance generated by FS_Agg can be estimated in practice, effectively producing a confidence interval for the aggregate query answer.

High-Level Crawling is designed to eliminate the negative impact of high-level leaf-folders on estimation variance. The main idea of high-level crawling is to access all folders in the highest i levels of the tree by following all subfolder-branches of folders accessed on or above Level-(i−1). Then, the final estimation becomes an aggregate of two components: the precise value over the highest i levels and the estimated value (produced by random descents) over files below Level-i. From the design of high-level crawling that now leaf-folders in the first i levels no longer reduce p(v) for folders v below Level-i (and therefore no longer adversely affect the estimation variance). Formally, the following demonstrates the effectiveness of high-level crawling on reducing the estimation variance: if $r_0$ out of r folders crawled from the first i levels are leaf-folders, then the estimation variance produced by a random descent for the number of Level-h files $F_h$ satisfies $$\sigma_{HLC}(h)^2 \leq \frac{(r-r_0) \cdot \sigma(h)^2 - r_0 \cdot F_h^2}{r}. \quad (8)$$

Before high-level crawling is applied, if the random descent process reaches any of the leaf-folders on the first i levels, it in effect returns an estimation of 0 for the number of Level-h files. If $r_0$ out of r crawled folders are leaf-folders, the random descent process has a probability of at least $r_0/r$ to return an estimation of 0 for the number of Level-h files. According to (7), there is $$\sigma_{HLC}(h)^2 \leq \frac{(\sigma(h)^2 + F_h^2) \cdot (r - r_0)}{r} - F_h^2 \quad (9)$$

$$= \frac{(r - r_0) \cdot \sigma(h)^2 - r_0 \cdot F_h^2}{r}. \quad (10)$$

According to this, if a high-level crawling is applied over the first level in FIG. 1.2, then the estimation variance for the number of files on Level 3 is at most (3·24−1·36)/4=9. As discussed below, that the variance of estimation after removing Folder c (the only leaf-folder at the first level) is exactly 9. Thus, the bound in equation (8) is tight in this case.

Breadth-First Descent is designed to bring two advantages over FS_Agg_Basic: variance reduction and runtime improvement. Variance Reduction: breadth-first descent starts from the root of the tree. Then, at any level of the tree, it generates a set of folders to access at the next level by randomly selecting from subfolders of all folders it accesses at the current level. Any random selection process would work—as long as we know the probability for a folder to be selected, we can answer aggregate queries without bias in the same way as the original random descent process. For example, to COUNT the number of all files in the system, an unbiased estimation of the total number of files at Level i is the SUM of $|v_{i-1}|/p(v_{i-1})$ for all Level-(i−1) folders $v_{i-1}$ accessed by the breadth-first implementation, where $|v_{i-1}|$ and $p(v_{i-1})$ are the number of file-branches and the probability of selection for $v_{i-1}$, respectively.

The following random selection process is utilized in the present invention. Consider a folder accessed at the current level which has $n_0$ subfolders. From these $n_0$ subfolders, we sample without replacement $\min(n_0, \max(p_{sel} \cdot n_0, s_{min}))$ ones for access at the next level. Here $p_{sel} \in (0, 1]$ (where sel stands for selection) represents the probability of which a subfolder will be selected for sampling, and $s_{min} \geq 1$ states the minimum number of subfolders that will be sampled. Both $p_{sel}$ and $s_{min}$ are user-defined parameters, the settings for which are discussed below based on characteristics of real-world file systems.

Compared with the original random descent design, this breadth-first random selection process significantly increases the selection probability for a deep folder. Recall that with the original design, while drilling down one level down the tree, the selection probability can decrease rapidly by a factor of the fan-out (i.e., the number of subfolders) of the current folder. With breadth-first descent, on the other hand, the decrease is limited to at most a factor of $1/p_{sel}$, which can be much smaller than the fan-out when $p_{sel}$ is reasonably high (e.g., =0.5 as suggested below). As a result, the estimation generated by a deep folder becomes much smaller. Formally is the following: with breadth-first descent, the variance of estimation on the number of h-level files $F_h$ satisfies $$\sigma_{BFS}(h)^2 \leq \left( \sum_{v \in L_{h-1}} \frac{|v|^2}{p_{sel}^{h-1}} \right) - F_h^2. \quad (11)$$

From (7), $$\sigma(h)^2 = \left( \sum_{v \in L_{h-1}} \frac{|v|^2}{p(v)} \right) - F_h^2. \quad (12)$$

With breadth-first descent, the probability for the random descent process to reach a node v at Level-h is at least $p_{sel}^{h-1}$. Thus, $$\sigma_{BFS}(h)^2 \leq \left( \sum_{v \in L_{h-1}} \frac{|v|^2}{p_{sel}^{h-1}} \right) - F_h^2. \quad (13)$$

From a comparison with equation (4) that the factor of $\Pi s_j(v)$ in the original variance, which can grow to an extremely large value, is now replaced by $1/p_{sel}^{h-1}$ which can be better controlled by the system 5 to remain at a low level even when h is large.

Runtime Improvement: In the original design of FS_Agg_Basic, random descent has to be performed multiple times to reduce the estimation variance. Such multiple descents are very likely to access the same folders, especially the high-level ones. While the history of hard-drive accesses can be leveraged by caching all historic accesses in memory, such as history module 22, such repeated accesses can still take significant CPU time for in-memory look up. The breadth-first design, on the other hand, ensures that each folder is accessed at most once, reducing the runtime overhead of the present system.

Variance Produced by FS_Agg: An important issue for applying FS_Agg in practice is how to estimate the error of approximate query answers it produces. Since FS_Agg generates unbiased answers for SUM and COUNT queries, the key factor for error estimation here is an accurate computation of the variance. From (11), the variance depends on the specific structure of the file system, in particular the distribution of selection probability $p_{sel}$ for different folders. Since the sampling-based algorithm does not have a global view of the hierarchical structure, it cannot precisely compute the variance.

Fortunately, the variance can still be accurately approximated in practice. To understand how, consider first the depth-first descents used in FS_Agg_Basic. Each descent returns an independent aggregate estimation, while the average for multiple descents becomes the final approximate query answer. Let $\tilde{q}_1, \ldots, \tilde{q}_h$ be the independent estimations and $\tilde{q}=(\Sigma \tilde{q}_i)/h$ be the final answer. A simple method of variance approximation is to compute $\text{var}(\tilde{q}_1, \ldots, \tilde{q}_h)/h$, where $\text{var}(\cdot)$ is the variance of independent estimations returned by the descents. Note that if we consider a population consisting of estimations generated by all possible descents, then $\tilde{q}_1, \ldots, \tilde{q}_h$ form a sample of the population. As such, the variance computation is approximating the population variance by sample variance, which are asymptotically equal (for an increasing number of descents).

We conducted extensive experiments to verify the accuracy of such an approximation. FIG. 1.3 shows two examples for counting the total number of files in an NTFS and a Plan 9 file system, respectively. Observe from the figure that the real variance oscillates in the beginning of descents. For example, we observe at least one spike on each file system within the first 100 descents. Such a spike occurs when one descent happens to end with a deep-level file which returns an extremely large estimation, and is very likely to happen with our sampling-based technique. Nonetheless, note that the real variance converges to a small value when the number of descents is sufficiently large (e.g., >400). Also note that for two file systems after a small number of descents (about 50), the sample variance $\text{var}(\tilde{q}_1, \ldots, \tilde{q}_h)/h$ becomes an extremely accurate approximation for the real (population) variance (overlapping shown in FIG. 1.3), even during the spikes. One can thereby derive an accurate confidence interval for the query answer produced by FS_Agg_Basic.

While FS_Agg no longer performs individual depth-first descents, the idea of using sample variance to approximate population variance still applies. In particular, note that for any given level, say Level-i, of the tree structure, each folder randomly chosen by FS_Agg at Level-(i−1) produces an independent, unbiased, estimation for SUM or COUNT aggregate over all files in Level-i. Thus, the variance for an aggregate query answer over Level-i can be approximated based on the variance of estimations generated by the individual folders. The variance of final SUM or COUNT query answer (over the entire file system) can be approximated by the SUM of variances for all levels.

1.5 Top-k Query Processing

Recall that for a given file system, a top-k query is defined by two elements: the scoring function and the selection conditions. Without loss of generality, we consider a top-k query which selects k files (directories) with the highest scores. Here we focus on top-k queries without selection conditions, and consider a tree-like structure of the file system. The extensions to top-k queries with selection conditions and file systems with DAG structures follow in analogy from the same extensions for FS_Agg.

1.5.1 Main Idea

A simple way to answer a top-k query is to access every directory to find the k files with the highest scores. The objective of FS_TopK is to generate an approximate top-k list with far fewer hard-drive accesses. To do so, FS_TopK consists of the following three steps.

First, Lower-Bound Estimation: The first step uses a random descent similar to FS_Agg to generate an approximate lower bound on the k-th highest score over the entire file system (i.e., among files that satisfy the selection conditions specified in the query).

Second, Highest-Score Estimations and Tree Pruning: In the second step, we prune the tree structure of the file system according to the lower bound generated in Step 1. In particular, for each subtree, we use the results of descents to generate an upper-bound estimate on the highest score of all files in the subtree. If the estimation is smaller than the lower bound from Step 1, we remove the subtree from search space because it is unlikely to contain a top-k file. Note that in order for such a pruning process to have a low false negative rate—i.e., not to falsely remove a large number of real top-k files, a key assumption we are making here is the "locality" of scores—i.e., files with similar scores are likely to co-locate in the same directory or close by in the tree structure (the "distance" between two files generally refers to the length of the shortest path connecting the two files in the tree structure. The shorter the distance is, the "closer" the two files would be). Intuitively, the files in a directory are likely to have similar creation and update times. In some cases (e.g., images in the "My Pictures" directory, and outputs from a simulation program), the files will likely have similar sizes too. Note that the strength of this locality is heavily dependent on the type of the query and the semantics of the file system on which the query is running.

Third, Crawling of the Selected Tree: Finally, we crawl the remaining search space—i.e., the selected tree—by accessing every folder in it to locate the top-k files as the query answer. Such an answer is approximate because some real top-k files might exist in the nonselected subtrees, albeit with a small probability.

In the running example, consider a query for the top-3 files with the highest numbers shown in FIG. 1.2. Suppose that Step 1 generates a (conservative) lower bound of 8, and the highest scores estimated in Step 2 for subtrees with roots a, c, d, and m are 5, −1 (i.e., no file), 7, and 15, respectively—the details of these estimations will be discussed shortly. Then, the pruning step will remove the subtrees with roots a, c, and d, because their estimated highest scores are lower than the lower bound of 8. Thus, the final crawling step only needs to access the subtree with root of m. In this example, the algorithm would return the files identified as 8, 9, and 10, locating two top-3 files while crawling only a small fraction of the tree. Note that the file with the highest number 11 could not be located because the pruning step removes the subtree with root of d.

1.5.2 Detailed Design

The design of FS_TopK is built upon a hypothesis that the highest scores estimated in Step 2, when compared with the lower bound estimated in Step 1, can prune a large portion of the tree, significantly reducing the overhead of crawling in Step 3. In the following, we first describe the estimations of the lower bound and the highest scores in Steps 1 and 2, and then discuss the validity of the hypothesis for various types of scoring functions.

Both estimations in the two steps can be made from the order statistics [1.21] of files retrieved by the random descent process in FS_Agg. The reason is that both estimations are essentially on the order statistics of the population (i.e., all files in the system)—The lower bound in Step 1 is the k-th largest order statistics of all files, while the highest scores are on the largest order statistics of the subtrees. We refer readers to [1.21] for details of how the order statistics of a sample can be used to estimate that of the population and how accurate such estimation is.

While sampling for order statistics is a problem in its own right, for the purpose of this discussion, the following simple approach is provided which, according to real-world file system embodiments, suffices for answering top-k queries accurately and efficiently over almost all tested systems. For the lower-bound estimation in Step 1, we use the sample quantile as an estimation of the population quantile. For example, to estimate the 100-th largest score of a system with 10,000 files, we use the largest score of a 100-file sample as an estimation. Our tests show that for many practical scoring functions (which usually have a positive skew, as discussed below), the result serves as a conservative lower bound desired by FS_TopK. For the highest-score estimation in Step 2, we compute $\gamma \cdot \max(\text{sample scores})$, where $\gamma$ is a constant correction parameter. The setting of $\gamma$ captures a tradeoff between the crawling cost and the chances of finding top-k files—when a larger $\gamma$ is selected, fewer subtrees are likely be removed.

We now discuss when the hypothesis of heavy pruning is valid and when it is not. Ideally, two conditions should be satisfied for the hypothesis to hold: (1) If a subtree includes a top-k file, then it should include a (relatively) large number of highly scored files, in order for the sampling process (in Step 2) to capture one (and to thereby produce a highest-score estimation that surpasses the lower bound) with a small query cost. And (2) on the other hand, most subtrees (which do not include a top-k file) should have a maximum score significantly lower than the k-th highest score. This way, a large number of subtrees can be pruned to improve the efficiency of top-k query processing. In general, a scoring function can be constructed that satisfies both or neither of the above two conditions. We focus on a special class of scoring functions: those following a heavy-tailed distributions (i.e., its cumulative distribution function $F(\cdot)$ satisfies $\lim_{x \to \infty} e^{\lambda x}(1 - F(x)) = \infty$ for all $\lambda > 0$). Existing studies on real-world file system traces showed that many file/directory metadata attributes, which are commonly used as scoring functions, belong to this category [1.2]. For example, the distributions of file size, last modified time, creation time, etc., in the entire file system or in a particular subtree are likely to have a heavy tail on one or both extremes of the distribution.

A key intuition is that scoring functions defined as such attribute values (e.g., finding the top-k files with the maximum sizes or the latest modified time) usually satisfy both conditions: First, because of the long tail, a subtree which includes a top-k scored file is likely to include many other highly scored files too. Second, since the vast majority of subtrees have their maximum scores significantly smaller than the top-k lower bound, the pruning process is likely to be effective with such a scoring function.

We would also like to point out an "opposite" class of scoring functions for which the pruning process is not effective: the inverse of the above scoring functions—e.g., the top-k files with the smallest sizes. Such a scoring function, when used in a top-k query, selects k files from the "crowded" light-tailed side of the distribution. The pruning is less likely to be effective because many other folders may have files with similar scores, violating the second condition stated above. Fortunately, asking for top-k smallest files is not particularly useful in practice, also because of the fact that it selects from the crowded side—the answer is likely to be a large number of empty files.

1.6 Implementation and Evaluation 1.6.1 Implementation

One non-limiting illustrative embodiment of the invention includes all three algorithms (FS_Agg_Basic, FS_Agg and FS_TopK) in 1,600 lines of C code in Linux. A simulator in Matlab can complete a large number of tests within a short period of time. While the implementation was built upon the ext3 file system, the algorithms are generic to any hierarchical file system and the current implementation can be easily ported to other platforms, e.g., Windows and Mac OS. FS_Agg_Basic has only one parameter: the number of descents. FS_Agg has three parameters: the selection probability $p_{sel}$, the minimum number of selections $s_{min}$ and the number of (highest) levels for crawling h. Our default parameter settings are $p_{sel}=50\%$, $s_{min}=3$, and $h=4$. We also tested with other combinations of parameter settings. FS_TopK has one additional parameter, the (estimation) enlargement ratio $\gamma$. The setting of $\gamma$ depends on the query to be answered, which shall be explained later.

The invention can be implemented, for instance, on Linux machines with Intel Core 2 Duo processor, 4 GB RAM, and 1 TB Samsung 7200 RPM hard drive. The file system traces can be captured from various operating systems—as such, the subtle differences between OS implementations may lead to different performance figures in terms of file-system access time. Nonetheless, the vast majority of the implementations are not directly testing the file system performance, but the accuracy and access cost measures which are not affected by the specific file system as long as the tree structure is determined. Unless otherwise specified, we ran each experiment for five times and reported the averages.

1.6.2 Experimental Setup

Windows File Systems embodiment: The Microsoft traces [1.2] includes the snapshots of around 63,000 file systems, 80% of which are NTFS and the rest are FAT. For each file system, the trace includes a separate entry for each file and directory in the system, recording its metadata attributes (e.g., size and timestamps). This enabled us to reconstruct the file system by first creating the directory tree structure, and then populating all files into the corresponding directories. We also set the metadata attributes for all files and directories according to the trace entries. To test the present invention over file systems with a wide range of sizes, we first selected from the traces two file systems, m100K and m1M (the first 'm' stands for Microsoft trace), which are the largest file systems with less than 100K and 1M files, respectively. Specifically, m100K has 99,985 files and 16,013 directories, and m1M has 998,472 files and 106,892 directories. We also tested the largest system in the trace, m10M, which has the maximum number of files (9,496,510) and directories (789,097). We put together the largest 33 file systems in the trace to obtain m100M that contains over 100M files and 7M directories. In order to evaluate next-generation billion-level file systems for which there are no available traces, we chose to replicate m100M for 10 times to create m1B with over 1 billion files and 70M directories. While a similar scale-up approach has been used in the literature [1.27], [1.52], the duplication-filled system may exhibit different properties from a real system with 100M or 1B files. Note that other file systems have been used in the trace for testing the system 5 in a distributed environment.

Plan 9 File Systems embodiment: Plan 9 is a distributed file system developed and used at the Bell Labs [1.44], [1.45]. We replayed the trace data collected on two central file servers bootes and emelie, to obtain two file systems, pb (for bootes) and pe (for emelie), each of which has over 2M files and 70-80K directories.

NFS embodiment: Here we used the Harvard trace [1.22], [1.48] that consists of workloads on NFS servers. The replay of one day trace created about 1,500 directories and 20K files. Again, we scaled up the one-day system to a larger file system nfs (2.3M files and 137K folders), using the abovementioned approach.

Synthetic File Systems embodiment: To conduct a more comprehensive set of experiments on file systems with different file and directory counts, we used Impressions [1.1] to generate a set of synthetic file systems. Impressions takes as input the distributions of file and directory counts and metadata attributes (e.g., number of files per directory, file size and timestamps), and randomly generates a file system image on disk. For metadata attributes, Impressions by default uses the empirical distributions identified by studies on the Microsoft traces [1.2]. By adjusting the file count and the (expected) number of files per directory, we used Impressions to generate three file systems, i10K, i100K, and i1M (here 'i' stands for Impressions), with file counts 10K, 100K, and 1M, and directory counts 1K, 10K, and 100K, respectively.

1.6.3 Aggregate Queries

We first considered Q1 discussed above, i.e., the total number of files in the system. To provide a more intuitive understanding of query accuracy (than the arguably abstract measure of relative error), we used the Matlab simulator (for quick simulation) to generate a box plot (FIG. 1.4) of estimations and overhead produced by the system 5 on Q1 over five file systems, m100K to m10M, pb and pe. In the figures, the central line of each box represents the median value, and the edges of the box stand for the 25th and 75th percentiles of the runs. As defined above, the query cost (in FIG. 1.4(b) and the following figures) is the ratio between the number of directories visited by the system and that by file-system crawling. As shown, the system 5 consistently generates accurate query answers, e.g., for m10M, sampling 30% of directories produces an answer with 2% average error. While there are outliers, the number of outliers is small and their errors never exceed 7%.

We also evaluated the system 5 with other file systems and varied the input parameter settings. This test was conducted on the Linux and ext3 implementation, and so were the following tests on aggregate queries. In this test, we varied the minimum number of selections $s_{min}$ from 3 to 6, the number of crawled levels h from 3 to 5, and set the selection probability as $p_{sel}$=50% (i.e., half of the subfolders will be selected if the amount is more than $s_{min}$). FIG. 1.5(a) shows the query accuracy and cost on the eleven file system embodiments we implemented. For all file systems, the system 5 was able to produce very accurate answers (with <10% relative error) when crawling four or more levels (i.e., h≥4). Also note from FIG. 1.5(a) that the performance of the system 5 is less dependent on the type of the file system than its size—it achieves over 90% accuracy for NFS, Plan 9, and NTFS (m10M to m1B). Depending on the individual file systems, the cost ranges from less than 12% of crawling for large systems with 1B files and 80% for the small 100K system. The algorithm scales very well to large file systems e.g., m100M and m1B—the relative error is only 1-3% when the system 5 accesses only 10-20% of all directories. For m1B, the combination of $p_{sel}$=50%, $s_{min}$=3 and h=4 produces 99% accuracy with very little cost (12%).

FIG. 1.5(b) shows query accuracy vs. runtime in seconds for aggregate queries. Three points of each line (from left to right) represent h of 3, 4, and 5, respectively. The absolute runtime depends heavily on the size of the file system, e.g., seconds for m100K, several minutes for nfs (2.3M files), and 1.2 hours for m100M. Note that in this description we only used a single hard drive; parallel IO to multiple hard drives (e.g., RAID) will be able to utilize the aggregate bandwidth to further improve the performance. Further details are set forth in Just-In-Time Analytics on Large File Systems, H. Huang et al., Proceedings of the $9^{th}$ USENIX conference on file and storage technologies (2011), which is incorporated herein by reference.

We also considered other aggregate queries with various aggregate functions and with/without selection conditions, that is, Q2 and Q3 like queries as above. FIG. 1.6(a) presents the accuracy and cost of evaluating the SUM and AVG of file sizes for all files in the system, while FIG. 1.6(b) depicts the same for exe files. We included in both figures the accuracy of COUNT because AVG is calculated as SUM/COUNT. Both SUM and AVG queries receive very accurate answers, e.g., only 2% relative error for m10M with or without the selection condition of '.exe'. The query costs are moderate for large systems—30% for m1M and m10M (higher for the small system m100K). We also tested SUM and AVG queries With other selection conditions (e.g., file type='.dll') and found similar results.

1.6.4 Improvements Over FS_Agg_Basic

To investigate the effectiveness of the two enhancements used in FS_Agg, we compared the accuracy and efficiency (in terms of runtime) of FS_Agg with FS_Agg_Basic over Q1. FIGS. 1.7(a), (b) depict the result, with runtime normalized to that of the find command in Linux. As shown, while both algorithms are much more efficient than find for almost all file systems, the improvement from FS_Agg_Basic to FS_Agg is also significant—e.g., for m100M, the accuracy increases from 69% to 97% while the runtime decreases slightly. Note that while the runtime for FS_Agg is actually higher for i100K and i1M, this can be justified by more than 40% gains in terms of accuracy.

1.6.5 Distributed Aggregate Queries

To emulate a distributed environment, we tested FS_Agg over a combination of 100 or 1,000 file systems randomly selected from the Microsoft traces. Note that, to process aggregate queries over a distributed system, the present invention may only sample a small percentage of randomly selected machines to perform FS_Agg. To verify the effectiveness of this approach, we varied the selection percentage—i.e., the percentage of machines randomly selected to run FS_Agg—from 0% to 100% for the 100-machine system and from 0% to 10% for the 1,000-machine (i.e., local components 10) system. After running FS_Agg over all selected systems, we multiplied the average file count per machine with the total number of machines to produce the final query answer. FIGS. 1.8(*a*), (*b*) depict the accuracy and cost for counting the total number of files over both systems. For the 100-machine system, the query accuracy increases quickly to above 80% when sampling 30% of the machines and incurring a cost of 16% compared with crawling all machines. The accuracy is further improved to 98% when all machines are selected and a query cost of 50% is incurred. The performance is even better for the 1,000-machine system. In particular, 80% accuracy is achieved when 2% of all machines are selected—incurring a query cost of just 0.9%. The accuracy varies when sampling more machines, which is not surprising considering the large variations among all file systems.

1.6.6 Top-k Queries

To evaluate the performance of FS TopK, we considered both Q5 and Q6 discussed above. For Q5, i.e., the k largest files, we tested the present invention over five file system embodiments, with k being 50 or 100. As shown in FIGS. 1.9(*a*), (*b*), in all but one case (m1M) the system 5 is capable of locating at least 50% of all top-k files (for pb, more than 95% are located). Meanwhile, the cost is as little as 4% of crawling (for m10M). For these top-k queries, similar to aggregate queries, the runtime is correlated to the size of the file system—the queries take only a few seconds for small file systems, and up to ten minutes for large systems (e.g., m10M). When we varied $\gamma$ from 1, 5, 10, to 100,000 in this test, we found that the query cost increases as $\gamma$ does. Fortunately, a moderate $\gamma$ of 5 and 10 presents a good tradeoff point —achieving a reasonable accuracy without incurring too much cost.

Another embodiment of the invention is to provide Q6, i.e., the k most recently modified files over m100K, m1M, and pb, and the system 5 is capable of locating more than 90% of top-k files for pb, and about 60% for m100K and m1M. The cost, meanwhile, is 28% of crawling for m100K, 1% for m1M, and 36% for pb. Further detail is provided in publication [1.28] below for details, which is incorporated herein by reference.

1.7 Related Work

Metadata query on file systems: Prior research on filesystem metadata query [1.27], [1.29], [1.35], [1.37] has extensively focused on databases, which utilize indexes on file metadata. However, the results [1.27], [1.34], [1.35] reviewed the inefficiency of this paradigm due to metadata locality and distribution skewness in large file systems. To solve this problem, Spyglass [1.33], [1.35], SmartStore [1.27], and Magellan [1.34] utilize multi-dimensional structures (e.g., K-D trees and R-trees) to build indexes upon subtree partitions or semantic groups. SmartStore attempts to reorganize the files based on their metadata semantics. Conversely, the present invention avoids any file-specific optimizations, aiming instead to maintain file system agnosticism. It works seamlessly with the tree structure of a file system and avoids the time and space overheads from building and maintaining the metadata indexes.

Comparison with Database Sampling: Traditionally database sampling has been used to reduce the cost of retrieving data from a DBMS. Random sampling mechanisms have been extensively studied [1.4], [1.6], [1.9], [1.12], [1.14], [1.16], [1.23], [1.38]. Applications of random sampling include estimation methodologies for histograms and approximate query processing (see tutorial in [1.16]). However, these techniques do not apply when there is no direct random access to all elements of interest—e.g., in a file system, where there is no complete list of all files/directories.

Another particularly relevant topic is the sampling of hidden web databases [1.8], [1.25], [1.26], [1.31], for which a random descent process has been used to construct queries issued over the web interfaces of these databases [1.17]-[1.20]. While both these techniques and the present invention use random descents, a unique challenge for sampling a file system is its much more complex distribution of files. If we consider a hidden database in the context of a file system, then all files (i.e., tuples) appear under folders with no subfolders. Thus, the complex distribution of files in a file system calls for a different sampling technique, as discussed in the paper [1.28], which is incorporated by reference.

Top-k Query Processing: Top-k query processing has been extensively studied over both databases (e.g., see a recent survey [1.30]) and file systems [1.3], [1.7], [1.27], [1.35]. For file systems, a popular application is to locate the top-k most frequent (or space-consuming) files/blocks for redundancy detection and removal. For example, Lillibridge et al. [1.36] proposed the construction of an in-memory sparse index to compare an incoming block against a few (most similar) previously stored blocks for duplicate detections (which can be understood as a top-k query with a scoring function of similarity). Top-k query processing has also been discussed in other index-building techniques, e.g., in Spyglass [1.35] and SmartStore [1.27].

1.8 Discussion

At present, the system 5 takes several pre-defined parameters as the inputs and needs to complete the execution in whole. That is, the system 5 is not an any-time algorithm and cannot be stopped in the middle of the execution, because our current approach relies on a complete sample to reduce query variance and achieve high accuracy. One limitation of this approach is that its runtime over an alien file system is unknown in advance, which can make it unsuitable for the applications with absolute time constraints. For example, a border patrol agent may need to count the amount of encrypted files in a traveler's hard drive, in order to determine whether the traveler could be transporting sensitive documents across the border [1.13], [1.47]. In this case, the agent must make a fast decision as the amount of time each traveler can be detained for is extremely limited. To address this, the system 5 can have a time-out knob that a user can use to decide the query time over a file system. The system 5 can also have algorithms that allow the system 5 to get smarter—be predictive about the run-time and self-adjust the work flow based on the real-time requirements.

The system 5 employs a "static" strategy over file systems and queries, i.e., it does not modify its techniques and traversals for a query. A dynamic approach is attractive because in that case the system 5 would be able to adjust the algorithms and parameters depending on the current query and file system. New sampling techniques, e.g., stratified and weighted sampling, shall be investigated to further improve query accuracy on large file systems. The semantic knowledge of a file system can also help in this approach. For example, most images can be found in a special directory, e.g. "/User/Pictures/" in MacOS X, or "\Documents and Settings\User\My Documents\My Pictures\" in Windows XP.

The system 5 can also leverage the results from the previous queries to significantly expedite the future ones, which is beneficial in situations when the workload is a set of queries that are executed very infrequently. The basic idea is to store the previous estimations over parts (e.g., subtrees) of the file system, and utilize the history module 16 to limit the search space to the previously unexplored part of the file system, unless it determines that the history is obsolete (e.g., according to a pre-defined validity period). Note that the history shall be continuously updated to include newly discovered directories and to update the existing estimations.

1.9 Conclusion

Just-in-time analytics over a large-scale file system is provided through its tree- or DAG-like structure. The system includes a random descent technique to produce unbiased estimations for SUM and COUNT queries and accurate estimations for other aggregate queries, and a pruning-based technique for the approximate processing of top-k queries. Two improvements include high-level crawling and breadth-first descent are effective over real-world file systems.

The present invention can also include security applications to handle ill-formed file systems that malicious users could potentially construct (though rarely exist in practice). For example, the invention can incorporate a process to accurately answer aggregate queries if a large number of folders are hundreds of levels below root. Similarly, the invention can be modified to efficiently handle cases where all files have extremely close scores. This, however, is contradicted by the heavy-tailed distribution observed on most meta-data attributes in real-world file systems [1.2].

2. Unbiased Estimation of Size and Other Aggregates Over Hidden Web Databases 2.1 Introduction In this section, we disclose novel techniques to answer various types of aggregate queries, such as database size, over hidden web databases. Our techniques are efficient and provide estimates with small error. Most importantly, our estimations are unbiased, which none of the existing non-crawling techniques can achieve.

The techniques described in this section can be employed over a single data source or over a large database comprising a plurality of local databases 7 (for the local file systems), as shown in FIG. 1.1. The techniques described in this section may be performed by global components 20 and local components 10 having samplers 12, calculators 14, and history modules 16, 22.

Hidden Databases:

Hidden databases are widely prevalent on the web. They feature restrictive form-like interfaces which allow users to form a search query by specifying the desired values for one or a few attributes, and the system returns a small number of tuples satisfying the user-specified selection conditions. Due to limitations of a web interface, the number of returned tuples is usually restricted by a top-k constraint—when more than k tuples in the database match the specified condition, only k of them are preferentially selected by a ranking function and returned to the user.

Problem Definition:

The problem we consider in this section is how to use the web interface to estimate the size and other aggregates of a hidden database:

Estimating the number of tuples in a hidden database is by itself is an important problem. Many hidden databases today advertise their (large) sizes on public venues to attract customers. However, the accuracy of such a published size is not (yet) verifiable, and sometimes doubtful, as the hidden database owners have the incentive to exaggerate their sizes to attract access. Furthermore, many hidden databases, such as the job-hunting monster.com, do not publicize their total sizes, while such information can be useful to the general public as an economic indicator for monitoring job growth.

More generally, the ability to approximately answer aggregate queries can enable a wide range of third-party data analytics applications over hidden databases. For example, aggregates may reveal the quality, freshness, content bias and size of a hidden database, and can be used by third-party applications to preferentially select a hidden database with the best quality over other hidden databases.

Challenges:

A simple approach to obtain the size of a hidden database is to crawl all tuples and then count them. A number of techniques have been proposed for the crawling of hidden databases [2, 20, 25]. This approach, however, requires an extremely large amount of queries to be issued through the web interface. Such a high query cost is infeasible in practice because most hidden databases impose a per-user/IP limit on the number of queries one can issue. For example, Yahoo! Auto, a popular hidden database, has a limit of 1,000 queries per IP address per day.

Capture-recapture is another approach extensively studied in the field of statistics for population size estimation [3], and has been recently used to estimate the size of a search engine's corpus [9, 22, 28]. This approach is built upon the sampling of a population, and estimates the population size according to the recaptures counts of entities being sampled. In particular, for a population of m entities, the capture-recapture approach requires a sample of size $\Omega(\sqrt{m})$ to form a reasonable estimation.

However, applying capture-recapture over the existing sampling techniques for hidden databases leads to two problems, on estimation error and query cost, respectively. First, the estimations generated this way are biased and may have high variance. A random estimator $\bar{\theta}$ for an aggregate $\theta$ is considered to be biased if $E[\bar{\theta}] \neq \theta$. The mean squared error of the estimator is defined as $E[(\bar{\theta}-\theta)^2]$, which is the same as the variance of $\bar{\theta}$ for an unbiased estimator. It is usually desirable for estimators to be unbiased and have small variance. Not only is the capture-recapture approach in general known to produce biased estimations with high variance for large populations [3], but all underlying sampling techniques in the literature for hidden databases are also biased with the bias unknown [13, 14]. Excluded from consideration here are sampling techniques designed under the assumption that the hidden database truthfully disclose its size e.g., [14]. For many data analytics applications (e.g., to fairly compare the hidden database size of competing providers), however, the unbiasedness of an estimator is a requirement that cannot be waived. In addition, the estimation variance must be clearly understood and minimized to derive a meaningful confidence interval for the estimation. This cannot be achieved by directly applying capture-recapture over existing hidden database sampling techniques.

Furthermore, to enable an accurate estimation, capture-recapture requires an intolerably large number of queries to be issued. This is due to a distinct challenge for sampling hidden databases, i.e., the significant difference between the size of the database and the set of all possible queries [13, 14]. Such a drastic difference stands in contrast to sampling a search engine's corpus, for which a common assumption is the existence of a (reasonably small) pool of queries that recall almost all documents [5, 7, 8]. Due to such drastic difference, each of the $\Omega(\sqrt{m})$ sample tuples requires a small but non-negligible number of queries to generate. As a result, the capture-recapture approach requires a very large query cost over hidden databases which renders it impractical.

Similar to the challenges for estimating the hidden database size, significant obstacles are present for estimating aggregates over a hidden database. The existing sampling-based techniques are not designed to answer aggregate queries, but to sample all tuples with equal probability. Thus, while these techniques may support an estimation of AVG queries, they cannot answer SUM or COUNT queries. Furthermore, even when the precise database size is given, one still cannot generate unbiased estimates from these techniques because the sampling is performed with a biased selection probability distribution over all tuples, and moreover the bias is unknown.

Outline of Technical Results:

In this section we initiate a study of estimating, without bias, the size and other aggregates over a hidden database. For size estimation, our main result is HD-UNBIASED SIZE, an unbiased estimator with provably bounded variance. For estimating other aggregates, we extend HD-UNBIASED-SIZE to HD-UNBIASED-AGG which produces unbiased estimations for aggregate queries. HD-UNBIASED-SIZE is based on performing random walks over the query space, by starting with a query with very broad selection conditions, and drilling down by adding random conjunctive constraints to the selection condition, until the query selects at most k tuples. It features three key ideas: backtracking, weight adjustment, and divide-&-conquer. Backtracking enables the unbiasedness of estimation. Weight adjustment and divide-&-conquer both reduce the estimation variance, with divide-&-conquer delivering the most significant reduction for real-world hidden databases.

Backtracking applies when the random walk hits an empty query. Instead of completely restarting the walk, we backtrack to the previous query and attempt adding another constraint, in order to ensure that each trial of the random walk ends with a non-empty query. The key implication of backtracking is that it enables the precise computation of the selection probability for the returned tuples. As a result, HD-UNBIASED-SIZE is capable of generating an unbiased estimation for the database size.

We note that there is a key difference between backtracking-enabled random walks and the existing sampling techniques over hidden databases. The existing techniques aim to produce uniform random samples but eventually fall short with unknown bias. In comparison, our random walk intentionally produces biased samples, but the bias of the sample is precisely known. As a result, our estimation technique is capable of completely correcting the sampling bias and producing unbiased estimations of database size and other aggregates.

While a backtracking-enabled random walk produces no bias, the variance of its estimation may be large when the underlying data distribution is highly skewed. The objective of weight adjustment is to reduce the estimation variance by "aligning" the selection probability of tuples in the database to the distribution of measure attribute (to be aggregated). For our purpose of estimating the database size, the measure attribute distribution is uniform (i.e., 1 for each tuple). Thus, we adjust the transitional probability in the random walk based on the density distribution of "pilot" samples collected so far. After weight adjustment, each random walk produces an unbiased estimate with gradually reduced variance.

While weight adjustment has the estimation variance converging to 0, the convergence process may be slow for a database that is much smaller than its domain size (i.e., the set of all possible tuples). Divide-&-conquer to addresses this problem by carefully partitioning the database domain into a large number of subdomains, such that the vast majority of tuples belong to a small number of subdomains. Then, we perform random walks over certain subdomains and combine the results for estimation of the database size. The reduced size mismatch between the (sub) query space and the database significantly reduces the final estimation variance, while only a small number of subdomains need to be measured, leading to very small increase on query cost.

A major contribution of this section is also a theoretical analysis of the quantitative impact of the above ideas on reducing variance. We also describe a comprehensive set of experiments that demonstrate the effectiveness of HD-UNBIASED-SIZE and HD-UNBIASED-AGG over both synthetic and real-world datasets, including experiments of directly applying these algorithms over the web interface of a popular hidden database websites, Yahoo! Auto.

In summary, the main contributions of this section are as follows. We discuss unbiased estimation of the size and other aggregates over a hidden database through its restrictive web interface. We disclose a backtracking-enabled random walk technique to estimate hidden database size and other aggregates without bias. To the best of our knowledge, this is the first time an aggregate can be estimated without bias over a hidden database. We also disclose two other techniques, weight adjustment and divide-&-conquer, to reduce the estimation variance. We combine the three techniques to produce HD-UNBIASED-SIZE, an efficient and unbiased estimator for the hidden database size. Similarly, we disclose HD-UNBIASED-AGG which supports various aggregate functions and selection conditions. We provide a thorough theoretical analysis and experimental studies that demonstrate the effectiveness of our disclosed approach over real-world hidden databases.

Section Organization:

The rest of this section is organized as follows. In subsection 2.2 we introduce preliminaries and discuss simple but ineffective algorithms for aggregate estimation over hidden databases. Subsections 2.3 and 2.4 are devoted to the development of HD-UNBIASED-SIZE, focusing on achieving unbiasedness and reducing variance, respectively. In subsection 2.5 we discuss the parameter settings for HD-UNBIASED-SIZE and extend it to HD-UNBIASED-AGG. Subsection 2.6 contains a detailed experimental evaluation of our disclosed approaches followed by a conclusion in subsection 2.7.

2.2. Preliminaries 2.2.1 Models of Hidden Databases

We restrict our discussion in this section to categorical data—we assume that numerical data can be appropriately discretized to resemble categorical data, and exclude tuples with null values from consideration. Consider a hidden database table D with m tuples $t_1, \ldots, t_m$ and n attributes $A_1, \ldots, A_n$. We assume no duplicate tuple exists in D. Let Dom(·) be a function that returns the domain of one or more attributes. As such, $Dom(A_i)$ represents the domain of $A_i$, and $Dom(A_i, A_j)$ represents the Cartesian product of the domains of $A_i$ and $A_j$. $|Dom(A_i)|$ represents the cardinality of Dom($A_i$), i.e., the number of possible values of $A_i$.

The table is only accessible to users through a web-based interface. We assume a prototypical interface where users can query the database by specifying values for a subset of attributes. Thus a user query q is of the form: SELECT * FROM D WHERE $A_{i1}=v_{i1}$ & ... & $A_{is}=v_{is}$, where $v_{ij}$ is a value from $Dom_{ij}$.

Let Sel(q) be the set of tuples in D that satisfy q. As is common with most web interfaces, we shall assume that the query interface is restricted to only return k tuples, where k m is a predetermined small constant (such as 10 or 50). Thus, Sel(q) will be entirely returned iff |Sel(q)|≤k. If the query is too broad (i.e., |Sel(q)|>k), only the top-k tuples in Sel(q) will be selected according to a ranking function, and returned as the query result. The interface will also notify the user that there is an overflow, i.e., that not all tuples satisfying q can be returned. At the other extreme, if the query is too specific and returns no tuple, we say that an underflow occurs—i.e., the query is empty. If there is neither overflow nor underflow, we have a valid query result. Without causing confusion, we also use q to represent the set of tuples returned by q. Note that the number of returned tuples $|q|=\min(k, |Sel(q)|)$.

For the purpose of this section, we assume that a restrictive interface does not allow users to "scroll through" the complete answer Sel(q) when q overflows. Instead, the user must pose a new query by reformulating some of the search conditions. This is a reasonable assumption because many real-world top-k interfaces (e.g., Google) only allow "page turns" for limited (e.g., 100) times.

A Running Example:

Table 1 depicts a simple table which we shall use as a running example throughout this section. There are m=6 tuples and n=5 attributes, including four Boolean ($A_1, \ldots, A_4$) and one categorical ($A_5 \in [1; 5]$, only 1 and 3 appear in the table).

2.2.2 Performance Measures

We consider the estimation of aggregate queries with conjunctive conditions of the form SELECT AGGR ($A_j$) FROM D WHERE $A_{i1}=v_{i1}$ & ... & $A_{i8}=v_{i8}$ where AGGR is the aggregate function. For example, such an aggregate query might be the number of tuples in the database which we focus on for most part of this section. It may also be the SUM of prices for all inventory cars of a car dealership's hidden database (i.e., the inventory balance).

TABLE 1

Example: Input Table

|       | $A_1$ | $A_2$ | $A_3$ | $A_4$ | $A_5$ |
|-------|-------|-------|-------|-------|-------|
| $t_1$ | 0 | 0 | 0 | 0 | 1 |
| $t_2$ | 0 | 0 | 0 | 1 | 1 |
| $t_3$ | 0 | 0 | 1 | 0 | 1 |
| $t_4$ | 0 | 1 | 1 | 1 | 1 |
| $t_5$ | 1 | 1 | 1 | 0 | 3 |
| $t_6$ | 1 | 1 | 1 | 1 | 1 |

An aggregate estimation algorithm for hidden databases should be measured in terms of estimation accuracy and query efficiency:

Estimation Accuracy: The mean squared error of an estimator is a composition of its bias and variance. Consider an estimator $\tilde{\theta}$ for an aggregate $\theta$. Then $MSE(\tilde{\theta})=E[(\tilde{\theta}-\theta)^2]=E[(\tilde{\theta}-E(\tilde{\theta}))^2]+(E[\tilde{\theta}]-\theta)^2)=Var(\tilde{\theta})+Bias^2(\tilde{\theta})$, where $E[\cdot]$ represents expected value. The task is to design unbiased estimators with minimum variance.

Query Efficiency: Many hidden databases impose limits on the number of queries from a user. The task is to minimize the number of queries issued through the web interface to achieve a given level of estimation accuracy.

2.2.3 Simple Aggregate-Estimation Algorithms

Brute-Force-Sampler:

This algorithm randomly composes a fully-specified query $A_1=v_1, \ldots A_n=v_n$ generating each $v_i$ from Dom($A_i$) uniformly at random. There are two possible outcomes: either underflow or valid. After repeating this process for h times, let $h_v$ be the number of tuples found. Then, one can estimate the database table size as $\tilde{m}=|Dom(A_1, \ldots, A_n)| \cdot h_v/h$. It is easy to see that this process will produce an unbiased estimate. Other aggregates can be estimated without bias in a similar way. However, BRUTE-FORCE-SAMPLER is extremely inefficient because the probability for a fully-specified query to return valid is extremely small (i.e., $\ll |Dom(A_1, \ldots, A_n)|$) [13].

Capture-&-Recapture:

The Lincoln-Petersen model [27] is a well-known capture-&-recapture estimator for the size of a closed population. Consider the case where we collect two samples, $C_1$ and $C_2$, of a hidden database. The Lincoln-Petersen estimator gives $\tilde{m}=|C_1| \cdot |C_2|/|C_1 \cap C_2|$ where $|C_i|$ is the number of tuples in $C_i$ and $|C_1 \cap C_2|$ is the number of tuples that appear in both samples. The estimation tends to be positively biased [3]. One can see that the estimator only works when each sample includes (at least) $\cap(\sqrt{m})$ tuples, which leads to an extremely expensive process for hidden databases.

2.2.4 Hidden Database Sampling

The basic idea behind the HIDDEN-DB-SAMPLER [13] and its extension HYBRID-SAMPLER [14] is to perform a random drill-down starting with extremely broad (and thus overflowing) queries, and iteratively narrowing it down by adding randomly selected predicates, until a valid query is reached. In particular, consider a Boolean database. The sampler starts with query SELECT * FROM D. If the query overflows, it is expanded by adding a randomly selected predicate on $a_i$ (either "$a_1=0$" or "$a_1=1$"). If the expanded query still overflows, we further expand it by adding random predicates for $a_2, \ldots, a_n$ respectively one at a time. This random walk process leads us to either a valid or an underflowing query. If it reaches an underflow, we restart the random walk. If the process reaches a valid query, we randomly choose a returned tuple and include it in the sample. Since this random walk process more likely chooses tuples returned by "short" valid queries, we have to apply rejection sampling at the end of the random walk. In particular, a sample tuple is rejected with probability $1-C/2^h$, where C is a pre-determined parameter and h is the number of predicates in the query from which the tuple is retrieved.

2.2.5. Table of Notations

D    hidden database
k    maximum number of tuples returned
$t_1 \ldots t_m$    set of tuples in D
$A_1 \ldots A_n$    set of attributes in D
Sel(q)    tuples in D that satisfy the selection conditions of q
|Dom|    domain size of the Cartesian product of all attributes
|Dom(·)|    domain size of the Cartesian product of selected attributes
$\Omega_{TV}$    set of all top-valid nodes
p(q)    probability of q being selected in a drill down
r    number of drill downs performed over each subtree
$D_{UB}$    maximum subdomain size for each subtree
$s^2$    estimation variance 2.3. Unbiasedness for Size Estimation In this subsection, we disclose the main ideas that enable the unbiasedness of estimation for the size of a hidden database.

2.3.1 Random Drill-Down With Backtracking

We start with a hidden database with all Boolean attributes, and extend this scenario to categorical attributes in subsection 2.3.2. To understand the idea, consider a query tree as depicted in FIG. 2.1 (for the first four Boolean attributes of the running example in Table 1). Each level of the tree represents an attribute, while each outgoing edge from a level represents a possible value of that attribute. Thus, each node represents a conjunctive query defined by the AND of predicates corresponding to the edges from the root to this node. For example, $q_2$ in FIG. 2.1 represents SELECT * FROM D WHERE $A_1=1$ AND $A_2=0$. We call a node overflowing, valid, or underflowing according to the result of its corresponding query. FIG. 2.1 shows the class of each node when k=1. We also introduce the definition of a top-valid node:

DEFINITION 2.1. [Top-Valid Query] Given a query tree, a valid query is top-valid if its parent is overflowing.

All top-valid queries in FIG. 2.1 are marked with symbol T. One can see from this definition that each tuple belong to one and only one top-valid node. For example, FIG. 2.1 has 6 top-valid queries corresponding to 6 tuples as k=1.

The main process of BOOL-UNBIASED-SIZE is a random procedure which samples top-valid nodes with certain probability distribution. If we know the probability p(q) for each top-valid node q to be chosen, then for any sample node q, we can generate an unbiased estimation for the database size as |q|/p(q), where |q| is the number of tuples returned by q.

Following this basic idea, BOOL-UNBIASED-SIZE consists of two steps: The first is a random drill-down process over the query tree to sample a top-valid node. The second is to compute p(q) for the sampled node. The entire process can be repeated for multiple times to reduce the variance of estimation. Both steps may require queries to be issued through the interface of the hidden database. We describe the two steps respectively as follows, with the pseudocode summarized in FIG. 2.2. Note that the two steps are inter-leaved in the pseudocode.

The random drill-down process starts from the root node. We choose a branch uniformly at random and issue the corresponding query q. There are three possible outcomes. If q overflows, we further drill down the tree by selecting each branch of q with equal probability. If q is valid, i.e., it returns |q| (1≤|q|≤k) tuples without an overflow flag, then we conclude the random walk. If q underflows, then we backtrack by considering q', the sibling of q—i.e., the node that shares the same parent with q. For example, the sibling of $q_2$ in FIG. 2.1 is $q'_2$. Note that the parent of q must be overflowing because otherwise the drill-down process will terminate before reaching q. Thus, q' must overflow. We randomly choose a branch coming out of q' and follow it to further drill down the tree.

One can see that a drill-down process always terminates with a top-valid node. An example of a random drill-down is shown in FIG. 2.1 with bold edges representing the branches that were initially chosen at random. In this example, backtracking happens when $q_2$ was chosen—since $q_2$ overflows, we backtrack and continue drilling down from its sibling node $q'_2$. Note that with backtracking, a top-valid node like $q_4$ may be reached under multiple possibilities of the initially chosen branches. For example, when $q_1$, $q'_2$, $q_3$, $q_4$ were initially chosen, $q_4$ would also be reached by the drill-down.

We now consider the second step which computes p(q). Note that there is a unique path from the root node to a top-valid node q—for a random drill-down to reach q, although edges on this path might not be initially chosen, they must be finally followed (after backtracking). For example, such a path for $q_4$ in FIG. 2.1 goes through $q_1$, $q'_2$, $q_3$, in order. For each edge of the path, there are only two possible scenarios for choosing between the edge and its sibling (from which the drill-down must choose one to follow):

Scenario I:

Both branches are non-underflowing. In this case, each branch is chosen with 50% probability. The selection between $q_1$ and $q'_1$ in FIG. 2.1 is an example of this scenario.

Scenario II:

One branch is overflowing while the other is underflowing. In this case, the overflowing branch will always be chosen. The selection between $q_2$ and $q'_2$ in FIG. 2.1 is an example of this scenario, and $q'_2$ is always chosen.

In order to compute p(q), we must know which scenario occurs for each level from the root to q. This may or may not require additional queries to be issued. In particular, no additional query is needed for the last level before reaching q, as Scenario 1 always occurs there. No query is needed for levels when backtracking applies either, because one branch must underflow. However, for any other level, we must issue the sibling query to determine the correct scenario. Consider the bold edges in FIG. 2.1. Since $q_1$ was selected during random drill-down, we do not know whether $q'_1$ is underflowing (Scenario I) or not (II). Thus, we must now issue $q'_1$ to determine which scenario actually occurred.

After learning the number of occurrences for Scenarios I and II, we can then compute p(q). For a query q with h predicates, let $h_1$ and $h-h_1$ be the number of occurrences for Scenario I and II, respectively. We have $p(q)=\frac{1}{2}^{h_1}$. For example, $q_4$ in FIG. 2.1 has $h_1=2$ (i.e., while issuing $q_1$ and $q_4$) and p(q)=¼, leading to an estimation of |q|/p(q)=4. Note that this estimation is an instantiation of the Horvitz-Thompson Estimator [19]. The following theorem shows its unbiasedness:

THEOREM 2.1. [Estimate (un-)Biasness] The estimate generated by the drill-down process is unbiased, i.e., its expected value taken over the randomness of q is $$E\left[\frac{|q|}{p(q)}\right] = m. \quad 1)$$

PROOF. Let $\Omega_{TV}$ be the set of all top-valid nodes in the tree. Since each tuple belongs to one and only one top-valid node, we have $\Sigma_{q\in\Omega_{TV}}|q|=m$. Since the random drill-down process Iq always terminates on a top-valid query, $$E\left[\frac{|q|}{p(q)}\right] = \sum_{q\in\Omega_{TV}} p(q) \cdot \frac{|q|}{p(q)} = m$$

QED.

2.3.2 Smart Backtracking for Categorical Data

We now discuss how to apply unbiased size estimation to a categorical database. Two changes are required. First, Boolean attributes ensure that the sibling of an under-lowing node always overflow. There is no such guarantee for categorical databases. Thus, to successfully backtrack from an underflowing branch, we must find one of its sibling branches that returns non-empty and count the number of such non-empty siblings (in order to compute p(q)). Note that a non-empty branch always exists given an overflowing parent node. A simple backtracking approach is to query all branches to find the (COUNT of) non-empty ones, and then randomly choose a non-empty branch to follow.

The other change required is the computation of p(q). If the above-mentioned simple backtracking is used, the computation of p(q) becomes $pq=1/\Pi_{i=1}^{h-1}c_i$, where $c_i$ is the number of non-underflowing branches for the i-th predicate en route to the top-valid query q.

The two changes for categorical databases do not affect the un-biasedness of the estimation as the proof of Theorem 2.1 remains un-changed. These changes, however, do affect the query cost of the drill-down process. In particular, if the above simple backtracking technique is used, we must issue queries corresponding to all branches to find the number of non-empty ones, leading to a high query cost for large-fanout attributes.

To reduce such a high query cost, we disclose smart backtracking which aims to avoid testing all branches of a high fanout attribute. Consider a categorical attribute $A_i$ with possible values $v_1, \ldots, v_w$ ($w=|Dom(A_i)|$). Assume a total order of the values which can be arbitrarily assigned for cardinal or ordinal attributes. In the following, we describe the random drill-down and the computation of p(q) with smart backtracking, respectively.

To choose a branch of $A_i$ for further drill down, we first randomly choose a branch $v_j$. Backtracking is required if $v_j$ underflows. With smart backtracking, we test the right-side neighbors of $v_j$ (in a circular fashion), i.e., $v_{(j \bmod w)+1}$, $v_{((j+1) \bmod w)+1}$, etc., in order until finding one that does not underflow, and follow that branch for further drill down. FIG. 2.3 (a) demonstrates the branches for the categorical attribute A5 in the running example with w=5. To backtrack from $q_4$, we test $q_5$ and then $q_1$. Since $q_1$ returns nonempty, we follow branch $q_1$ for further drill-down.

We now consider the computation of p(q). With the new strategy, the probability for choosing a non-empty branch $v_j$ is $(w_U(j)+1)/w$, where $w_U(j)$ is the number of consecutive underflowing branches immediately preceding $v_j$ (again in a circular fashion). For example, in FIG. 2.3, $q_1$ and $q_5$ have $w_U=2$ and 1, respectively. To compute $w_U(j)$, we need to issue queries corresponding to the left-side neighbors of $v_j$, i.e., $v_{(j-2) \bmod w)+1}$, $v_{(j-3) \bmod w+1}$ etc, in order until finding a non-empty branch. Then, we learn $w_U(j)$ and is able to compute the probability of following $v_j$. FIGS. 2.3 (a) and (b) shows the queries one needs to issue after committing to branch $q_1$ and $q_3$, respectively.

With smart backtracking, for a given node, the expected number of branches one need to test is $$QC = 1 + \sum_{j=1}^{w} \frac{w_U(j)+1)^2}{w} \qquad 2)$$

where $w_U(j)=-1$ if $v_j$ is an empty branch. For example, QC=3.6 for $A_5$ in FIG. 2.3. For attributes with larger fanouts, smart backtracking may reduce the query cost more significantly.

2.3.3 Discussion 2.3.3.1 Comparison with Prior Samplers

To illustrate the effectiveness of our backtracking-enabled random drill-down approach, we compare it with two prior algorithms discussed in subsection 2.2: BRUTE-FORCE-SAMPLER which also generates unbiased size estimations, and HIDDEN-DB-SAMPLER which can be used with CAPTURE-&-RECAPTURE to produce biased size estimations.

Comparison with BRUTE-FORCE-SAMPLER:

Both our random drill-down technique and BRUTE-FORCE-SAMPLER use a random process to select valid queries for estimating the size of a hidden database. The key difference is the success probability of such a random process. As we discussed in subsection 2.2, BRUTE-FORCE-SAMPLER has an extremely low success rate because the database size is usually orders of magnitude smaller than the query space. Our approach, on the other hand, guarantees to find one (top-)valid query in every trial of the random walk, thanks to a combination of random drill-down and backtracking techniques. Such a difference on the success rate leads to a dramatic difference on the query cost. For example, consider a Boolean database with m tuples, n attributes, and k=1. While BRUTE-FORCE-SAMPLER requires an average of $2^n/m$ queries to find a valid query and produce an estimate, we require at most n queries (i.e., the longest possible drill-down) to do so.

Comparison with HIDDEN-DB-SAMPLER:

There are two key differences between the random drill-down process in our approach and that in HIDDEN-DB-SAMPLER [13]. The first is our introduction of backtracking. With HIDDEN-DB-SAMPLER, the random drill-down process incurs an "early termination" (i.e., restarts from the root) if it reaches an underflowing node. As a result, one has to know the probability of early termination $p_E$ in order to compute the probability of reaching a query q with h predicates:

$$p(q) = \frac{1}{(1-p_E) \cdot \prod_{i=1}^{h} |Dom(A_i)|} \qquad 3)$$

Unfortunately, it is extremely difficult to approximate $p_E$ to the degree that supports an accurate estimation of p(q). The reason is that $(1-p_E) \approx 0$ for many hidden databases, especially categorical ones with large fan-out attributes, whose sizes are order of magnitude smaller than the domain of all possible values. As a result, an extremely large number of random drill-downs must be taken before p(q) can be accurately estimated—which makes HIDDEN-DB-SAMPLER impossible to use for estimating the database size. Our technique, on the other hand, introduces backtracking to ensure that no random drill-down terminates without reaching a valid query, thereby enabling the precise computation of p(q). It is the introduction of backtracking that essentially enables us to produce an unbiased estimate for the database size.

The second difference is on the sampling technique: HIDDEN-DB-SAMPLER uses rejection sampling which discards results of short random drill-downs with high probability to approximate a uniform selection probability for all tuples. Our approach, on the other hand, uses a weighted sampling technique which accepts all results and associate each with its selection probability p(q). Then, the final estimate is adjusted by p(q) to produce an unbiased estimation. This change makes our approach a highly efficient algorithm for many hidden databases, because a random drill-down process always produces an estimate. In comparison, HIDDEN-DB-SAMPLER may have the reject a large number of random drill-downs before accepting the one as a uniform random sample.

2.3.3.2 Disadvantages on Estimation Variance

While our backtracking-enabled drill-down technique produces unbiased estimates, note that the mean squared error of an estimator depends on not only bias but also variance. A disadvantage of our approach is that it may incur high estimation variance for a database with highly skewed distribution, as illustrated by the following theorem. Recall that $\Omega_{TV}$ is defined as the set of all top-valid nodes i.e., valid nodes that have overflowing parents.

THEOREM 2.2. [Estimation Variance] The estimation generated by the random drill-down process over a categorical database has variance $$s^2 = \left( \sum_{q \in \Omega_{TV}} \frac{|q|^2}{p(q)} \right) - m^2. \qquad 4)$$

The proof directly follows from the variance definition.

Observe from Theorem 2.2 that the estimation variance can be large when there are deep top-valid queries in the tree, which usually occur in database with skewed distribution. In particular, consider a Boolean database with n+1 tuples $t_0$, $t_1, \ldots, t_n$ that satisfy the following condition: For any $t_i(i \in [1, n])$, $t_i$ has the opposite values as $t_0$ on attributes $a_{n-i+1}, \ldots, a_n$, and the same values on all other attributes i.e., $\forall_j \in [1, n-i]$, $t_0[a_j] = t_i[a_j]$, $\forall_j \in [n-i+1, n, t0aj=1-tiaj$. FIG. 2.4 illustrates this scenario when k=1. Note that all underflowing branches are omitted in the figure.

One can see that, when k=1, there are two n-predicate queries (e.g., $t_0$ and $t_1$) in the tree that both are top-valid queries. Note that the value of p(q) for these two queries are $\frac{1}{2}^n$. Thus, the variance is at least $s^2 > 2^n + 1 - m^2$. Since the domain size is usually order of magnitude larger than the database size i.e., $2^n \gg m$, the variance can remain extremely large even after a substantial number of random drill-downs. For example, if the database has 40-attribute and one million tuples, at least $10^{12}$ random drill-downs are required to reduce the variance to $m^2$, which still leads to significant error. The following corollary illustrates the generic case for categorical databases with an arbitrary k.

COROLLARY 2.1. [Worst-Case Estimate Variance for BOOL-UNBIASED-SIZE] The worst-case estimate variance for an n-attribute, m-tuple hidden database with a top-k interface satisfies $$s^2 > k^2 \cdot \left( \prod_{i=1}^{n-1} |Dom(A_i)| \right) - m^2. \quad 5)$$

Due to space limitations, we do not include the proof of the corollary. Note that this corollary shows a probabilistic lower bound which still assumes the randomness of the drill-down process (i.e., it considers the worst-case database instance, not the worst-case random walk). One can see from the corollary that the variance may be even more significant in the generic case, because the variance increases linearly with $k^2$. Subsection 2.4 is an effort dedicated to reduce the estimation variance.

2.4. Variance Reduction

In this subsection, we describe two ideas to reduce the estimation variance: weight adjustment and divide-&-conquer.

2.4.1 Weight Adjustment

Weight adjustment is a popular technique for variance reduction in sampling traditional databases. In this subsection, we describe how weight adjustment can be applied over hidden databases. Note that while the COUNT-based sampling part of the ALERT-HYBRID algorithm [14] can also be considered weighted sampling, the key difference between ALERT-HYBRID and the technique discussed here is how the weights are computed are the implications of imperfectly estimated weights. In ALERT-HYBRID, the weights are estimated based on a small pool of pilot sample tuples, and estimation errors on weights lead to biased samples [14]. Here, the weights are determined by COUNT estimations from prior drill downs, and imperfectly estimated weights do not affect the unbiasedness of BOOL-UNBIASED-SIZE. In particular, we show that while weight reduction in general reduces estimation variance, the remaining variance is still significant for certain hidden databases with highly skewed distributions.

2.4.1.1 Main Idea

The random drill-down process in BOOL-UNBIASED-SIZE essentially performs a sampling process over all top-valid nodes of the hidden database, with varying selection probability for different nodes. As any weighted-sampling estimator, the estimation variance is determined by the alignment between the selection probability distribution and, the distribution of the measure attribute (i.e., the attribute to be aggregated). For our purpose, the measure aggregate is $|q|$, the size of a top-valid node. With BOOL-UNBIASED SIZE, the selection probability for q is p(q), which is generally independent of its measure attribute $|q|$. Thus, in some cases, the selection probability may be perfectly aligned with the measure attribute. For example, when k=1 and all top-valid nodes have exactly $\log_2 m$ predicates, we have p(q)=1/m and 0 variance according to Theorem 2.2. Nonetheless, there are also cases where these two distributions are badly misaligned which lead to an extremely large variance. An example of such a case was depicted in FIG. 2.4—where certain top-valid nodes reside on the leaf level, much deeper than other top-valid nodes.

The main idea of weight adjustment is to adjust the probability for following each branch (and thereby change the eventual selection probability for top-valid nodes), so as to better align the selection probability distribution p(q) with the distribution of $|q|$. The ideal objective is to achieve the perfect alignment with 0 variance—i.e., each top-valid node q has p(q)=$|q|$/=m. Of course, such a perfect alignment is not possible without complete knowledge of the measure attribute distribution. However, prior "pilot" samples can help in estimating this distribution, as we shall discuss as follows.

To understand how to approximate this perfect alignment from the pilot samples, consider a node $q_P$ with ω branches $q_{C1}, \ldots, q_{C\omega}$. Each branch $q_{Ci}$ defines a subset of the database $D_{Ci}$ consisting of all tuples that have corresponding top-valid nodes "under" $q_{Ci}$. That is, all tuples in $D_{Ci}$ match the selection conditions of $q_{Ci}$. For example, in FIG. 2.1, $t_1, \ldots, t_4$ are under $\dot{q}_1$ 1 while $t_5$ and $t_6$ are under $q_1$. The optimal alignment is to select each branch $q_{Ci}$ with probability proportional to the size of its corresponding sub-database i.e., $|D_{ci}|$. For example, in the running example depicted in FIG. 2.1, $\dot{q}_1$ and $q_1$ should be chosen with probability 4/6 and 2/6, respectively.

If the precise size of $D_{Ci}$ is known for every branch, then the probability for each top-valid node q to be picked up is p(q)=$|q|$/m, which leads to a perfect alignment that produces 0 variance. Without knowledge of $|D_{Ci}|$, we estimate it from the prior samples of top-valid nodes. In particular, let $q_{H1}, \ldots, q_{Hs}$ be the historic top-valid queries reached under $q_{Ci}$, we estimate $|D_{Ci}|$ as $$|D_{Ci}| \approx \frac{1}{s} \cdot \sum_{j=1}^{s} \frac{|q_{Hj}|}{p(q_{Hj} \mid q_{ij})}, \quad 6)$$

where $p(q_{Hj}|q_{ij})$ is the conditional probability for the random drilldown process to reach $q_{Hj}$ given the fact that it reaches $q_{Ci}$. Note that $p(q_{Hj}|q_{ij})$ can be computed based on branch selection probability for each branch on the path from $q_{ij}$ to $q_{Ci}$. Consider the running example in FIG. 2.1. If there is one historic drill down (without weight adjustment) through $q_1$ which hits $q_4$, then we estimate the subtree size for $q_1$ as 1·(½)/(¼)=2, where ½ and ¼ are the probability for the random walk to reach $q_1$ and $q_4$, respectively. Intuitively, $p(q_{Hj})/p(q_{ij})$ is the conditional probability of reaching $q_{Hj}$ had the random walk started at node $q_{ij}$. Thus, the estimation in (6) can be derived in analogy to our size estimation in BOOL-UNBIASED-SIZE.

Unbiasedness:

Note that weight adjustment does not affect the unbiasedness no matter how accurate the estimation of $|D_{Ci}|$ is. The reason is that we always know precisely the probability we used to follow each branch, and therefore can compute p(q) precisely for each top-valid node reached by a random drill-down.

2.4.1.2 Effectiveness on Variance Reduction

The power of weighted sampling (a.k.a. importance sampling) on reducing estimation variance has been well studied in statistics (e.g., [26]) and database sampling [4]. Unfortunately, for the purpose of this section, weight adjustment still cannot address the worst-case scenario depicted in FIG. 2.4, where the existence of deep top-valid nodes leads to an extremely large estimation variance. The difficulty for weight adjustment to address this scenario comes from two perspectives: First, such a deep-level node is unlikely to be reached by a historic drill-down, leading to low probability of applying the weight adjustment in the first place. Second, even with historic trials hitting the node, the relative error is likely to be high for estimating the size of a small subtree.

COROLLARY 2.2. [Worst-Case Estimate Variance with Weight Adjustment] For an n-attribute, m-tuple hidden database, after r random drill-downs, the worst-case estimation variance generated by the random-drill down with weight adjustment satisfies $$s^2 \geq \frac{2^{n-\log_2 r} \cdot m}{n - \log_2 r + 1} - m^2. \qquad 7)$$

The corollary shows the worst-case scenario still generates unacceptably high variance even after applying weight adjustment. Note that it is again a probabilistic lower bound which assumes the randomness of the drill-down process. According to Corollary 2.2, for a 40-attribute 100,000-tuple database, $s^2 \geq 354.29 \cdot m^2$ even after 1; 000 random drill-downs have been performed.

2.4.2 Divide-&-Conquer

We now describe the idea for divide-&-conquer, a variance reduction technique which is independent of weight adjustment but can be used in combination with it. As mentioned in the introduction, divide-&-conquer provides the most significant variance reduction especially for the worst-case scenarios.

2.4.2.1 Motivation and Technical Challenge

Our discussions for Corollary 2.1 and 2.2 indicate deep top-valid nodes as the main source of high variance before and after weight adjustment, respectively. More fundamentally, the cause for the existence of deep top-valid queries lies on the significant difference between the database size m and the domain size |Dom|. To understand why, consider the case where k=1. A deepest (i.e., leaf-level) top-valid query returns |Dom| as the estimation, while the actual size is m. The following theorem further formalizes such a fundamental cause of high variance:

THEOREM 2.3. [Upper Bound on Estimation Variance] When k=1, the estimation variance of a random drill down satisfies $$s^2 \leq m^2 \cdot \left(\frac{|Dom|}{m} - 1\right) \qquad 8)$$

The theorem shows a large value of |Dom|/m as a cause of high estimation variance of HD-UNBIASED. The main motivation for divide-&-conquer is to partition the originally large domain into smaller, mutually exclusive, subdomains so as to reduce |Dom| for the subdomains. Note that the partitioning strategy must be carefully designed so m will not be significantly reduced. To understand why, consider an otherwise simple strategy of dividing the domain randomly into b mutually exclusive subdomains, using HD-UNBIASED-SIZE to estimate each, and take the sum as the total size estimation. This partitioning strategy reduces |Dom| and m with the same ratio b, leaving |Dom|/m unchanged. As a result, according to Theorem 2.3, the total estimation variance is only reduced by a factor of b, which is offset by the additional queries required for executing HD-UNBIASED-SIZE over the b subdomains.

One can see that, to solve this problem, the domain must be partitioned in a way such that while the number of subdomains may be large (such that each subdomain can be small), the vast majority of tuples appear in only a small number of subdomains. Then, for these subdomains, the ratio of subdomain size over the number of tuples in the subdomain is small, allowing a reduced estimation variance for the total database size. Note that the other sparsely packed subdomains will not adversely affect the estimation variance to a significant degree because of the limited number of tuples contained in the subdomains.

2.4.2.2 Main Idea

To gather most tuples into a few small subdomains, we disclose a query-tree-based recursive partitioning of the domain. We start with Boolean databases and then extend the results to categorical data at the end of this subsection. Consider the tree shown in FIG. 2.1 which is also depicted in FIG. 2.5. Originally, the domain includes the entire tree which includes a top-valid node for each tuple. We partition the domain into subdomains corresponding to subtrees with $n_0$ levels. FIG. 2.5 depicts an example of such a partition with $n_0=3$. Consider the root to be the first level. The partition generates one subtree from the first to the $n_0$-th level, $2^{n_0-1}$ subtrees from the $n_0$-th to the $(2_{n_0}-1)$-th level, etc. For example, $T_1$ in FIG. 2.5 is the 1-to-3 level subtree, and $T_2, \ldots, T_5$ are the four 3-to-5 level subtrees. Note that the root node of a $(i \cdot n_0 - i + 1)$-to-$(i \cdot n_0 - i + n_0)$-th level subtree is also a bottom-level node of a $(i \cdot n_0 - 2i + 1)$-to-$(i \cdot n_0 - 2i + n_0)$-th level subtree. For example, the root node of $T_2$ is a leaf-level node of $T_1$ in FIG. 2.5. A tuple is included in a subtree iff its corresponding top-valid node is a non-root node of the subtree. For example, in FIG. 2.5, $t_1$ and $t_4$ are included in $T_2$ and $T_3$, respectively. One can see that each tuple belongs to one and only one subtree. Thus, the subtrees form a mutually exclusive partition of the original domain.

With the subtree partitioning strategy, our size estimation algorithm can be stated as the following recursive procedure: We start with the top-most subtree (e.g., $T_1$ in FIG. 2.5) and start to perform the random drill-down process over the subtree. In particular, we perform r random drill-downs where r is a pre-determined parameter, the setting of which will be discussed in subsection 2.5. Note that each random drill-down may terminate at two types of nodes: a top-valid node or a bottom-level overflowing node of the subtree, which we refer to as a bottom-overflow node.

For each top-valid node $q_{TV}$ which terminates a random drilldown of the top-most subtree, we compute $\delta(q_{TV}) = r \cdot p$ ($q_{TV}$), where $p(q_{TV})$, as defined in subsection 2.3, is the probability for a random drill-down to reach $q_{TV}$. Intuitively, $r \cdot p(q_{TV})$ is the expected number of random drill-downs that will terminate at $q_{TV}$. For example, in FIG. 2.5, with r=2 random drill-downs per subtree, we have $\delta(q_B) = 2 \cdot (1/4) = 1/2$. Note that when r=1, $\delta(q_{TV}) = p(q_{TV})$.

For each bottom-overflow node $g_{BO}$ which terminates a random drill-down of the top-most subtree, we perform the random drilldown process over the subtree with root of $q_{BO}$, again with r drilldowns. This recursive process continues until no bottom-overflow node is discovered. For a top-valid node $q'_{TV}$ captured in a subtree with root of $q_R$, we compute $$\delta(q'_{TV}) = r \cdot p(\acute{q}_{TV}) \cdot \delta(q_R) \qquad 9)$$

where $p(q'_{TV})$ is the probability for a random drill-down over the subtree (of $q_R$) to reach $q'_{TV}$, and $\delta(\cdot)$ for a bottom-overflow node $q_R$ is defined in the same way as for a top-valid node in (9). Again, $\delta(\acute{q}_{TV})$ is intuitively the expected number of drill-downs that terminate at $\acute{q}_{TV}$. For example, in FIG. 2.5 with r=2, we have $\delta(q_A) = 1/2$ and $\delta(q_C) = 2 \cdot (1/2) \cdot (1/2) = 1/2$. Note that when r=1, there is $\delta(q) = p(q)$ for all nodes in all subtrees, essentially reverting the random drill-down process to the state without divide-&-conquer.

Let $Q_{TV}$ be the set of top-valid nodes captured by the random drill-downs over all subtrees. We estimate the database size as $$\tilde{m} = \sum_{q \in Q_{TV}} \frac{|q|}{\delta(q)}. \qquad 10)$$

The unbiasedness of this estimator follows from Theorem 2.1.

For categorical data, the only change required is the depth of each subtree. Instead of having $n_0$ levels for all subtrees, we maintain a (approximately) constant domain size for each subtree. As a result, a categorical subtree could be shallow or deep depending on the fan-outs of attributes involved. In particular, we set $D_{UB}$ as an upper bound on the domain size ($D_{UB} \geq \max_i |D_{UB}(A_i)|$). Each subtree should have the maximum number of levels without exceeding $D_{UB}$. In the running example, if $A_1; \ldots, A_5$ is the attribute order and $D_{UB}=10$, then Levels 1-4 (i.e., $A_1, A_2, A_3$ with domain size of $2^3=8$) and 4-6 (i.e., $A_4, A_5$ with domain size $2 \times 5 = 10$) become the two layers of subtrees. One can see that the unbiasedness is unaffected by the change.

2.4.2.3 Effectiveness on Variance Reduction

Divide-&-conquer is effective on reducing the estimation variance because it provides a significantly better alignment between the selection probability distribution for top-valid nodes and the measure attribute distribution. To understand why, consider a Boolean database with k=1 and two top-valid nodes q and $\acute{q}$ at the second level (i.e., as a child of the root) and the bottom-level (i.e., n+1-th level), respectively. Without divide-&-conquer, at the first drill-down, q has selection probability of 1/2 while $\acute{q}$ may have selection probability as small as $p(\acute{q}) = 1/2^n$. This forms a striking contrast with the uniform distribution of the measure attribute (i.e., $|q|/m = |q|/m' = 1/m$ for each top-valid node), leading to a bad alignment between the two.

With divide-&-conquer, the selection probability for a deep top-valid node like $\tilde{q}$ is significantly increased, while that for a shallow top-valid node like q remains the same. In particular, the expected number of random drill-downs that choose q is $\delta(q) = r/2$. The expected number for $\acute{q}$ is at least $$\delta(\acute{q}) \geq \frac{r^{\lfloor \frac{n-1}{n_0-1} \rfloor}}{2^n} \qquad 11)$$

where $n_0$ is the depth of a subtree and r is the number of drill downs conducted over each subtree. One can see that the difference between $\delta(q)$ and $\delta(\acute{q})$ is reduced by a factor of $r^{\lfloor (n-1)/(n_0-1) \rfloor}$ after divide-&-conquer, leading to a better alignment with the measure attribute distribution.

The total number of queries issued by the divide-&-conquer technique depends on the underlying data distribution. While theoretically a large number of queries may be issued, in practice the query cost is usually very small due to two reasons: (1) One can see from (11) that even a very small r can significantly improve the alignment and thereby reduce the estimation variance. (2) As the experimental results show, for real-world hidden databases, even with a highly skewed distribution, the top-valid nodes are likely to reside on a small number of subtrees. Furthermore, the following theorem shows that with the same query cost divide-conquer can significantly reduce the worst-case estimation variance.

THEOREM 2.4. [Estimation Variance with D&C] When n is sufficiently large, for a given number of queries, in the worst case scenario where a random drill-down without divide-&-conquer generates the largest variance $s^2$, the estimation variance with D&C, $s_{DC}^2$, satisfies $$\frac{s^2}{s_{DC}^2} = O\left(\frac{r^{\log_{D_{UB}} |Dom(A_1, \ldots, A_n)|}}{\log_{D_{UB}} |Dom(A_1, \ldots, A_n)|}\right) \qquad 12)$$

where r is the number of drill-downs performed for each subtree, and $D_{UB}$ is an upper bound on the subdomain size of a subtree.

The proof of the theorem is not included due to space limitation.

2.5 Discussions of Algorithms 2.5.1 Hd-Unbiased-Size

Parameter Settings:

By combining the three ideas, i.e., backtracking-enabled random walk, weight adjustment and divide-&-conquer, Algorithms HD-UNBIASED-SIZE features two parameters: r, the number of random drill-downs performed on each subtree, and $D_{UB}$, the upper bound on the domain size of a subtree. While neither parameter affects the unbiasedness of estimation, they both affect the estimation variance as well as query efficiency. At the extreme cases, divide-&-conquer is disabled when r=1 or $D_{UB} = |Dom(A_1, \ldots, A_n)|$, and crawling essentially occurs when r is extremely large or DUB is extremely small. Thus, an appropriate setting for r and $D_{UB}$ should make a tradeoff between estimation variance and query cost. Theoretical derivation of the optimal values for r and $D_{UB}$ is difficult because of their dependencies on the underlying data distribution. Fortunately, as indicated by Theorem 2.4 and verified by our experiments, the depth of a subtree is the most important factor that determines the estimation variance because the variance changes exponentially with the depth. r, on the other hand, is not a very sensitive factor for the estimation variance. Thus, to perform HD-UNBIASED-SIZE over a hidden database, one should first determine $D_{UB}$ according to the variance estimation. Then, starting from r=2, one can gradually increase the budget r until reaching the limit on the number of queries issuable to the hidden database.

Attribute Order:

We disclose arranging the attributes in decreasing order of their fanouts (i.e., $|Dom(A_1)|$ from the root to the leaf level of the query tree. The reason lies on the query cost with smart backtracking. Recall from subsection 2.3.2 that, with smart tracking, the expected number of branches one need to test for a given node is $QC=1+\Sigma_{j=1}^{w}(wu(j)+1)2/w$, where $\omega Uj$ is the number of underflowing branches immediately preceding the j-th branch. One can see that $\omega_U(j)$ is in general minimized when a high fanout attribute is placed at the top levels of the tree. Thus, the overall query cost will be reduced by sorting all attributes from largest to smallest domains.

2.5.2 Hd-Unbiased-Agg

In this subsection we discuss HD-UNBIASED-AGG, by extending HD-UNBIASED-SIZE to answer SUM and AVG aggregate queries, as well as queries with selection conditions. While our sampler provides unbiased estimates of SUM queries, we point out that it cannot provide unbiased estimations of AVG queries.

For Answering SUM and AVG Queries:

The same random drilldown process can be used to generate unbiased estimate for SUM queries. There is only a slight change on computing the estimation. Consider a SUM query SELECT SUM($A_i$) FROM D. For a random drill-down process (with divide-&-conquer), an unbiased estimator for the SUM query is $$\sum_{q \in q_{TV}} \sum_{t \in q} \frac{t|A_i|}{\delta(q)}, \quad 13)$$

Where $\Sigma_{t \in q} t \lfloor A_i \rfloor$ is the sum of attribute values $A_i$ for all tuples in q, and $Q_{TV}$ is the set of top-valid nodes captured by the random drill-downs over all subtrees.

However, note that the random drill-down process cannot be used as an unbiased estimator for AVG queries. The direct division of the unbiased SUM and COUNT estimators lead to a biased AVG estimator. This is consistent with the observation in [13] that it is extremely difficult to generate unbiased AVG estimations without issuing a very large number of queries (e.g., by using BRUTE-FORCE-SAMPLER).

For Answering Queries with Selection Conditions:

Our previous discussions have been focused on queries that select all tuples in the database. The random drill-down approach can also generate unbiased SUM and COUNT estimates for queries with conjunctive selection conditions. In particular, a conjunctive query can be considered as selecting a subtree which is defined with a subset of attributes (as levels) and, for each attribute involved, a subset of its values (as branches). The random drill-down approach can be applied to the subtree directly to generate unbiased estimations.

2.6. Experiments and Results

In this subsection, we describe our experimental setup and present the experimental results. We carry out empirical studies to demonstrate the superiority of HD-UNBIASED-SIZE and HD-UNBIASED-AGG over BRUTE-FORCE-SAMPLER and CAPTURE-&-RECAPTURE discussed in subsection 2.2. We also draw conclusions on the individual impact of weight adjustment and divide-&-conquer on reducing the estimation variance.

2.6.1 Experimental Setup

1) Hardware and Platform: All our experiments were performed on a 1.99 Ghz Intel Xeon machine with 4 GB of RAM. The HD-UNBIASED-SIZE and HD-UNBIASED-AGG algorithms was implemented in MATLAB for testing offline datasets, and PHP for executions over the real Yahoo! Auto website.

2) Data Sets: Recall that we disclosed three algorithms in this section: BOOL-UNBIASED-SIZE, which applies only to Boolean data, and HD-UNBIASED-SIZE/AQP which apply to both Boolean and categorical data. To test their performance, we consider both Boolean and categorical datasets. To properly evaluate the accuracy of the estimations, we need to know the ground truth on the aggregates being estimated. Thus, we perform the performance comparison experiments on offline datasets to which we have full access. Meanwhile, to demonstrate the practical impact of our techniques, we also test the algorithms over an online hidden database. Both offline and online databases are described as follows. For all databases, we set k=100 unless otherwise specified.

Boolean Synthetic:

We generated two Boolean datasets, each of which has 200,000 tuples and 40 attributes. The first dataset is generated as i.i.d. data with each attribute having probability of p=0.5 to be 1. We refer to this dataset as the Bool-iid dataset. The second dataset is generated in a way such that different attributes have different distribution. In particular, there are 40 independent attributes. 5 have probability of p=0.5 to be 1, while the others have the probability of 1 ranging from 1/70 to 35/70 with step of 1/70. One can see that this dataset features a skewed distribution. We refer to it as the Boolean-mixed dataset.

Offline Yahoo! Auto:

The offline Yahoo! Auto dataset consists of data crawled from the Yahoo! Auto website http://autos.yahoo.com/, a real-world hidden database, in 2007. In particular, the original crawled dataset contains 15,211 used cars for sale in the Dallas-Fort Worth metropolitan area. We enlarged the dataset to 188,790 tuples by following the original distribution of the small dataset, in order to better test the ability of our algorithms over large databases. In particular, the DBGen synthetic data generator [16] was used. There are a total of 38 attributes including 32 Boolean ones, such as A/C, POWER LOCKS, etc, and 6 categorical attributes, such as MAKE, MODEL, COLOR, etc. The domain sizes of categorical attributes range from 5 to 16.

Online Yahoo! Auto:

We also tested our algorithms over the real-world web interface of Yahoo! Auto, a popular hidden database. In particular, we issue queries through the advanced used car search interface available at http://autos.yahoo.com/listings/advanced_search. A specific requirement of this webpage is that either MAKE/MODEL or ZIP CODE must be specified for a query to be processed. To address this requirement, we place the MAKE/MODEL attribute at the top of our query tree and issue every query with its value specified.

3) Aggregate Estimation Algorithms: We tested three algorithms in this section: BOOL-UNBIASED-SIZE, HD-UNBIASED-SIZE, and HD-UNBIASED-AGG. BOOL-UNBIASED-SIZE is parameter-less, while both HD-UNBIASED-SIZE and HD-UNBIASED-AGG feature two parameters: r, the number of drill-downs performed over each subtree, and $D_{UB}$, the maximum subdomain size for each subtree. We tested our algorithms with various parameter settings to illustrate how r and $D_{UB}$ can be properly set in practice.

We also tested two baseline aggregate-estimation algorithms discussed in subsection 2.2: BRUTE-FORCE-SAMPLER [13] and the use of CAPTURE-&-RECAPTURE with HIDDEN-DB-SAMPLER [13]. BRUTE-FORCE-SAMPLER cannot return any result during our test of issuing 100,000 queries, because of the drastic difference between the size of the database and set of all possible tuples. Thus, we compared the performance of our algorithms with CAPTURE-&-RECAPTURE in the experimental results.

4) Performance Measures: For query cost, we focus on the number of queries issued through the web interface of the hidden database. For estimation accuracy, we tested three measures: (1) the mean squared error (MSE), (2) the relative error (i.e., $|\hat{\theta}-\theta|/\theta$ for an estimator $\hat{\theta}$ of aggregate $\theta$), and (3) error bars (indicating one stan-dard deviation of uncertainty).

2.6.2 Experimental Results

We compared the performance of HD-UNBIASED-SIZE, BOOL-UNBIASED-SIZE and CAPTURE-&-RECAPTURE over a Boolean database. For HD-UNBIASED-SIZE, we set parameters r=4 and $D_{UB}=2^5$. FIG. 2.6 depicts the tradeoff between MSE and query cost for the three algorithms for BOOLEAN-iid and BOOLEAN-mixed datasets. One can see from the figure that for both datasets, BOOL-UNBIASED-SIZE and HD-UNBIASED-SIZE generates orders of magnitude smaller MSE than CAPTURE-&-RECAPTURE. Compared with BOOL-UNBIASED-SIZE, HD-UNBIASED-SIZE is capable of further reducing the MSE by up to an order of magnitude (for BOOLEAN-MIXED) thanks to the integration of weight adjustment and divide-&-conquer, the individual effect of each will be discussed later in this subsection.

Another observation from FIG. 2.6 is that the MSE for Boolean-mixed is higher than that for Boolean-iid. This is consistent with our discussions in subsection 2.3.3.2 which show that the MSE is higher over a skewed data distribution, like that of BOOLEAN-Mixed.

To provide an intuitive demonstration of the estimation accuracy, FIG. 2.7 depicts the tradeoff between relative error and query cost for the three algorithms under the same settings as FIG. 2.6. FIG. 2.8 further shows the error bars for HD-UNBIASED-SIZE. One can see that both BOOL-UNBIASED-SIZE and HD-UNBIASED-SIZE are capable of producing smaller than 2% relative error for both datasets with fewer than 500 queries. In particular, all error bars of HD-UNBIASED-SIZE are within the range of 99%-101.5%. This shows that our algorithm is capable of producing accurate estimates even for a database with skewed underlying distribution, like Boolean-Mixed. FIGS. 2.9 and 2.10 depict the performance of HD-UNBIASED-SUM over the SUM of a randomly chosen attribute. The observations are similar to the COUNT case.

We tested HD-UNBIASED-SIZE with varying database size m. FIGS. 2.11 and 2.12 depict the change of MSE and query cost, respectively, when m varies from 50,000 to 300,000. The parameters are r=4 and $D_{UB}=16$. One can see from the figure that the MSE increases (approximately) linearly with the database size. This is consistent with our theoretical analysis in Theorem 2.3. The query cost also increases linearly with m, showing the scalability of our algorithm to large databases. One can observe from the figures that while the increase of query cost with m is always equal for Boolean-iid and Boolean-Mixed, the difference between their MSE become larger when m increases. This is because the larger the Boolean-Mixed database is, the "more skewed" its distribution on the query tree will be, leading to a larger estimation variance.

To study how the value of k for the top-k interface affects the performance of our algorithm, we tested HD-UNBIASED-SIZE with k ranging from 100 to 500. The changes of MSE and query cost are shown in FIG. 2.13. One can see that from the figure that with a larger k, both MSE and query cost decreases, leading to a more efficient and accurate estimation.

We also studied the individual effects of weight adjustment and divide-&-conquer to variance reduction. In particular, We tested the performance of the following four algorithms over the categorical offline Yahoo! Auto dataset: (1) HD-UNBIASED-SIZE, (2) HD-UNBIASED-SIZE without weight adjustment, (3) HD-UNBIASED-SIZE without divide-&-conquer (i.e., by setting r=1), and (4) HD-UNBIASED-SIZE with neither weight adjustment nor divide-&-conquer. For HD-UNBIASED-SIZE, we set r=5 and $D_{UB}=16$. FIG. 2.14 depicts the tradeoff between MSE and query cost for all four algorithms. FIG. 2.15 further shows the error bars for (1) which has the best performance.

We studied how the parameters of HD-UNBIASED-SIZE affect its performance. FIG. 2.16 depicts the change of MSE and query cost when r, the number of drill-downs per subtree, varies between 4 and 8. We conducted the experiment with $D_{UB}=16$. One can see that the larger r is, the more queries will be issued, and the smaller the estimation variance will be. This is consistent with our intuitive discussions in subsection 2.5.1.

FIG. 2.17 shows the change of MSE and query cost when $D_{UB}$ varies between 16 and 104544 (the domain size of the database). The experiment was conducted when r=5. One can see from the figure that the larger $D_{UB}$ is, the fewer queries need to be issued, but the MSE will increase correspondingly.

We also tested the impact of r on the tradeoff between MSE and query cost. In particular, we set $D_{UB}=16$. For each value of r, we repeat the execution of HD-UNBIASED-SIZE for certain number of times to reach a similar query cost. Then, we compute MSE based on the average of the estimations from the repeated runs. The results are as follows.

| r | 3 | 4 | 5 | 6 | 7 | 8 |
|---|---|---|---|---|---|---|
| Query Cost | 440 | 466 | 494 | 373 | 473 | 607 |
| MSE($\times 10^{10}$) | 4.53 | 4.84 | 4.29 | 4.83 | 4.66 | 3.53 |

One can see that the tradeoff between MSE and query cost is not sensitive to the value of r. This verifies our discussions in subsection 2.5.1 for the setting of r.

Finally, we tested HD-UNBIASED-SIZE and HD-UNBIASED-AGG over the real-world web interface of Yahoo! Auto. Note that Yahoo! enforces a limit on the frequency of queries issued from an IP address. This prevents us from issuing a large number of queries for the experiments. In particular, we conducted 10 executions of HD-UNBIASED-SIZE to estimate the number of Toyota Corollas in the database (issuing an average of 193 queries per execution). The parameters are set as r=30, $D_{UB}=126$. FIG. 2.18 shows the estimations generated after each round of execution. One can see from the figure that our estimations are close to 13613, the COUNT disclosed on the Yahoo! website. FIG. 2.19 shows estimations generated by HD-UNBIASED-AGG for the total inventory balance (i.e., sum of prices) for cars of five popular models, with up to 1,000 queries issued for each estimation. The ground truth on such information is not disclosed on the Yahoo! website.

2.7 Conclusion

In this section we have initiated an investigation of the unbiased estimation of the size and other aggregates over hidden web databases through its restrictive web interface. We disclosed backtrack-enabled random walk schemes over the query space to produce unbiased estimates for SUM and COUNT queries, including the database size. We also disclosed two ideas, weight adjustment and capture-&-recapture, to reduce the estimation variance. We provided theoretical analysis for estimation accuracy and query cost of the disclosed ideas. We also described a comprehensive set of experiments that demonstrate the effectiveness of our approach over synthetic and real-world hidden databases.

3. Attribute Domain Discovery for Hidden Web Databases
3.1 Introduction
The Attribute Domain Discovery Problem:

In this section, we disclose novel techniques to discover the attribute domains, i.e., the set of possible values for each attribute, from hidden web databases, by external users. Hidden databases, as a large portion of the deep web, are hidden behind restrictive form-like interfaces which allow a user to form a search query by specifying the desired values for one or a few attributes; and the system responds by returning a small number of tuples satisfying the user-specified search condition. A typical example of a hidden database is the award search database of the US National Science Foundation (NSF) (available at http://www.nsf.gov/awardsearch/tab.do?dispatch=4), which allows users to search for NSF-award projects featuring user-specified values on up to 20 attributes.

Each attribute specifiable by users through the form-like interface is represented by an input control on the interface. For certain types of controls, e.g., drop-down menus and radio buttons, the attribute domain can be readily retrieved by external users from source code of the interface (e.g., an HTML file). In the NSF example, attributes such as "NSF organization" and "Award Instrument" belong to this category. For other controls, especially text-boxes (without features such as autocompletion), no domain information is provided. Attributes such as "Program Manager" belong to this category.

The focus of this section is to disclose domain discovery techniques, restricted to accessing the database only via the proprietary form interface, that external users can employ to unveil possible attribute values that appear in tuples of the hidden databases. An important design goal of these techniques is to unveil all (or most) attribute values by issuing only a small number of queries, and to provide analytical guarantees on the coverage and query cost of our methods.

We emphasize that in this section, we do not consider approaches to the domain discovery problem that rely on external knowledge sources or domain experts to provide the required domain values. While the use of external knowledge sources may have applicability in very general scenarios (e.g., the use of a USPS data source to list all values of an attribute such as "zipcode"), these approaches will not work in more focused applications such as the "Program Manager" attribute on the NSF award search database. We disclose automated domain discovery algorithms that can power a variety of third-party applications only using the public interfaces of these databases, and without requiring any further collaborations or agreements with the database owners.

Applications:

Domain discovery from hidden databases belongs to the area of information extraction and deep web analytics (see tutorials in [29, 32] and survey in [38]). To the best of our knowledge, the only prior work that tackles our specific problem of discovering attribute domains of hidden databases is [25]. This problem has a broad range of applications. First and foremost, it serves as a critical prerequisite for data analytics over hidden databases, because all existing aggregate estimation [30] and sampling [13, 14, 31] techniques for hidden databases require prior knowledge of the attribute domains. In addition, the attribute domains being discovered can be of direct interest to third-party web mashup applications. For example, such an application may use the discovered attribute domains to add autocompletion feature to text-boxes in the original form-like interface, so as to improve the usability of the interface. The discovered domains may also be used to identify mapping between attributes in different hidden databases to facilitate the creation of mashup.

Challenges:

The main challenges to effective attribute domain discovery are the restrictions on input and output interfaces of hidden databases. Normally, input interfaces are restricted to issuing only search queries with conjunctive selection conditions—which means that queries like SELECT UNIQUE (Program Manager) FROM D cannot be directly issued, eliminating the chance of directly discovering the domain of "Program Manager" through the interface.

The output interface is usually limited by a top-k constraint—i.e., if more than k tuples match the user-specified condition, then only k of them are preferentially selected by a scoring function and returned to the user. This restriction eliminates the possibility of trivially solving the problem by issuing the single query SELECT * FROM D and then discovering all attribute domains from the returned results.

The existing technique for attribute domain discovery is based on crawling the database [25]. A simple instantiation of crawling is to start with SELECT * FROM D, then use domain values returned in the query answer to construct future queries, and repeat this process until all queries that can be constructed have been issued. One can see that no algorithm can beat the comprehensiveness of attribute domain discovery achieved by crawling. But crawling requires an extremely large number of queries to complete, and since most hidden databases enforce a limit on the number of queries one can issue over a period of time (e.g., 1,000 per IP address per day), or even charge per query, often the crawling process has to be terminated prematurely. Due to this reason, such techniques cannot provide any guarantees on the comprehensiveness of discovered attribute domains.

A seemingly promising way to address the query cost problem of crawling is to instead perform sampling—i.e., one first draws representative samples from the hidden database, and then discover attribute domains from the sample tuples to achieve statistical guarantees on the comprehensiveness of domain discovery. Sampling of hidden databases is an intensively studied problem in recent years [13, 14, 31]. Nonetheless, a key obstacle here is a "chicken-and-egg" problem—i.e., all existing sampling algorithms for hidden databases require the attribute domains to be known in the first place, preventing them from being applied to hidden databases with unknown attribute domains.

Outline of Technical Results:

In this section we disclose query-efficient attribute domain discovery over hidden databases. We consider two types of output interfaces commonly offered by hidden databases: COUNT and ALERT. For a user-specified query, a COUNT interface returns not only the top-k tuples, but also the number of tuples matching the query in the database (which can be greater than k). ALERT interface, on the other hand, only alerts the user with an overflow flag when more than k tuples match the query, indicating that not all tuples which match the query can be returned. The NSF award database features an ALERT interface.

For COUNT interface, we start by discussing the feasibility of developing deterministic algorithms for attribute domain discovery. Our main results are two achievability conditions—lower bounds on k and query cost, respectively—which a deterministic algorithm must satisfy to guarantee the discovery of all attribute domains. Unfortunately, neither condition is achievable in practice for a generic hidden database. Nonetheless, we find that efficient and complete attribute domain discovery is indeed possible for a special type of (perhaps unrealistic) databases in which each attributes has only two domain values. For this special case, we disclose B-COUNT-DISCOVER, a deterministic algorithm based on the key idea of constructing a series of nested search spaces for unknown domain values, and prove that the algorithm guarantees the discovery of all attribute domains with only $O(m^2)$ queries, where m is the number of attributes, as long as k≥2.

Our main observation from B-COUNT-DISCOVER is an understanding of why it cannot be extended to generic hidden databases containing attributes with arbitrary-sized domains—we find the main reason to be the large number of queries required by a deterministic algorithm to decide how to construct the nested search space. To address this, we consider the design of randomized algorithms which allows query-efficient randomization of the nested-space construction process. To this end, we disclose RANDOM-COUNT-DISCOVER, a Monte Carlo algorithm which only requires a small amount of queries to discover a large number of domain values.

For ALERT interface, we similarly prove the infeasibility of developing a query-efficient deterministic algorithm which guarantees complete attribute domain discovery. Our main result here is then an extension of RANDOM-COUNT-DISCOVER to RANDOM-ALERT-DISCOVER, a Monte Carlo algorithm which achieves similar performance to RANDOM-COUNT-DISCOVER by estimating COUNTs of queries based on historic query answers, and using estimated COUNTs to bootstrap RANDOM-COUNT-DISCOVER to discover domain values.

In summary, the main contributions of this section are as follows:

- We discuss attribute domain discovery over a hidden database through its restrictive web interface.
- We derive the achievability conditions for complete attribute domain discovery on k and the query cost. These conditions indicate the infeasibility of designing a query-efficient deterministic algorithm which guarantees the discovery of all attribute domains.
- We disclose two randomized algorithms, RANDOM-COUNT-DISCOVER and RANDOM-ALERT-DISCOVER, for COUNT and ALERT interfaces, respectively. Both algorithms require only a small amount of queries to develop a large number of domain values.
- We provide a thorough theoretical analysis and experimental studies that demonstrate the effectiveness of our disclosed algorithms over the real-world NSF award search database and a local patient discharge dataset.

Section Organization:

In subsection 3.2 we introduce preliminaries and discuss simple but ineffective crawling algorithms for attribute domain discovery over hidden databases. Subsections 3.3 and 3.4 are devoted to the development of deterministic and randomized algorithms for COUNT interfaces, respectively. In subsection 3.5 we extend the results to ALERT interfaces. Section 3.6 contains a detailed experimental evaluation of our disclosed approaches, followed by conclusion in Section 3.7.

3.2 Preliminaries 3.2.1 Model of Hidden Databases

Consider a hidden database table D with n tuples. Let there be m attributes $A_1, \ldots, A_m$ which can be specified through the input interface, and $V_i$ be the domain of $A_i$. We assume each tuple to be unique, and each value in $V_i$ (i∈[1, m]) to occur in at least one tuple in the database, because otherwise $V_i$ can never be completely discovered from the database. Consider a prototypical interface which allows user to query D by specifying values for a subset of attributes—i.e., to issue queries q of the form:

SELECT * FROM D WHERE $A_{i_1}=v_{i_1}$ & ... & $A_{i_s}=v_{i_s}$,

Where $v_{ij} \in V_{ij}$. Let Sel(q) be the set of tuples in D which satisfy q. Since the interface is restricted to return up to k tuples, a overly broad query (i.e., |Sel(q)|>k) will overflow and return only the top-k tuples in Sel(q) selected according to a scoring function. In addition, a COUNT interface will return |Sel(q)|, the number of tuples satisfying q, while an ALERT interface will return an overflow flag indicating that not all tuples which satisfy q can be returned.

When a query does not overflow, COUNT and ALERT interfaces return the exact same information to the user. In particular, if the query is too specific to return any tuple, we say that an underflow occurs. If there is neither overflow nor underflow (i.e., |Sel(q)|∈[1, k]), then Sel(q) will be returned in its entirety and we have a valid query result. For each tuple returned by an overflowing or valid query, the values of all its attributes are displayed, enabling the discovery of domain values of an attribute with unknown domain.

Running Example:

We consider a running example of the above mentioned NSF award search database with k=50. There are 9 attributes, award amount, instrument, PI state, field, program manager, NSF organization, PI organization, City, and ZIP code, with domain sizes 5, 8, 58, 49, 654, 58, 3110, 1093, 1995, respectively (these are the estimates we generated by running our domain discovery algorithms to be presented in this section for an extended period of time. We do not have the ground truth for all attributes. But they can be safely considered as lower bounds on domain sizes).

3.2.2 Problem Definition

We consider the problem of attribute domain discovery—i.e., the discovery of $V_1, \ldots, V_m$ through the restrictive interface. Since many hidden databases impose limits on the number of queries one can issue through their interfaces over a period of time, the performance of a domain discovery algorithm should be measured by not only the comprehensiveness of discovered domain values, but also the query cost, i.e., the number of queries issued through the interface of hidden database for domain discovery.

While the metric for query cost is straightforward, to measure the comprehensiveness of discovered domain values we consider the following two metrics.

Coverage, i.e., the total number of domain values discovered for one or a set of attributes.

Recall, i.e., the number of tuples in the database for which all attribute values (of $A_1, \ldots, A_m$) have been discovered.

Note that while the two metrics are positively correlated (e.g., a recall of n indicates a coverage of $|V_i|$ for each $A_i$), they may be preferred in different applications. For example, if the objective of domain discovery is to unveil the metadata, e.g., to discover the list of program managers from the NSF award database, then coverage is a more important metric. If the objective is to enable data analytics over the hidden database, then recall is more important as it guarantees how many tuples will be covered by the subsequent aggregate estimation and sampling algorithms.

Given the measures for comprehensiveness and query cost, we define the problem of attribute domain discovery as follows:

Problem Statement:

How to maximize the coverage and recall of attribute domain discovery while minimizing the query cost through COUNT and ALERT interfaces, respectively.

2.3 Crawling-Based Algorithms

In this subsection, we consider depth-first search (DFS) and breadth-first search (BFS), two simple crawling-based algorithm for attribute domain discovery, and point out their problems in terms of the tradeoff between coverage/recall and query cost. Both algorithms start with SELECT * FROM D to learn the first few domain values, but then take different methods to construct the subsequent queries.

DFS:

With DFS, one constructs the next query by finding an attribute that is not specified in the previous one, and then adding to the previous query a conjunctive condition defined by the attribute and one of its already discovered domain values. Such a process continues, with DFS learning all domain values from tuples returned by each issued query, until either the query returns underflows/valid or no discovered domain value is available for constructing the next query, at which time the algorithm backtracks by removing the last-added condition and adding a new one based on another discovered domain value. We refer to the algorithm as DFS because it keeps increasing the number of predicates included in the query if possible.

A main problem of DFS, however, is poor coverage and recall when a large number of attributes are strongly correlated with the first few attributes appended to SELECT * FROM D. For example, consider the case where $A_1=v_1$ is first appended to the SELECT * query, and $A_1 \rightarrow A_m$ forms a functional dependency. Since DFS with a small query budget is likely to explore only queries with predicate $A_1=v_1$, the domain values of $A_m$ which are corresponding to the other values of $A_1$ will not be discovered.

BFS:

With BFS, one first exhausts all 1-predicate queries that can be constructed from discovered domain values, before moving forward to construct and issue 2-predicate queries, etc. The main problem of BFS arises when a large number of domain values are strongly correlated with the scoring function used to select the top-k tuples, because BFS with a small query budget is likely to issue only overflowing queries. For example, consider a total order of values for $A_m$ and suppose that tuples with "larger" $A_m$ receives higher scores. Then, BFS will likely to only discover the larger values of $A_m$.

3.3. Deterministic Algorithms for Count Interfaces

In this subsection, we analyze the achievability conditions for attribute domain discovery over a top-k-COUNT interface, and also develop deterministic algorithms which guarantee the discovery of all attribute domains when the achievability conditions are met. The purpose of introducing deterministic algorithms is to use them as the basis for our design of more efficient randomized algorithms in subsection 3.4.

3.3.1 Discover Binary Domains

We start with a simple case where each attribute has only two possible values, both unknown to the third-party analyzer. The third-party analyzer may or may not know the binary nature of all attributes—our results apply either way. An example of such an attribute is transmission for an auto database which has two values, "manual" and "automatic". While hardly any practical database consists solely of binary attributes, the results in this subsection are illustrative when considering extensions to handle arbitrary attribute domains, as we shall show in the next subsection.

3.3.1.1 Achievability of Domain Discovery

Before devising concrete attribute domain discovery algorithms, we first consider the problem of achievability—i.e., whether it is at all possible for the third-party analyzer to discover all attribute domains from the top-k interface. There are two sub-problems: (1) whether complete attribute domain discovery is possible when the analyzer can afford an unlimited query cost, and (2) if the first answer is yes, then what is the minimum number of queries required by a deterministic algorithm to accomplish attribute domain discovery in the worst case?

Our main results, as shown by the following three theorems, can be summarized as follows: The answer to the first question is a lower bound on k—i.e., no algorithm without knowledge of the scoring function can guarantee complete discovery over any hidden database if k=1, while complete discovery is always possible for any combination of database and scoring function when k≥2. For the second question, if k≥2, a deterministic algorithm require (at least) $\Omega(m^2/\log m)$ queries to discover all attribute domains in the worst case, where m is the number of attributes, unless k≥n, in which case SELECT * FROM D returns all tuples in the database.

THEOREM 3.3.1. If k=1, then for any given binary database, there exists a scoring function such that no algorithm can discover the domains of all attributes.

PROOF. This impossibility proof is simple—Let the tuple returned by SELECT * FROM D be $t=[0_1, \ldots, 0_n]$. Assign the highest score to t. One can see that no algorithm can discover any domain value other than $\{0_1, \ldots, 0_n\}$. QED.

THEOREM 3.3.2. For any given number of attributes m, there exists a binary database and a scoring function such that no deterministic algorithm can complete attribute domain discovery without incurring a worst-case query cost of $\Omega(m^2/\log m)$ even if k≥2.

PROOF. For the sake of simplicity, we consider the case where m is even. The case where m is odd can be proved in analogy. We construct a set of $2^{m^{2/4}}$ database instances $D_1, \ldots, D_{2^{m^{2/4}}}$ as follows: Each instance $D_i$ consists of $2^{m/2}+m/2$ tuples $t_1, \ldots, t_{2^{m/2}+m/2}$. We consider the first $2^{m/2}$ tuples first—for these tuples (i.e., with $i \in [1, 2^{m/2}]$), if $j \in [1, m/2]$, $t_i[A_j]=0_j$ (resp. $1_j$) iff the j-th most significant bit of the binary representation of i−1 is 0 (resp. 1); if $j \in [m/2+1, m]$, then there is always $t_i[A_j]=0_j$.

For the latter m/2 tuples, their values of $A_{m/2+1}, \ldots, A_m$ are set such that $t_i[A_j]=1_j$ iff $i=2^{m/2}-m/2+j$, and $t_i[A_j]=0_j$ otherwise. For the values of $A_1, \ldots, A_{m/2}$ of these tuples, they are set such that each database instance has a different combination of the m/2 tuples. Note that for each tuple, there are $2^{m/2}$ possible choices. Thus, we can construct $(2^{m/2})^{m/2}=2^{m^{2/4}}$ different database instances. The scoring function for each instance is designed with only one condition: each tuple which satisfies $t_i[A_j]=0_j$ for all $j \in [m/2+1, m]$ has a higher score than all tuples which do not satisfy this condition.

There are two important observations one can make from the above construction when k=2. First, each database instance requires a different sequence of queries to unveil all domain values. The reason for this is because the only way to unveil $1_j$ for $j \in [m/2+1, m]$ is to issue a query that contains at least m/2 predicates corresponding to the values of $A_1, \ldots, A_{m/2}$ for tuple $t_{2^{m/2}-m/2+j}$, respectively. Since each database instance has a different combination of values for $t_{2^{m/2}+1}, \ldots, t_{2^{m/2}+m/2}$, each instance requires a different sequence of queries for complete attribute domain discovery.

The second important observation is that the ability for any query to distinguish between the $2^{m^{2/4}}$ database instances is limited. Note that if only the returned tuples are concerned, then almost all queries (except those that unveil one of $1_j$ for $j \in [m/2+1, m]$) return the exact same tuples when k=2. The more powerful distinguishing factor is COUNT. Nonetheless, the COUNT of any query has only m/2 different answers for all database instances, because after all these instances differ by at most m/2 tuples.

Since we focus on deterministic algorithms, it is impossible for an algorithm to receive the same answer for all previous queries but then issue a different query in the next step for two database instances. Thus, in order for the algorithm to have a different sequence of queries for each database instance, the query cost is at least $\log_{m/2} 2^{m^{2/4}}$, i.e., $\Omega(m^2/\log m)$. QED.

Given the achievability conditions shown in the above two theorems, we now show the existence of a deterministic algorithm that is capable of discovering all attribute domains when the achievability conditions are met, and achieves a near-optimal query cost (within a factor of log m where m is the number of attributes).

THEOREM 3.3.3. If $k \geq 2$, there exists a deterministic algorithm which guarantees complete attribute domain discovery for all binary databases and all scoring functions with a query cost of $O(m^2)$.

The following deterministic algorithm, B-COUNT-DISCOVER, serves as the proof. One can see from this theorem that for databases with only binary domains, the problem of attribute domain discovery can indeed be solved with a small query cost as long as $k \geq 2$.

3.3.1.2 B-Count-Discover

B-COUNT-DISCOVER starts by issuing query $q_1$: SELECT * FROM D. Without loss of generality, let $t:[0_1, \ldots, 0_m]$ be a tuple returned by $q_1$. Since $k \geq 2$, there must be another tuple returned by $q_1$ which differs from t on at least one attribute value. Again without loss of generality, let such an attribute be $A_1$—i.e., the analyzer learns from the answer to $q_1$ at least the following m+1 values: $\{0_1, \ldots, 0_m, 1_1\}$. The objective of B-COUNT-DISCOVER then becomes to unveil $1_2, \ldots, 1_m$.

To discover any of these values, say $1_m$, we essentially need to find a tuple with $A_m = 1_m$. Initially, the search space—i.e., the set of possible tuple values in the database featuring $A_m = 1_m$—is very large. In particular, the initial space $S_1(1_m)$ is formed by all possible value combinations for $A_1, \ldots, A_{m-1}$ (and $A_m = 1_m$) and thus of size $2^{m-1}$. Our main idea of B-COUNT-DISCOVER is to shrink the search space by leveraging COUNT information provided by the interface. In particular, we construct a series of nested spaces $S_1(1_m)$, $S_2(1_m), \ldots$, each half the size of the preceding one, while ensuring that every $S_i(1_m)$ contains at least one tuple in the database with $A_m = 1_m$. Then, even in the worst-case scenario, we can unveil $1_m$ when the search space is shrinked to size 1—by simply issuing an (m−1)-predicate query with $A_1, \ldots, A_{m-1}$ specified according to the value left in the search space.

To understand how the nested spaces are constructed, consider the following three queries.

$q_2$. SELECT * FROM D WHERE $A_m = 0_m$
$q_3$. SELECT * FROM D WHERE $A_1 = 0_1$
$q_4$. SELECT * FROM D WHERE $A_1 = 0_1$ AND $A_m = 0_m$

Let $C(q_i)$ be the COUNT returned alongside query $q_i$. We can compute from the query answers $C_1$: COUNT ($A_1 = 0_1$ AND $A_m = 1_m$) and $C_2$: COUNT ($A_1 = 1_1$ AND $A_m = 1_m$) as $$C_1 = C(q_3) - C(q_4), \qquad (1)$$

$$C_2 = C(q_1) - C(q_2) - C(q_3) - C(q_4)) \qquad (2)$$

Note that either $C_1$ or $C_2$ (or both) must be greater than 0 if $1_m$ occurs in the database. Suppose that $C_1 > 0$. We can now shrink our search space by half to size $2^{m-2}$—by constructing $S_2(1_m) \subset S_1(1_m)$ with only values in $S_1(1_m)$ which satisfy $A_1 = 0_1$. One can see that, since $C_1 > 0$, at least one value in $S_2(1_m)$ appears in the database and has $A_m = 1_m$.

The shrinking process continues from here. To see how, note that since $C_1 > 0$, $q_3$ either returns a tuple with $A_m = 1_m$ or overflows. If $q_3$ overflows without returning $1_m$, there must exist another attribute (in $A_2, \ldots, A_{m-1}$) which has both values appearing in the k tuples returned for $q_3$. Without loss of generality, let the attribute be $A_2$. We now issue the following two queries.

$q_5$. SELECT * FROM D WHERE $A_1 = 0_1$ AND $A_2 = 0_2$
$q_6$. SELECT * FROM D WHERE $A_1 = 0_1$ AND $A_2 = 0_2$ AND $A_m = 0_m$

Similar to the last step, we compute $C_3$: COUNT ($A_1 = 0_1$ AND $A_2 = 0_2$ AND $A_m = 1_m$) and $C_4$: COUNT ($A_1 = 0_1$ AND $A_2 = 1_2$ AND $A_m = 1_m$) as $$C_3 = C(q_5) - C(q_6), \qquad 3)$$

$$C_4 = C(q_3) - C(q_4) - C(q_5) - C(q_6)). \qquad 4)$$

Again, at least one of $C_3$ and $C_4$ must be greater than 0 because $C_1 > 0$. Suppose that $C_4 > 0$. We can then further shrink our search space to size $2^{m-3}$ by constructing $S_3(1_m) \subset S_2(1_m)$ with only values in $S_2(1_m)$ which satisfies $A_2 = 1_2$. Once again, at least one value in $S_3(1_m)$ appears in the database and has $A_m = 1_m$ because $C_4 > 0$. Note that before the next shrinking step, we might need to issue $q_7$. SELECT * FROM D WHERE $A_1 = 0_1$ AND $A_2 = 1_2$ in order to discover the complete domain of another attribute (in $A_3, \ldots, A_{m-i}$), so that we can continue the shrinking process. Note that similar to the discovery of $A_2$'s domain from $q_3$, this discovery is guaranteed by $q_7$ because it either returns a tuple with $A_m = 1_m$ (which accomplishes our task) or overflows, in which case at least one attribute unspecified in $q_7$ must have different values appear in the $k \geq 2$ tuples returned by $q_7$.

One can see that eventually, we can always discover $1_m$ after issuing at most 3m queries, because the search space would then become $S_m(1_m)$ of size 1. Thus, B-COUNT-DISCOVER requires a query cost of $O(m^2)$. This concludes the proof of Theorem 3.3.3.

3.3.2 Discover Arbitrary Domains

We now extend our results for binary domains to arbitrary domains. We start by showing that the originally practical achievability conditions for binary domains, i.e., lower bounds on k and query cost, now become unrealistic for arbitrary domains. Then, we illustrate the fundamental reason for such a change which motivates our design of randomized algorithms in the next section.

3.3.2.1 Achievability of Attribute Domain Discovery

For arbitrary domains, the achievability condition for attribute domain discovery imposes a much large lower bound on k, as indicated by the following theorem. Recall that $|V_i|$ is the domain size of $A_i$.

THEOREM 3.3.4. If $k < 1 + \Pi_{i=1}^{m}(|V_i| - 1)$, then no deterministic algorithm can guarantee the discovery of all attribute domains for all database instance/scoring function combinations.

PROOF. Arbitrarily pick one attribute value $v_i$ from each $V_i (i \in [1, m])$, respectively. Consider a database D formed by $1 + \Pi_{i=1}^{m}(|V_i| - 1)$ tuples. $\Pi_{i=1}^{m}(|V_i| - 1)$ of them are the Cartesian product of $V_i \setminus \{v_i\}$ for all $i \in [1, m]$. The one additional tuple is $t:[v_1, \ldots, v_m]$. Suppose that t has the lowest score. One can see that no algorithm can discover any of $v_i, \ldots, v_m$ if t is not returned by SELECT * FROM D. Thus, no algorithm can guarantee complete attribute domain discovery when $k < 1 + \Pi_{i=1}^{m}(|V_i| - 1)$. QED.

One can see from Theorem 3.3.4 that the binary-case result, Theorem 3.3.1, is indeed a special case when $|V_1| = \ldots = |V_m| = 2$. Another observation from Theorem 3.3.4 is that the lower bound on k has now become hardly reachable because real-world database often features a number of attributes with large domains.

Running Example:

The NSF award search database requires $k \geq 1+\Pi_{i=1}^{m}(|V_i|-1)=1.93 \times 10^{19}$ to guarantee complete attribute domain discovery.

What reinforces this impracticability result is the following theorem. Note that since the achievability condition on k is now infeasible, it makes little practical sense for us to assume $k \geq 1+\Pi_{i=1}^{n}(|V_i|-1)$, as in the binary case, when deriving the lower bound on query cost. As such, we consider the following question: for a given value of k, is it possible for a deterministic algorithm to use a small number of queries to discover all domain values that can be discovered from such a top-k interface (given unlimited query cost)? The following lower bound on k shows that the answer to this question is also no for hidden databases with arbitrary domains.

THEOREM 3.3.5. For given k and m, there exists a database and a scoring function such that no deterministic algorithm can complete the discovery of all domain values that can be discovered from the top-k COUNT interface without incurring a worst-case query cost of $$\Omega\left(\frac{m^2 \cdot |V_{max}| \cdot \log|V_{max}|}{k \cdot \log(m \cdot |V_{min}|)}\right) \quad 5)$$

where $|V_{max}|$ and $|V_{min}|$ are the maximum and minimum values in $|V_1|, \ldots, |V_m|$, respectively.

The proof of this theorem follows in analogy to Theorem 3.3.2. We do not include it due to the space limitation. One can see that the binary-case lower bound on query cost, Theorem 3.3.2, is indeed a special case of Theorem 3.3.5 when $|V|=2$ and $k=2$. Another observation from Theorem 3.3.5 is that this arbitrary-domain lower bound on query cost, just like the lower bound on k, is hardly achievable in practice, especially when the hidden database contains one or a few attributes (e.g., ZIP code) with large domains.

Running Example:

With the setting of our NSF award search example, $m^2 \cdot |V_{max}| \cdot \log|V_{max}|/(k \cdot \log(m \cdot |V_{min}|))$. While the bound may differ by a constant factor, $10^4$ is at least an order of magnitude larger than what one would desire for attribute domain discovery (e.g., in our experimental results).

Although the achievability conditions for both k and query cost are unrealistic for arbitrary domains, in the following we still extend B-COUNT-DISCOVER to COUNT-DISCOVER, a deterministic algorithm that is capable of discovering all attribute domains. Of course, the extended algorithm has to follow the achievability conditions and therefore cannot provide meaningful worst-case performance. Our main purpose of studying it is to identify which part of the extension causes the significant increase on query cost. Theorem 3.3.6 summarizes the query cost of COUNT-DISCOVER.

THEOREM 3.3.6. For an m-attribute database with $k \geq 1+\Pi_{i=1}^{n}(|V_i|-1)$, there exists an algorithm which requires at most $$\sum_{i=1}^{m}\left((2|V_{d_i}|-1) \cdot \sum_{j=1}^{m-i+1}\left(\frac{|V_{d_j}| \cdot (|V_{d_j}|-1)}{2}\right)\right) \quad 6)$$

queries to discover all attribute domains, where $d_1, \ldots, d_m$ is the permutation of $1, \ldots, m$ which satisfies $|V_{d_1}| \geq \ldots \geq |V_{d_m}|$.

Running Example:

With NSF award search example, the worst-case query cost of COUNT-DISCOVER is $1.07 \times 10^{11}$, orders of magnitude larger than what one can afford.

Similar to the binary case, we explain the proof of this theorem in the description of COUNT-DISCOVER. Note yet again that the binary-case result, Theorem 3.3.3, is a special case of Theorem 3.3.6 when $|V_i|=2$ for all $i \in [1, m]$. Nonetheless, unlike in the binary case where B-COUNT-DISCOVER has a query cost within a factor of O(log m) from optimal, the query cost of COUNT-DISCOVER is further away from the lower bound in Theorem 3.3.5. In particular, observe from Theorem 3.3.6 the worst-case query cost of COUNT-DISCOVER is $\Omega(|V_{d_1}|^2+|V_{d_m}|^3)$, a factor of $O(|V_1|+|V_{d_m}|^2)$ from optimal. We did not pursue to close this gap for two reasons: First, since the lower bound itself is infeasible in practice, even an optimal algorithm would not be practical anyway. Second, our purpose of introducing COUNT-DISCOVER is not to promote its practical usage, but to use the comparison between B-COUNT-DISCOVER and COUNT-DISCOVER to illustrate the main obstacle facing the discovery of arbitrary attribute domains, which motivates our design of efficient (and thus practical) randomized algorithms.

3.3.2.2 Count-Discover

We now extend B-COUNT-DISCOVER to arbitrary domains, given the condition that $k \geq 1+\Pi_{i=1}^{n}(|V_i|-1)$. Note that this lower bound on k guarantees that SELECT * FROM D must reveal the complete domain for at least one attribute, assumed to be $A_1$ without loss of generality. In addition, it must reveal at least one domain value for the remaining m−1 attributes, assumed to be $0_2, \ldots, 0_m$. As such, the objective of COUNT-DISCOVER is to unveil $1_i, \ldots, (|V_i|)_i$ for all $i \in [2, m]$.

Like in the binary case, we consider the discovery of an arbitrary attribute domain, say $V_m$, by constructing a series of nested spaces that are guaranteed to contain at least one tuple in D which has its value of $A_m$ yet to be discovered. Consider the worst-case scenario where the only value of $V_m$ revealed by SELECT * FROM D is $0_m$. The starting search space $S_1(V_m)$ then has a size of $(|V_m|-1) \cdot \Pi_{i=1}^{m-1}|V_i|$. Since we already know the complete domain of $A_1$, the next step is to find one value in $V_1$ which can be used to construct the next nested space—which must guarantee the appearance of at least one value in $1_m, \ldots, (|V_i|)_m$.

In the binary case, we only need to determine whether $0_1$ can be used because if it cannot, then $1_1$ can always be used because $A_1$ has only these two possible values. In particular, the judgment for 0i can be done with just two queries—WHERE $A_1=0_1$ and WHERE $A_1=0_1$, and $A_m=0_m$—because we can then infer the COUNT of tuples that satisfy $A_1=0_1$ and $A_m=1_m$. Note that for arbitrary domains, we can still determine whether $0_1$ can be used with the two exact same queries, because they now reveal the COUNT of tuples that satisfy $A_1=0_1$ and have their values of $A_m$ yet to be discovered. Nonetheless, since the domain of $A_1$ is much larger (than binary), we must continue testing other values of $A_1$ if $0_1$ cannot be used. In the worst-case scenario, we may not be able to find the next search space until testing $|V_1|-1$ possible values of $A_1$. Thus, at this step, the query cost for arbitrary domain becomes $|V_1|-1$ times as large as that for binary domain.

Let $w_1 \in V_1$ be the value we find and use to construct the next nested search space. We can now construct the next nested space $S_2(V_m)$ by only including value combinations in $S_1(V_m)$ which satisfy $A_1=w_1$. One can see that the size of search space now becomes $(|V_m|-1) \cdot \Pi_{i=2}^{m-1}|V_i|$. COUNT-DISCOVER continues the shrinking process in the same way as the binary case—i.e., by issuing query q: SELECT* FROM D WHERE $A_1=W_1$ (if it has not already been issued). One can see that either q returns a yet-to-be-discovered value in $V_m$, or it overflows, in which case we can always find the complete domain of an attribute in $A_2, \ldots, A_{m-1}$ from the k tuples returned by q because $k \geq 1+\Pi_{i=1}^n(|V_i|-1)V_i|1)$. As such, eventually we can always unveil one value in $V_m$ that has not yet been discovered. Nonetheless, since we do not maintain in the search space all yet-to-be-discovered value in $V_m$, the entire shrinking process may have to be repeated multiple times to unveil the entire $V_m$. Theorem 3.3.6 can be derived accordingly.

A key observation from the design of COUNT-DISCOVER is that the significant increase on query cost (from the binary case) is not because the shrinking of search spaces becomes less powerful—indeed, ALERT-DISCOVER still needs only m nested spaces $S_1(V_m), \ldots, S_m(V_m)$ to reach size 1. The increase on query cost is largely due to the cost of determining how to construct the next nested space (i.e. by filtering the current one)—a task previously accomplished by just two queries now requires many more. In the next subssection, we shall show that randomizing such nested-space construction process is our key idea for building efficient randomized algorithms for discovering arbitrary attribute domains.

3.4 Randomized Algorithms for COUNT Interfaces

In the subsection 3.3, we disclosed a query-efficient algorithm for discovering binary domains, but found its extension to arbitrary domains to be extremely inefficient. We also found the main reason behind this obstacle to be the increased cost of determining how to construct the nested search spaces—in particular, for a given search space and an attribute $A_i$, how to select a domain value v of $A_i$ such that $A_i=v$ can be used to filter the current search space while maintaining at least one tuple with yet-to-be-discovered domain value(s) in the filtered space.

Now that any deterministic construction of nested spaces is provably expensive due to the achievability conditions we derived in the subsection 3.3, our main idea in this subsection is to randomize nested-space construction, so as to spend a small number of queries for search space construction while maintaining yet-to-be-discovered domain value(s) in the constructed space with high probability. In the following, we first describe our randomized process of nested-space construction and the performance (i.e., recall and coverage) guarantee it is able to achieve, and then combine this process with COUNT-DISCOVER to form RANDOM-COUNT-DISCOVER, our randomized (Monte Carlo) algorithm for attribute domain discovery which can unveil attribute domains (though not necessarily completely) no matter if the achievability conditions are met.

3.4.1 Randomized Nested-Space Construction

Recall that the main obstacle for nested-space construction is to find a predicate $A_i=v$ that can be used to filter the current search space. In the worst-case scenario, one may have to find $m-1$ such conditions to discover a domain value for an attribute say $A_j$—this occurs when the complete domains of all attributes but $A_j$ have been discovered. For the purpose of discussing the randomization of nested-space construction, we consider a worst-case scenario where the complete domains of $A_i, \ldots, A_{m-1}$ have been discovered, and our objective now is to discover the domain of $A_m$. As a side note—this problem is actually interesting in its own right because it captures the scenario where $A_m$ is a textbox attribute (with unknown domain) on the hidden database interface, while a large number of other attributes (i.e., $A_1, \ldots, A_{m-1}$) have domains provided by the interface (e.g., through options in drop-down menus). We show in the experiments section that our algorithms can effectively discover the domain of $A_m$ in this scenario.

Random-Space:

A simple idea to randomize the construction of nested spaces is to choose v uniformly at random from the domain of $A_i$. With this idea, every round (i.e., search-space shrinking process) of our RANDOM-SPACE algorithm starts with SELECT * FROM D as the first query. Then, if no new domain value of Am is discovered from the query answer, it randomly chooses $v_1$ from $V_1$ and then uses $A_1=v_1$ to filter the search space (i.e., by issuing query SELECT * FROM D WHERE $A_1=v_1$). More generally, if RANDOM-SPACE fails to discover a new domain value of $A_m$ from the first $b-1$ queries issued in the current round, then it constructs the b-query by adding a conjunctive condition $A_b=v_b$, where $v_b$ is chosen uniformly at random from $V_b$, to the selection condition of the the (b−1)-th query.

Each round of RANDOM-SPACE requires at most m queries, and may lead to two possible outcomes: One is a new domain value being discovered. The other is that RANDOM-SPACE reaches a valid or underflowing query without discovering any new domain value. Note that while this outcome never occurs for COUNT-DISCOVER, it might occur for RANDOM-SPACE because of the random construction of nested spaces. RANDOM-SPACE may be executed for multiple rounds to discover more domain values.

One can see that the randomization used by RANDOM-SPACE guarantees a positive probability for each domain value to be discovered. Nonetheless, the main problem of it occurs when the distribution of tuples in the database is severally skewed—e.g., when almost all tuples have the same values for $A_1$, $A_2$, etc. In this case, a large number of queries may be wasted on a small number of tuples, rendering it unlikely for RANDOM-SPACE to unveil many domain values.

Random-Count-Space:

The main problem of RANDOM-SPACE can be solved by leveraging the COUNT information provided by the interface. In particular, RANDOM-COUNT-SPACE constructs the nested spaces in a similar fashion to RANDOM-SPACE, with the only exception that the value v in selection condition $A_i=v$ is no longer drawn uniformly at random from $V_i$. Instead, RANDOM-COUNT-SPACE first retrieves the COUNT of all $|V_i|$ possible queries that define the next search space (each corresponding to a different value of v). Then, it selects v in proportional to its corresponding COUNT. The construction of nested search spaces continues until either finding a new domain value or reaching a valid query. Note that since we now leverage COUNT information, an underflowing query will never be selected to construct the next search space.

An important property of RANDOM-COUNT-SPACE is that if we continue the search-space shrinking process until reaching a valid query, then the valid query returns each tuple in the database with roughly equal probability (precisely equal if k=1, varies at most k times otherwise). This property explains why RANDOM-COUNT-SPACE solves the above-mentioned problem of RANDOM-SPACE. Nonetheless, RANDOM-COUNT-SPACE also has its own problem. In particular, if $A_m$ is strongly correlated with $A_1$, $A_2$, etc (e.g., $A_1, A_2 \rightarrow A_m$ forms a functional dependency), and all but a few tuples have the same value of $A_m$, then RANDOM-COUNT- SPACE may spend too many queries retrieving tuples featuring the "popular" value of A. (because the spaces it constructs most likely follow the "popular" value combination of $A_1$ and $A_2$), but fails to retrieve the other values. Interestingly, one can see that RANDOM-SPACE can handle this case pretty well, motivating our idea of mixing the two randomization approaches.

Hybrid-Space:

We now consider a hybrid of RANDOM- and RANDOM-COUNT-SPACE to avoid the problems of both. In particular, HYBRID-SPACE starts with RANDOM-SPACE. It is repeated executed until none of the last $r_1+1$ times returns any new domain value, where $r_1$ is a small number (e.g., 0 to 5), the setting of which shall be discussed in the next subsection and in the experiments. At this time, we switch to RANDOM-COUNT-SPACE.

One round of RANDOM-COUNT-SPACE is performed. If it unveils a new domain value, then the entire process of HYBRID-SPACE is restarted by going back to the beginning of RANDOM-SPACE. If no new value is discovered, we repeat RANDOM-COUNT-SPACE for up to $r_2$ other rounds or until a new domain value is discovered, whichever happens first. Similar to $r_1$, we shall discuss the setting of $r_2$ in the next subsection and in the experiments. If a new domain value is discovered, then the entire HYBRID-SPACE is restarted. Otherwise, if $r_2+1$ consecutive rounds of RANDOM-COUNT-SPACE fails to return any new domain value, we terminate HYBRID-SPACE. Algorithm 1 depicts the pseudocode for HYBRID-SPACE. Note that the input parameter in the pseudocode is designed for integration into RANDOM-COUNT-DISCOVER.

---

Algorithm 1 HYBRID-SPACE

Input parameter: $q_0$, set to SELECT * FROM D by default

: repeat
:     //Perform one round of RANDOM-SPACE
:     $q \leftarrow q_0$
:     while q overflows AND returns no new domain value do
:         Select $A_i$ not specified in q. Select v uniformly at random from the discovered domain of $A_i$
:         $q \leftarrow (q \text{ AND } A_i = v)$. Issue q to learn new values.
:     end while
: until the last $r_1 + 1$ rounds return no new domain value
: repeat
0:     //Perform one round of RANDOM-COUNT-SPACE
1:     $q \leftarrow q_0$
2:     while q overflows AND returns no new domain value do
3:         Select $A_i$ not specified in q. For each discovered $v \in V_i$, Query $c(v) \leftarrow$ COUNT of $(q \text{ AND } A_i = v)$
4:         Select v with probability proportional to $c(v)$
5:         $q \leftarrow (q \text{ AND } A_i = v)$. Issue q to learn new values.
6:     end while
7:     if q returns a new domain value then Goto 2.
8: until the last $r_2 + 1$ rounds return no new domain value
9:

---

3.4.2 HYBRID-SPACE Performance Guarantee

An important feature of HYBRID-SPACE is the performance guarantee it provides independent of the underlying data distribution. To illustrate such a guarantee, we consider an example where $A_1, \ldots, A_{m-1}$ each has a domain of size 10. Let there be k=50, n=1,000,000 tuples and m=10 attributes in the database (note that n is readily available from the interface). Consider a parameter setting of $r_1=r_2=0$. The following derivation shows how HYBRID-SPACE guarantees either a coverage of 46 values or a median recall of 500,000 tuples with only 4,036 queries.

Case 1:

First consider the case where HYBRID-SPACE did not terminate before 4,036 queries were issued. Let $w_B$ and $w_T$ be the number of rounds RANDOM- and RANDOM-COUNT-SPACE were performed, respectively. Since $r_1=0$, the number of discovered domain values is at least $w_B-1$. Since $A_1, \ldots, A_{m-1}$ each has 10 domain values, an RANDOM-COUNT-SPACE shrinking process issues at most $9(m-1)$ queries. Thus, the $w_B+w_T$ finished rounds consume at least $4036-(9(m-1)-1)=4046-9m$ queries because the final unfinished round could have issued at most $9(m-1)-1$ queries. As such, $$c \cdot w_B + 9(m-1) \cdot w_T \geq 4046 - 9m. \qquad 7)$$

where c is the average number of queries issued by a round of RANDOM-SPACE during the execution. Since $r_2=0$, $w_B \geq w_T$. Thus, $(c+9(m-1)) \cdot w_B \geq 4046-9m$. If HYBRID-SPACE did not discover at least 46 values, then $w_B \leq 46$ and therefore $c \geq (3956/46)-9(m-1)=5$.

A key step now is to prove that $c \geq 5$ indicates an absolute recall of at least 500,000. This is enabled by the following theorem which illustrates a positive correlation between the absolute recall $\gamma$ and the average query cost c (per round) of RANDOM-SPACE.

THEOREM 3.4.1. There is $\gamma \geq k \cdot 10^{c-1}$ with probability close to 1 when the number of rounds is sufficiently large.

PROOF. Let there be a total of s rounds of RANDOM-SPACE performed. Consider the i-th round ($i \in [1, s]$). Let $\gamma$ be the absolute recall of discovered domain values before the round begins. Given the discovered values, let $\Omega_i$ be the set of queries which may be the second-to-last query issued by this i-th round. One can see that each query in $\Omega_i$ must overflow and have all returned tuples featuring the already discovered domain values. Thus, we have $\gamma_i \geq k \cdot |\Omega_i|$, where $|\Omega_i|$ is the number of queries in For each $q \in \Omega_i$, let $p(q)$ and $h(q)$ be the probability for q to be chosen in this round of RANDOM-SPACE and the number of predicates in v, respectively. Since each attribute in $A_1, \ldots, A_{m-1}$ has 10 possible values, we have $p(q) \leq 1/10^{h(q)}$. Thus, $$E_{q \in \Omega_i}(k \cdot 10^{h(q)}) = \sum_{q \in \Omega_i} \frac{k \cdot 10^{h(q)}}{10^{h(q)}} = k \cdot |\Omega_i| \leq \qquad 8)$$

where the expected value is taken over the randomness of nested space construction in RANDOM-SPACE.

Note that $k \cdot 2^x$ is a convex function of x. According to Jensen's inequality, $E_{q \in \Omega_i}(k \cdot 10 h q \geq k \cdot 10_E q \in \Omega i(hq))$. Also note that for any i, $\gamma_i \leq \gamma$. Thus, $k \cdot 10_E q \in \Omega i(hq) \leq \gamma_i \leq \gamma$.

When s, the total number of rounds of RANDOM-SPACE, is sufficiently large, according to the central limit theorem, the probability of $E_{q \in \Omega_i}(h(q)) < c-1$ for every $i \in [1, s]$ tends to 0. Thus, the probability of $\gamma \geq k \cdot 10^{c-1}$ tends to 1 when the number of drill-downs is sufficiently large. QED.

According to the theorem, $c \geq 5$ indicates an absolute recall of at least $k \cdot 10^{5-1} = 500000$.

Case 2:

Now consider the other case where HYBRID-SPACE terminates before 4,036 queries were issued. This indicates that the last round of RANDOM-COUNT-SPACE returns no new domain value. Let the absolute recall be $\alpha \cdot n$. With each round of RANDOM-COUNT-SPACE, the probability for the $(1-\alpha) \cdot n$ "unrecalled" tuples to be retrieved is $1-\alpha$. Thus, with Bayes' theorem, the posterior probability for $\alpha < 50\%$ given the empty discovery of the last round of RANDOM-COUNT-SPACE is $$Pr\{\alpha < 50\% \mid \text{empty discovery}\} < \frac{1/2 \cdot 1/2}{\int_0^1 p\,dp} = 1/2. \quad (9)$$

That is, the median absolute recall is at least 500000. In summary of both cases, HYBRID-SPACE either discovers at least 46 values, or has a median absolute recall of 500000.

Generic Performance Guarantee:

More generally, we have the following algorithm:

THEOREM 3.4.2. For a query budget of d over a top-k interface, HYBRID-SPACE achieves either an absolute coverage of mo values, or a median absolute recall of at least $$\min\left(k \cdot \prod_{i=1}^{\sigma} |V_i|, {}^{r_2+2}\!\sqrt{\frac{1}{2(r_2+2)}} \cdot n\right) \quad (10)$$

where $$\sigma = \frac{d - \sum_{i=1}^{m-1} |V_i| + 1}{m_0 \cdot (r_1 + 1)} - \frac{r_2 + 1}{r_1 + 1} \cdot \sum_{i=1}^{m-1} |V_i|. \quad (11)$$

We do not include the proof due to the space limitation. One can see from the theorem that a suggest setting for $r_1$ and $r_2$ is $r_1 = r_2 = 0$, as it maximizes the lower bound derived in (10). We shall verify this suggested setting in the experiments.

Running Example:

To discover the domain of Instrument from the NSF award search database based on pre-known domains of award amount, PI state, NSF organization, and field, HYBRID-SPACE requires at most 1563 queries to guarantee either the complete discovery of all domain values, or an absolute recall of $\min(4.12 \times 10^7, n/2)$.

3.4.3 Random-Count-Discover

We now integrate HYBRID-SPACE into COUNT-DISCOVER to produce RANDOM-COUNT-DISCOVER, our randomized (Monte Carlo) algorithm for discovering attribute domains. RANDOM-COUNT-DISCOVER starts with SELECT * FROM D, and uses the domain values discovered from the returned results to bootstrap HYBRID-SPACE. After that, RANDOM-COUNT-DISCOVER executes HYBRID-SPACE for multiple rounds, using the domain values discovered from previous rounds to bootstrap the next round.

In particular, at any time, RANDOM-COUNT-DISCOVER maintains a set of domain values that have been discovered but not used in the current round of HYBRID-SPACE. Let it be $V \subseteq \bigcup_{i=1}^m V_i$. At the start, V is empty. After every round of HYBRID-SPACE, the new domain values discovered are added to V. Then, in the next round of HYBRID-SPACE, we randomly select an attribute with domain values in V, say $A_j$ and $\{v_{j_1}, \ldots, v_{j_h}\} = V \cap V_j$, and start the search-space construction process with a selection condition of $A_j = v$ where $v \in \{v_{j_1}, \ldots, v_{j_h}\}$. We then remove v from V. RANDOM-COUNT-DISCOVER terminates when V is empty or the query budget is exhausted.

---

Algorithm 2 RANDOM-COUNT-DISCOVER $q_0 \leftarrow$ SELECT*FROM D, $V \leftarrow \emptyset$, : repeat : Execute HYBRID-SPACE($q_0$)

: $V \leftarrow$ domain values discovered by HYBRID-SPACE

: Arbitrarily select j and v such that $v \in V \cap V_j$

: $q_0 \leftarrow$ SELECT * FROM D WHERE $A_j = v$

: $V \leftarrow V \setminus v$

: until $V = \emptyset$ or the query budget is exhausted

---

3.5. Attribute Domain Discovery for ALERT Interfaces

We now extend our results to ALERT interfaces which does not offer COUNT. Since the information provided by an ALERT interface is a proper subset of that provided by the corresponding COUNT interface, the results in subsection 3.3.2 already shows the impracticability of deterministic algorithms. Our results in this subsection further shows that ALERT interfaces require an even higher lower bound on query cost. To efficiently discover attribute domains, we disclose RANDOM-ALERT-DISCOVER, a randomized algorithm which extends RANDOM-COUNT-DISCOVER by augmenting a query answer returned by an ALERT interface with an approximate COUNT estimated from historic query answers.

3.5.1 Achievability for Deterministic Algorithms

For ALERT interfaces, the achievability condition for k is exactly the same as the one for COUNT interfaces—which is shown in Theorem 3.4—as one can easily verify that the proof of Theorem 3.3.4 does not use any COUNT returned by the interface. For the condition on query cost, however, the lower bound is significantly higher for ALERT interfaces, as shown by the following theorem.

THEOREM 3.5.1. For given k and m, there exists a database and a scoring function such that no deterministic algorithm can complete the discovery of all domain values that can be discovered from the top-k ALERT interface without incurring a worst-case query cost $\Pi_{i=h+1}^{m} |V_{d_i}|$, where $d_i, \ldots, d_m$ is the permutation of $1, \ldots, m$ which satisfies $|V_{d_1}| \geq \ldots \geq |V_{d_m}|$, and h is the minimum value which satisfies $k \leq 1 + \Pi_{i=1}^{h}(|V_{d_i}|-1)$ PROOF. We prove by induction. In particular, we start with constructing a database instance $D_1$, and then show that for any $b < \Pi_{i=h+1}^{m} |V_{d_i}|$, if a deterministic algorithm uses exactly b queries $q_1, \ldots, q_b$, to discover all attribute domains from $D_1$, then there must exist another database instance $D_2$ which (1) provides the exact same query answers for $q_1, \ldots, q_{b-1}$, such that the deterministic algorithm will always issue $q_b$ next, and (2) ensures that $q_1 \ldots, q_b$ cannot discover all attribute domains. One can see that if this is proved, then any deterministic algorithm which discovers all attribute domains must has a query cost of at least $\Pi_{i=h+1}^{m} |V_{d_i}|$.

We construct $D_1$ with $1 + k \cdot \Pi_{i=h+1}^{m} |V_{d_i}|$ tuples $t_1, \ldots, t_{2^{m-1}}$ in the following manner. First, for each $A_{d_i}$ ($i \in [1,h]$), we arbitrarily choose a domain value $v_i \in A_{d_i}$. Then, for each value combination of $V_{d_{h+1}}, \ldots, V_{d_m}$, we include k other tuples with $A_{d_{h+1}}, \ldots, A_{d_m}$ defined by the value combination and $A_{d_i} \neq v_{d_i}$ for all $i \in [1, h]$. It is always possible to find such k tuples because of our assumption that $k \leq 1 + \Pi_{i=1}^{h}(|V_{d_i}|-1)$. The one additional tuple in $D_1$ is t which satisfies $A_{d_i} = v_{d_i}$ for all $i \in [1, h]$ and has an arbitrary value combination for $A_{d_i}, \ldots, A_{d_m}$. The scoring function is designed such that t has the lowest score.

Note that the deterministic algorithm must unveil t with the first b queries. Without loss of generality, we assume that the b-th query returns t. An important observation here is that t can only be unveiled by a query which has no predicate for $A_{d_1}, \ldots, A_{d_h}$, (because of $v_1, \ldots, v_h$ could not have been discovered before t is un-veiled) and one predicate for each of $A_{d_{h+1}}, \ldots, A_{d_m}$ (because of k). If $b < \Pi_{i=h+1}^{m} |V_{d_i}|$, there must exist at least one value combination of $A_{d_{h+1}}, \ldots, A_{d_m}$ which has not yet been (fully) specified by any issued query. We then construct $D_2$ by changing the values of $A_{d_{h+1}}, \ldots, A_{d_m}$ of t to this not-yet-specified combination. One can see that the answers of $q_1, \ldots, q_{b-1}$ over $D_2$ is exactly the same as $D_1$. Nonetheless, $q_b$ no longer returns t, mandating a query cost of at least b+1 for attribute domain discovery over $D_2$. QED.

Running Example:

With the NSF award search example, the lower bound on worst-case query cost over a top-50 ALERT interface is $9.40 \times 10^{15}$, orders of magnitude larger than even the upper bound for COUNT interface.

THEOREM 3.5.2. For given k and m-attribute, there exists an algorithm which requires at most $h-1+\Pi_{i=1}^{h-1}|V_{d_i}|$ queries to discover the domains of at least h (out of the m) attributes, where $d_1, \ldots, d_m$ is the permutation of $1, \ldots, m$ which satisfies $|V_{d_1}| \geq \ldots \geq |V_{d_m}|$.

The following description of ALERT-DISCOVER serves as the proof for this theorem.

3.5.1.1 Alert-Discover

The deterministic COUNT-DISCOVER is capable of shrinking the search space significantly at each step because it can infer the COUNT of a domain value yet to be discovered from COUNTs returned by other queries. ALERT interfaces do not provide such luxury. In particular, for the discovery of $V_m$, there is no direct way to check whether an unknown domain value in $V_m$ occurs in tuples satisfying an overflowing query such as $q_3$: SELECT * FROM D WHERE $A_1 = 0_1$, unless $q_3$ returns the domain value in its top-k result.

Despite of the lack of COUNT information, we can still shrink the search space with an ALERT interface, though the shrinking may not be as significant as in COUNT-DISCOVER. For example, if the above-mentioned $q_3$ turns out to be valid or underflowing without returning any unknown domain value in $V_m$, we can safely remove from the search space $S_1(V_m)$ all values which satisfy $q_3$—a reduction of size $\Pi_{i=2}^{m-1}|V_i|$—while still ensuring that the reduced search space contains at least one tuple in the database which has an unknown value of $V_m$.

ALERT-DISCOVER, our deterministic algorithm for ALERT interfaces, exactly follows this strategy to construct a series of nested spaces $S_1(V_m), S_2(V_m), \ldots$, for the discovery of $V_m$. To decide which query to issue next, ALERT-DISCOVER uses the following simple rule: Suppose that the complete domains of h attributes have been discovered, say $A_1, \ldots, A_h$ without loss of generality (note that h=1 at the start of the algorithm). The next query ALERT-DISCOVER issues is an h-predicate query with one conjunctive condition for each attribute $A_i$ ($i \in [1, h]$). The value $v_i$ specified for $A_i$ in the query is determined as follows: First, the value combination $\langle v_1, \ldots, v_h \rangle$ must lead to a query that cannot be answered based solely upon the historic query answers—i.e., no previously issued query is formed by a subset of $A_1=v_i, \ldots, A_h=v_h$ and returns valid or underflow. Within the value combinations which satisfy this condition, we select the highest-ordered one according to an arbitrary global order. The above process is repeated until all domains are discovered.

To understand how such a query-issuing plan leads to the shrinking of nested search spaces, consider the three possible outcomes of an above-constructed query q—underflow, valid, or overflow. If q underflows or is valid, then we can construct the next search space by removing from the current one all value combinations that satisfy q—a reduction of size $\Pi_{i=h+1}^{m-1}|V_i|$ where h is the number of predicates in q. On the other hand, if q overflows, then we can always discover the complete domain of at least one additional attribute because $k \geq 1 + \Pi_{i=1}^{n}(|V_i|-1)$. One can see that if ALERT-DISCOVER has issued at least m queries with the second outcome, then it must have discovered the domains for all m attributes. The first outcome, on the other hand, guarantees the reduction of search space. Theorem 3.5.2 follows accordingly.

3.5.2 Random-Alert-Discover

A simple approach to enable aggregate estimation is to directly integrate RANDOM-COUNT-DISCOVER with HD-UNBIASED-AGG, the existing aggregate estimator for hidden databases [30]. Intuitively, since RANDOM-COUNT-DISCOVER starts with RANDOM-SPACE, one can use queries answers received by RANDOM-SPACE to estimate each COUNT value required by the subsequent execution of RANDOM-COUNT-SPACE. The estimations will become more accurate over time after more queries are issued by RANDOM-SPACE or RANDOM-COUNT-SPACE).

Nonetheless, such a direct integration has a key problem: The existing HD-UNBIASED-AGG can only generate a COUNT estimation from a valid query answer. Most queries issued by RANDOM-COUNT-SPACE, however, are likely to overflow as the shrinking of search space only continues (i.e., with "narrower", and possibly valid, queries being issued) if no new domain value can be discovered from the previously issued overflowing queries—an un-likely event especially at the beginning of RANDOM-COUNT-DISCOVER. As a result, the integration with HD-UNBIASED-AGG faces a dilemma: either uses only a few valid queries and suffers a high estimation variance, or issues a large number of extra queries to "narrow down" the queries issued by RANDOM-COUNT-SPACE (by adding conjunctive conditions to the queries) to valid ones. Either way, the large number of overflowing queries issued by RANDOM-COUNT-SPACE would be wasted.

To address this problem, we disclose a step-by-step estimation process which can generate COUNT estimations based the results of all historic queries, including the overflowing ones. For the ease of understanding, we consider an example of estimating SELECT COUNT(*) FROM D WHERE $A_1 = v_1$ denoted by COUNT($v_1$). Handling of other COUNT queries immediately follows. Consider one round of RANDOM-SPACE or RANDOM-COUNT-SPACE during which b queries $q_1, \ldots, q_b$ are issued in order. Recall that $q_1$ is SELECT * FROM D. $q_b$ may be overflowing, valid or underflowing. Without loss of generality, let $A_1, \ldots, A_{i-1}$ be the attributes involved in the selection conditions of $q_i$ ($i \in [2, b]$). Let $p_i$ be the transition probability from $q_i$ to $q_{i+1}$—i.e., the probability for $q_{i+1}$ to be selected (out of all possible values of $A_i$) after $q_i$ is issued. For example, $p_i = 1/|V_i|$ for RANDOM-SPACE, and may differ (based on the currently estimated COUNTs) for RANDOM-COUNT-SPACE. We estimate COUNT($v_i$) from all b queries with the following two steps:

We first choose i.i.d. uniformly at random $v_i \in V_i$ for each $i \in [b, m-1]$, and then construct and issue a (conjunctive) query $q_F$ formed by appending conditions $(A_b = v_b)$ AND ... AND $(A_{m-1} = v_{m-1})$ to $q_c$.

We then return the following estimation of $COUNT(v_1)$:

$$\omega = \left( \sum_{i=1}^{b} \frac{S_{v_1}(\beta_i)}{\prod_{j=1}^{i-1} p_j} \right) + \frac{S_{v_1}(\beta_F) \cdot \prod_{j=b}^{m} |V_j|}{\prod_{j=1}^{b-1} p_j} \quad (12)$$

where $\beta_i = \{t | t \in q_i, t \notin (q_i \cup \ldots \cup q_{i-1})\}$, $\beta_F = \{t | t \in q_F, t \notin (q_1 \cup \ldots \cup q_c)\}$, and $S_{v_1}(\cdot)$ stands for the result of applying $COUNT(v_i)$ over a set of tuples. Note that here $q_i$ stands for the set of tuples returned by query $q_i$. We assume $\prod_{j=1}^{i-1} p_j = 1$ when $i=1$, and $S_{v_1}(\phi) = 0$.

One can see that each query in $q_1, \ldots, q_b$ contributes an additive component to the final estimation $\omega$—e.g., $q_i$ contributes $S_{v_1}(\beta_i)/\prod_{j=1}^{i-1} p_j$, which is essentially an estimated COUNT of tuples that satisfy $A_1 = v_1$, can be returned by a query with predicates on $A_1, \ldots, A_i$, but cannot be returned by a query with predicates only on $A_1, \ldots, A_{i-1}$. This is why we call the idea "step-by-step estimation". In terms of query cost, step-by-step estimation reuses all queries issued by RANDOM-SPACE or RANDOM-COUNT-SPACE. In addition, it issues at most one additional query $q_F$ per round (of search-space shrinking). It is easy to verify that the proof of unbiasedness for HD-UNBIASED-AGG [30] remains valid with step-by-step estimation.

3.6. Experiments and Results 3.6.1 Experimental Setup

1) Hardware and Platform:

All our experiments were performed on a 2.6 GHz Intel Core 2 Duo machine with 2 GB RAM and Windows XP OS. All algorithms were implemented in C++.

2) Dataset:

We conducted our experiments on two real-world datasets. One is the NSF award search database which has been used as a running example throughout this section. We tested our algorithms over the real-world web interface of NSF award search by issuing queries through the "search all fields" option of NSF award search, available at http://www.nsf.gov/awardsearch/tab.do?dispatch=4. Since this interface uses HTTP GET to specify query selection conditions, we issue search queries through the interface by appending search conditions to the URL. Since NSF award search returns up to 50 awards on a returned page, we set k=50, but also tested cases where k varies from 10 to 40 by truncating the returned results. As mentioned in §2.1, NSF award search is an ALERT interface. We conducted experiments with all 9 attributes listed in §2.1, with objective being the discovery of domain values for these attributes.

While experiments over the NSF award search database demonstrates the practical impact of our approach, to more thoroughly evaluate its effectiveness we need access to certain ground truth, e.g., the total number of tuples in the database or the total number of domain values to be discovered, which we do not have over NSF award search. Thus, we also conducted experiments over a local hidden database built from a Texas inpatient discharge dataset published by the Texas Department of Health [39]. There are 707, 735 tuples and 260 attributes. We used all tuples but randomly chose 23 attributes with domain size ranging from 2 to 19028, in order to better simulate the number of attributes commonly available from a hidden database. We constructed the top-k interface with k=100 and a random scoring function, but also tested cases where k varies from 100 to 400. We considered both COUNT and ALERT interfaces for this database.

3) Algorithms:

We tested seven algorithms: the crawling-based DFS and BFS (as baseline), our main algorithms RANDOM-COUNT-SPACE and RANDOM-ALERT-SPACE, a main component of them HYBRID-SPACE, as well as stand-alone RANDOM-SPACE and RANDOM-COUNT-SPACE. The only parameters required are $r_1$ and $r_2$ for HYBRID-SPACE, which is in turn used by RANDOM-COUNT-SPACE and RANDOM-ALERT-SPACE. We set $r_1 = r_2 = 0$ by default but also tested other values which justified our default settings. To test HYBRID-SPACE and the standalone RANDOM- and RANDOM-COUNT-SPACE, we considered the case where all attribute domains except the largest one have been completely discovered, and set the goal to be the discovery of the largest domain with 19028 values.

4) Performance Measures:

For query cost, we focused on the number of queries issued through the web interface of the hidden database. For estimation accuracy, we tested both measures discussed in subsection 3.2.2: absolute recall and coverage. For the local hidden database, we also tested the relative recall, i.e., absolute recall divided by the total number of tuples in the database, and relative coverage, i.e., absolute coverage for an attribute domain divided by its domain size (ground truths that we only have access to over the local database), to provide an intuitive demonstrate of the effectiveness of our algorithms.

3.6.2 Experimental Results

We compared the performance of RANDOM-ALERT-DISCOVER, DFS and BFS over the NSF award search database when no attribute domain is pre-known. FIGS. 3.1 and 3.2 depict the change of recall and coverage with query cost, respectively. Note that in FIG. 3.2, we present both the coverage for attribute Program Manager and the SUM of coverage for all attributes. One can see from the figures that RANDOM-ALERT-DISCOVER provides a significantly higher recall and coverage than both baseline algorithms.

We also tested the NSF award search database with varying k, the only parameter we can control over its interface. FIGS. 3.3 and 3.4 depict the change of recall with k when 100 queries were issued. One can see that as suggested by intuition, the larger k is, the more recall all three algorithms will achieve. In addition, RANDOM-ALERT-DISCOVER significantly outperforms DFS and BFS for all settings of k.

To provide a more thorough evaluation of the algorithms, we turned our attention to the local hidden database. We compared the tradeoff between recall and query cost for RANDOM-COUNT-DISCOVER, DFS and BFS. The results are shown in FIG. 3.5. We also compared the performance of RANDOM-COUNT-DISCOVER with RANDOM-ALERT-DISCOVER, with results shown in FIG. 3.6. One can see that RANDOM-COUNT-DISCOVER significantly outperforms DFS and BFS, while the difference between recall of RANDOM-COUNT-DISCOVER and RANDOM-ALERT-DISCOVER is not significant.

An interesting (and somewhat counter-intuitive) observation here is that when the query cost is small (e.g., 100), RANDOM-ALERT-DISCOVER even outperforms RANDOM-COUNT-DISCOVER. This is because RANDOM-ALERT-DISCOVER leverages previously issued queries estimate the COUNT of each discovered domain value (to decide which to use in the shrinking of search space), instead of actually querying the COUNTs as in RANDOM-COUNT-DISCOVER. This leads to a significant saving of query cost in the beginning. But when more queries are issued, many of the saved queries may be (randomly) selected for shrinking search space and issued anyway. As such, the advantage provided by precise COUNTs becomes more evident and helps increase the recall.

To further demonstrate the coverage achieved by RANDOM-COUNT-DISCOVER, we evaluated the relative coverage for all attributes and present in FIG. 3.7 the four attributes with the minimum (i.e., worst) relative coverage when 100, 500 and 1000 queries have been issued. One can see that even for these worst-case attributes, RANDOM-COUNT-DISCOVER can still unveil more than half of the domain values for every attribute with a query cost of only 1000. In addition, RANDOM-COUNT-DISCOVER outperforms both DFS and BFS on all four attributes.

Since HYBRID-SPACE is the key component of both RANDOM-COUNT-DISCOVER and RANDOM-ALERT-DISCOVER, we compared experiments on HYBRID-SPACE alone with the aforementioned experimental setup to justify our design of mixing RANDOM-SPACE with RANDOM-COUNT-SPACE. In particular, we compared the performance of HYBRID-SPACE, DFS, BFS, as well as RANDOM-SPACE and RANDOM-COUNT-SPACE. FIGS. 3.8 and 3.9 depict the absolute coverage and recall achieved by all 5 algorithms, respectively. One can see that HYBRID-SPACE significantly outperforms all other approaches on both measures.

We also tested the five algorithms with varying database size n. FIGS. 3.10 and 3.11 depict the relative recall and absolute coverage for a query cost of 100, respectively. Note that while the relative recall naturally decreases for a larger database, the absolute coverage actually increases. Also, our approach consistently outperforms the others over all database sizes, again justifying the mixing of RANDOM- and RANDOM-COUNT-SPACE.

We also studied how the parameters $r_1$ and $r_2$ of HYBRID-SPACE affects its performance. FIG. 3.12 shows the change of absolute recall when $r_1$ and $r_2$ varies from 0 to 4 (absolute coverage shows a similar trend). One can see that while $r_2$ does not appear to have a significant impact on the completeness of attribute domain discovery, $r_1$ should be set as small as possible—justifying our default setting of $r_1=0$.

3.7 Conclusion

In this section we have disclosed a method for the discovery of attribute domains through the web interface of a hidden database. We investigated the achievability of deterministic algorithms for both COUNT and ALERT interfaces, and disclosed query-efficient randomized algorithms for attribute domain discovery based on the idea of constructing nested search spaces. We provided theoretical analysis and extensive experimental studies over real-world datasets to illustrate the effectiveness of our approach.

4. Mobile-Interface Enhancement Service for Hidden Web Databases

In this section, the data analysis techniques described above are applied to a specific application of the present invention, i.e., providing a mobile interface enhancement service for hidden web databases. Turning to FIG. 4.2, shown therein is a block diagram of an exemplary architecture of a system 100 in accordance with an embodiment of the present invention (designated herein as "MOBIES", which stands for MOBile Interface Enhancement System). Various connections are shown between the system 100, a hidden database 106, a mobile-based user 102, and a computer-based user 104. In the example shown, those connections are facilitated by way of the interne 108, although any suitable electronic data exchange mechanism may be used. The system 100 comprises two main components, an interface generator (IG) 110 and mobile enhancement server (MES) 120.

In the exemplary embodiment shown in FIG. 4.2, the interface generator 110 communicates with a mobile-based user 102 via the internet 108, the interface generator 110 receiving access requests from the mobile-based user 102 and sending mobile-access interfaces to the mobile-based user 102. The interface generator 110 and a computer-based user 104 receive computer-access interfaces from the hidden database 106 via the interne 108, and the mobile enhancement server 130 sends queries and receives answers from the hidden database 106 via the interne 108.

An embodiment of the present invention may include one or more processors located on one or more computers for performing the functions and operations of the invention, including the exemplary techniques described herein. For instance, the system 100 may include a processor comprising an interface generator processor and a mobile enhancement server processor. The processor can be in communication with a storage element or memory that stores software instructions to implement the operations of the invention. The storage element or memory can also store the form information and/or hidden database. The processing can be performed in accordance with computer code stored on one or more non-transitory computer readable media. Each of the system components may be located locally or remotely with respect to one another.

4.1 Interface Generator (IG)

The main function of the interface generator 110 is to handle information extraction and integration issues. A general description of such issues can be found in K. Chang and J. Cho, "Accessing the Web: From Search to Integration" SIGMOD, 2006, the entirety of which is incorporated herein by reference. The interface generator 110 is designed as a "plug-and-play" component for existing methods, such as those described in the Chang et al. article. The interface generator 110 includes an interface analyzer 112 and an interface mixer 114.

The interface analyzer 112 retrieves the computer-access interface (i.e., the form) of each supported hidden database 106 and parses the form to identify mobile-unfriendly elements (e.g., textboxes, drop-down lists, etc.) for enhancement by the mobile enhancement server 120, and to inform the mobile enhancement server 120 about those elements through an improvement request. The mobile enhancement server 120 provides enhanced elements to the interface mixer 114, which receives the enhanced elements from the mobile enhancement server 120 and pieces them together with the rest of the form to generate a new mobile-user-friendly mobile-access interface.

4.2 Mobile Enhancement Server

The mobile enhancement server 120 includes a mobile HCI (Mobile Human-Computer Interaction) layer 130 and a data analytics layer 140.

4.2.1 Mobile HCI Layer

The mobile HCI layer 130 receives the element-enhancement requests from the interface generator 110, enhances the elements by applying mobile-user-friendly design patterns, and transmits the enhanced elements back to the interface generator 110. The exemplary embodiment shown in FIG. 4.2 supports four design patterns: value visualization, auto-suggestion, output attribute selection, and facet navigation. The present invention, however, is not limited to those four design patterns and may be used with other design patterns.

The value visualization component 132 involves highlighting options in a drop-down box that are most popular. Thus, in FIG. 4.3A, in which a screen shot of an enhanced version of the "PI State" drop-down box of FIG. 4.1A is illustrated, popular selection values (e.g., "Pennsylvania" and "Texas") are enlarged to ease selection by scrolling. The intensity of popularity (i.e., the number of tuples matched with the value) can be provided through COUNT estimations from the underlying hidden database, the estimations performed by the aggregate query processing component of the data analytics layer. Such estimations should be accurate enough to ensure that the most popular values are the most noticeable in the mobile-access interface. A comparison of FIGS. 4.1A and 4.3A also illustrates the elimination (or omission) of certain selection values (e.g., "US Minor Islands") from the available options of a drop-down box.

The auto-complete suggestion component 134 assists a user's entry of the desirable value for an attribute with a large number of domain values, and an embodiment of the present invention provides auto-complete suggestions for a number of domain values similar to the current input. As illustrated in FIG. 4.3B, names of people are automatically suggested for the field "Program Manager" based on the most popular names in the NSF FastLane database responding to the input "war". The parenthetical numbers (e.g., (~107)) denote the respective name popularity estimated from the database. This contrasts with the auto-complete suggestion of conventional systems, as illustrated in FIG. 4.1B, in which irrelevant text is automatically suggested. Auto-complete suggestion in the present invention is enabled through COUNT estimations and domain discovery. For an attribute with textbox input, the domain discovery component 142 of the data analytics layer 140 should provide the most frequent (if not all) values in the attribute's domain. Once an attribute's domain has been discovered, auto-complete suggestion can be achieved by pre-retrieving a small set of tuples ranked by their estimated COUNT.

The remaining two design patterns, output attribute selection and facet navigation, are designed to alleviate the challenge of the limited screen space on mobile devices.

The output attribute selection component 136 attempts to select a "best" subset of attributes to form a snippet for display on the screen, while values of the other attributes are available through a linked "detail" page. One such technique is described in G. Das, V. Hristidis, N. Kapoor, and S. Sudarshan, "Ordering the Attributes of Query Results," SIGMOD, 2006, the entirety of which incorporated herein by reference. The technique in the Das et al. article suggests displaying the attribute that is more closely correlated with a scoring function. To make such a decision, estimations from the data analytics layer 140 are used to calculate the correlation coefficients.

The facet navigation component 138 selects the most important facet (or a small number of important facets) to display on a mobile device. Essentially, this involves selecting the attributes that can mostly effectively distinguish between different tuples. To enable the existing facet selection algorithms, aggregate query processing (e.g., the estimation of marginal distributions for each attribute) is provided by the data analytics layer 140.

4.2.2 Data Analytics Layer

The data analytics layer 140 includes a domain discovery component 142 and an aggregate query processing component 144. The aggregate query processing component 144 employs techniques described in A. Dasgupta, X. Jin, B. Jewell, N. Zhang, and G. Das., "Unbiased Estimation of Size and Other Aggregates over Hidden Web Databases," SIGMOD, 2010, the entirety of which is incorporated herein by reference. In addition, the aggregate query processing component 144 employs techniques described in the U.S. patent application Ser. No. 13/328,810, including the use of algorithms applied to hidden databases having unbiasedness and randomness. These techniques are able to use a small number of queries to accurately estimate SUM, AVG, and COUNT information based on a Horvitz-Thompson estimator. A more detailed discussion of the techniques employed by the aggregate query processing component 144 is included in section 2.

The domain discovery component 142 performs domain discovery by traversing a query tree constructed from pre-known attributes. These attributes are pre-known because their domains are provided by a computer-access interface through drop-down boxes, radio buttons, etc. For example, "PI State" of FIGS. 4.1A and 4.3A is a pre-known attribute with seventy-four different values. Other pre-known attributes include those associated with radio buttons, check boxes and so on. A more general case without any pre-known attributes is discussed in X. Jin, N. Zhang, and G. Das, "Attribute Domain Discovery for Hidden Web Databases," SIGMOD 2011, the entirety of which is incorporated herein by reference. A more detailed discussion of the techniques employed by the domain discovery component 142 is included in section 3.

FIGS. 4.4A and 4.4B illustrate exemplary query trees for a hidden database D with 5 tuples. $A_i$ ($i \in [1, 3]$) are pre-known attributes, while the domain of $A_m$ (m=4) is unknown. The score is illustrated only to highlight the concept of scoring function, which cannot actually be known in practice. The i-th level ($i \in [1, m-1]$) represents $A_i$, while each edge represents a domain value of its parent level. Then, each node in the tree forms a query, with the root being SELECT * FROM D and each node at the i-th level containing i−1 predicates—corresponding to every edge on the path from the root to the node. The left-most leaf-level node, for example, represents SELECT * FROM D WHERE $A_1$=0 AND $A_2$=0 and $A_3$=0. Since the hidden database interface is usually restricted to return up to k tuples, one overly broad query (i.e., selects more than k tuples) will overflow and return only the top-k tuples selected according to the proprietary scoring function. For example, each node in FIG. 4.4A is labeled by the outcome of its corresponding query when k=1.

The main problem of a simple depth-first-search (DFS) traversal for domain discovery occurs when there is a strong correlation between the unknown attribute $A_m$ and the attributes on the top of the tree. For example, if $A_1 \rightarrow A_m$ forms a functional dependency, the same $A_m$ value is encountered by DFS when searching the subtree under $A_1$=0. Likewise, there is a problem for the breath-first-search (BFS) traversal when $A_m$ is correlated with the scoring function. For example, consider a total order of values for $A_m$ and suppose that tuples with "larger" $A_m$ receive higher scores. Then it is likely for BFS to discover only the larger values of $A_m$.

Therefore, exemplary embodiments of the present invention employ randomness in the query-issuing process by mixing two sequences of queries called Equal-Branch and Equal-Tuple random walks. In particular, Equal-Branch selects an outgoing branch uniformly at random and issues the query corresponding to the destination, while Equal-Tuple follows each branch with a transition probability proportional to its COUNT. FIG. 4.4B shows an example of the probability for EQUAL-TUPLE to follow at each branch. The COUNT information can be either explicitly provided by the website or estimated using the aggregate query processing component 144.

The advantage of the hybrid algorithm of the present invention is that it provides a provable database-independent guarantee on the number of domain values discovered or the number of tuples recalled for a given number of queries, whereby the number of queries prior to starting the domain discovery can be properly budgeted.

4.3 Demonstration of the MOBIES System

In an illustrative non-limiting example, the embodiment of the present invention including the MOBIES system was tested using a preliminary study on 20 persons. Each person was asked to input a workload of 20 search queries on an iPhone®. The results of this preliminary study showed that the average input time on an interface enhanced using the embodiment of the present invention is 323.3 seconds faster than that on the original iPhone® interface.

An exemplary technique for enhancing the interface of the NSF FastLane award search using an embodiment of the present invention is addressed below.

First, offline pre-processing is performed. Specifically, users are provided with multiple mobile devices (including iPhone®, iTouch®, HTC Android®, Palm Pre®) to gain the first-hand experience of the original NSF FastLane interface. Next, a configuration panel (such as the ones illustrated in FIG. 4.5) is provided where users can choose: the interface element(s) of their own interest to be enhanced with auto-suggestion and/or value visualization; one single or multiple attributes with unknown domains for discovery; the output view mode (i.e., via facet navigation or output attribute selection); and set the query cost (i.e., the maximum number of search queries to be issued) as the termination condition for offline pre-processing.

Another component of the present invention is the budget wizard component, which assists user decisions regarding the query cost by providing them the predicted outcome, given the current cost. Such prediction is made using the theoretic performance guarantee discussed above with regard to the data analytics layer. FIGS. 4.6A-4.6B illustrate exemplary configuration controls in accordance with an embodiment of the present invention. A budget wizard can be provided for a user to choose a query cost of 50. The offline pre-processing can be initiated by clicking a "Start Discovery" button and can be stopped by clicking a "Stop Discovery" button illustrated in FIG. 4.5.

During the discovery process, an embodiment of the present invention collects a variety of real-time statistics, all of which can be viewed using the progress panel illustrated in FIGS. 4.6B and 4.6C.

There are three parts to the discovery process. The first part is the domain discovery progress, where users are able to see a respective run-time progress bar for each unknown attribute (specified in the previous domain, discovery configuration). Second, because the underlying algorithm of the present invention is based on randomly traversing the query tree (as described herein in connection with the data analytics layer), an embodiment of the present invention provides users with the query tree structure information, together with random walk statistics in the exemplary hybrid algorithm (i.e., number of overflowing/underflowing/valid nodes, elapsed time (in seconds) and number of queries issued so far). Third, to see the effect of aggregate estimation, users are allowed to request the histogram view of domain value popularity for either pre-known or unknown attributes. In addition, users are able to specify selection condition when requesting the histogram. For example, a histogram of all the program managers working in Texas or Virginia of the United States can be provided. If the domain size for an attribute is more than 100, the histogram shows the top 100 popular values on screen, for the ease of demonstration.

Due to the low-connectivity and/or long waiting time for the previous scenario, a completed version of offline pre-processing for the NSF FastLane website was prepared. Users were able to check the configuration through the above-mentioned configuration panel. In this scenario, users could experience the look-and-feel of NSF FastLane interface (enhanced from our prepared offline pre-processing) on multiple mobile devices (e.g., iPhone®, iTouch®, HTC Android® and Palm Pre®). All the 4 patterns mentioned above in connection with the MobiHCI layer can be performed on each device. Once users submit one search, the users can view the search results in the following two view modes: non-navigation mode and navigation mode. As for the former (i.e., default mode) view mode, users are asked to provide their ordering preference (e.g., order by award amount). Based on that, the present invention can display a subset of attributes based on our output attribute selection pattern. If the navigation mode is selected, users can view results based on our facet navigation pattern.

4.5 Summary

In summary, an embodiment of the present invention may include a method for processing an electronic form, the method comprising: receiving, by a processor, an electronic form having at least one form field; analyzing, by the processor, each form field of the received electronic form; enhancing, by the processor, at least one of the at least one form fields; and presenting, by the processor, the electronic form with the enhanced form field. The form may comprise an interface for searching a hidden database having a plurality of tuples stored therein, wherein the plurality of tuples is defined by at least one attribute, and wherein, for each attribute, each tuple has a value corresponding to the attribute. Each form field may correspond to one of the at least one attributes. A first form field corresponding to a first attribute may comprise a drop-down box having a plurality of selectable values, and the enhancement may comprise elimination of at least one selectable value from the drop-down box.

The first attribute may have a domain of values corresponding thereto, and the method may further comprise sampling, by the processor, the hidden database to estimate, for each value in the domain, the number of tuples in the database having said value corresponding to the first attribute. A first form field corresponding to a first attribute may comprise a drop-down box having a plurality of selectable values, and the enhancement may comprise highlighting a first selectable value based on a popularity, in the hidden database, of the first selectable value with respect to others of the selectable values. Highlighting the first selectable value may comprise displaying the first selectable in a different size, color, or typeface with respect to others of the selectable values. A highlight intensity of the first selectable value may be different than a highlight intensity of a second selectable value based on a popularity, in the hidden database, of the first selectable value with respect to a popularity, in the hidden database, of the second selectable value.

A first form field corresponding to a first attribute may be a first free-text entry box, the first attribute may have a first domain of values corresponding thereto, the enhancement may comprise providing at least one first auto-complete suggestion for the first free-text entry box, and each first auto-complete suggestion may comprise a value from the first domain. The method of may further comprising sampling, by the processor, the hidden database to discover each of the values in the first domain. The first free-text entry box may request entry of a name, and the first domain may comprise names. One of the form fields may be a free-text entry box, and the enhancement may comprise providing at least one auto-complete suggestion for the free-text entry box based on information stored in a hidden database. The form with the enhanced form field may be presented on a display of a mobile device.

An embodiment of the present invention may include a system comprising: an interface generator component configured to receive an electronic form having at least one form field, to analyze each form field of the received form, and to identify at least one form field to be enhanced; and a mobile enhancement server component configured to receive, from the interface generator component, identification of each form field to be enhanced, and to enhance each of the identified form fields. The interface generator component may include: an interface analyzer configured to analyze each form field of the received form, and to identify at least one form field to be enhanced; and an interface mixer configured to present the form with the enhanced form fields. The mobile enhancement server component may include: a mobile human-computer interaction layer configured to receive enhancement requests from the interface generator, and to transmit enhanced form fields to the interface generator; and a data analytics layer configured to analyze a hidden database, the hidden database may have a plurality of tuples stored therein, the plurality of tuples may be defined by at least one attribute, each attribute may have a domain of values corresponding thereto, each form field may correspond to one of the at least one attributes, and, for each attribute, each tuple may have a value corresponding to the attribute.

The plurality of attributes may include at least one pre-known attribute, and, for each value in the domain of the pre-known attribute, the data analytics layer may be configured to estimate the number of tuples in the hidden database having said value corresponding to the pre-known attribute. The plurality of attributes may include at least one unknown attribute, and the data analytics layer may be configured to discover each of the values in the domain of the unknown attribute. The mobile human-computer interface layer may comprise at least one of an auto-complete suggestion component, a value visualization component, an output attribute selection component, and a facet navigation component. The auto-complete suggestion component may be configured to provide at least one auto-complete suggestion for a free-entry text box, the free-entry text box may correspond to a first attribute, and each auto-complete suggestion may comprise a value from the domain of the first attribute. The value visualization component may be configured to eliminate at least one selectable value from a drop-down box having a plurality of selectable values. The value visualization component may be configured to highlight at a first selectable value from a drop-down box having a plurality of selectable values, and the highlighting may be based on a popularity, in the hidden database, of the first selectable value with respect to others of the selectable values.

5. Use of Aggregate Information to Infer Additional Attributes

We found that the aggregates of location information (for users interested in a particular term) provide a surprisingly robust channel of inference for other personal attributes of the users—e.g., age, income and occupation. Thus, once we obtain the aggregate estimation from our just-in-time analytics technology, we can then use the inference technology described below to infer the distribution of other personal attributes.

To understand how, consider an example of user occupation. From the perspective of an individual user, there is seemingly no way for his/her occupation to be accurately inferred solely from his/her location. Nonetheless, for the purpose of analytics, we only need an accurate aggregate view of the user information. Interestingly, from an aggregate perspective, location is strongly correlated with a large number of occupations—e.g., the vast majority of federal government jobs are located in DC, MD, VA, CA, TX, while most art and entertainment jobs are located in CA and NY. We can exploit such correlations to estimate the distribution of user occupations according to their geographic distribution.

In particular, for a given search term (e.g., iPad), we first measure the degree of interest from each city with the ratio between the number of users interested in the term who are from the city and the city population. Intuitively, if such an interest degree is higher in every city where an occupation is more popular, then it is highly likely that people in the occupation is more interested in the website. Formally, let $occ_1, \ldots, occ_n$ be the n occupations under consideration, and $\rho_i$ be the percentage of individuals in $occ_i$ who are associated with online activities related to the search term (i.e., interested in the term). One can estimate $\rho_1, \ldots, \rho_n$ by finding the values that minimize $\|d-\delta\|$, where d and $\delta$ are m-element vectors (m is the total number of cities) satisfying $$\forall j \in [1, m], d_j = \frac{\sigma_j}{c_j} \text{ and } \delta_j = \sum_{i \in [1,n]} (\rho_i \cdot \epsilon_{ij}) \quad (1)$$

where $\sigma_j$ and $c_j$ are the total number of interested users from and the population of the j-th city, respectively (so $d_j$ is the degree of interest), $\epsilon_{ij}$ is the percentage of population in the j-th city who are in occupation $occ_i$, and $\|\cdot\|$ represents a pre-defined distance function (e.g., $l_2$-norm of d–$\delta$). Since the number of cities (i.e., m) is generally much larger than the number of occupations (i.e., n), one can find a solution to (1) using linear programming.

For example, FIG. 5.1 depicts the estimation generated the above-described technique for the distribution of occupations among all users who are associated with online activities containing "Mathematica", a popular computational software for scientists and engineers. Specifically, we leverage three data sources in the estimating process: (1) the geographical distribution of users, as estimated by our just-in-time analytics technology, (2) the population of US cities, available at Wikipedia, and (3) the distribution of occupations in 50 US states, as published by the US Census Bureau. One can see from FIG. 5.1 that the results are consistent with common sense—e.g., scientists, computer professionals and engineers are the three main types of users of the website.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The following publications are incorporated herein by reference in their entireties:

[1] E. Agichtein, P. G. Ipeirotis, and L. Gravano. Modeling query-based access to text databases. In *WebDB*, 2003.

[2] M. Alvarez, J. Raposo, A. Pan, F. Cacheda, F. Bellas, and V. Carneiro. Crawling the content hidden behind web forms. In *ICCSA*, 2007.

[3] S. C. Amstrup, B. F. J. Manly, and T. L. McDonald. *Handbook of capture-recapture analysis*. Princeton University Press, 2005.

[4] B. Babcock, S. Chaudhuri, and G. Das. Dynamic sample selection for approximate query processing. In *SIGMOD*, 2003.

[5] Z. Bar-Yossef and M. Gurevich. Efficient search engine measurements. In *WWW*, 2007.

[6] Z. Bar-Yossef and M. Gurevich. Mining search engine query logs via suggestion sampling. In *VLDB*, 2008.

[7] Z. Bar-Yossef and M. Gurevich. Random sampling from a search engine's corpus. *Journal of the ACM*, 55(5), 2008.

[8] K. Bharat and A. Broder. A technique for measuring the relative size and overlap of public web search engines. In *WWW*, 1998.

[9] A. Broder, M. Fontura, V. Josifovski, R. Kumar, R. Motwani, S. U. Nabar, R. Panigrahy, A. Tomkins, and Y. Xu. Estimating corpus size via queries. In *CIKM*, 2006.

[10] N. Bruno, L. Gravano, and A. Marian. Evaluating top-k queries over web-accessible databases. In *ICDE*, 2002.

[11] J. P. Callan and M. E. Connell. Query-based sampling of text databases. *ACM TOIS*, 19(2):97-130, 2001.

[12] K. C.-C. Chang and S. won Hwang. Minimal probing: supporting expensive predicates for top-k queries. In *SIGMOD*, 2002.

[13] A. Dasgupta, G. Das, and H. Mannila. A random walk approach to sampling hidden databases. In *SIGMOD*, 2007.

[14] A. Dasgupta, N. Zhang, and G. Das. Leveraging count information in sampling hidden databases. In *ICDE*, 2009.

[15] A. Dasgupta, N. Zhang, G. Das, and S. Chaudhuri. Privacy preservation of aggregates in hidden databases: Why and how? In *SIGMOD*, 2009.

[16] J. Gray, P. Sundaresan, S. Englert, K. Baclawski, and P. J. Weinberger. Quickly generating billion-record synthetic databases. In *SIGMOD*, 1994.

[17] Y.-L. Hedley, M. Younas, A. E. James, and M. Sanderson. A two-phase sampling technique for information extraction from hidden web databases. In *WIDM*, 2004.

[18] Y.-L. Hedley, M. Younas, A. E. James, and M. Sanderson. Sampling, information extraction and summarisation of hidden web databases. *Data and Knowledge Engineering*, 59(2):213-230, 2006.

[19] D. Horvitz and D. Thompson. A generalization of sampling without replacement from a finite universe. *Journal of the American Statistical Association*, 47:663-685, 1952.

[20] S. Liddle, D. Embley, D. Scott, and S. Yau. Extracting data behind web forms. In *ER (Workshops)*, 2002.

[21] K. Liu, C. Yu, and W. Meng, Discovering the representative of a search engine. In *CIKM*, 2002.

[22] J. Lu. Efficient estimation of the size of text deep web data source. In *CIKM*, 2008.

[23] A. Ntoulas, P. Zerfos, and J. Cho. Downloading textual hidden web content through keyword queries. In *JCDL*, 2005.

[24] L. G. Panagiotis G. Ipeirotis. Distributed search over the hidden web: Hierarchical database sampling and selection. In *VLDB*, 2002.

[25] S. Raghavan and H. Garcia-Molina. Crawling the hidden web. In VLDB, 2001.

[26] B. Ripley. *Stochastic Simulation*. Wiley & Sons, New York, 1987.

[27] G. A. F. Seber. *The estimation of animal abundance and related parameters*. MacMillan Press, New York, 1982.

[28] M. Shokouhi, J. Zobel, F. Scholer, and S. Tahaghoghi. Capturing collection size for distributed non-cooperative retrieval. In *SIGIR*, 2006

[29] K. Chang and J. Cho. Accessing the web: From search to integration. In *Tutorial, SIGMOD*, 2006.

[30] A. Dasgupta, X. Jin, B. Jewell, N. Zhang, and G. Das. Unbiased estimation of size and other aggregates over hidden web databases. In *SIGMOD*, 2010.

[31] A. Dasgupta, N. Zhang, and G. Das. Turbo-charging hidden database samplers with overflowing queries and skew reduction. In *EDBT*, 2010.

[32] A. Doan, R. Ramakrishnan, and S. Vaithyanathan. Managing information extraction. In *Tutorial, SIGMOD*, 2006.

[33] E. Dragut, T. Kabisch, C. Yu, and U. Leser. A hierarchical approach to model web query interfaces for web source integration. In *VLDB*, 2009.

[34] E. Dragut, C. Yu, and W. Meng. Meaningful labeling of integrated query interfaces. In *VLDB*, 2006.

[35] B. He and K. Chang. Statistical schema matching across web query interfaces. In *SIGMOD*, 2003.

[36] B. He, K. Chang, and J. Han. Discovering complex matchings across web query interfaces: A correlation mining approach. In *KDD*, 2004.

[37] P. Ipeirotis and L. Gravano. Distributed search over the hidden web: Hierarchical database sampling and selection. In *VLDB*, 2002.

[38] R. Khare, Y. An, and I.-Y. Song. Understanding deep web search interfaces: A survey. *SIGMOD Record*, 39(1), 2010.

[39] Texas Department of State Health Services. User manual of Texas hospital inpatient discharge public use data file, 2008. http://www.dshs.state.tx.us/thcic/Hospitals/HospitalData.shtm.

[40] Z. Zhang, B. He, and K. Chang. Understanding web query interfaces: best-effort parsing with hidden syntax. In *SIGMOD*, 2004.

[1.1] Agrawal, N., Arpaci-Dusseau, A., and Arpaci-Dusseau, R. Generating realistic impressions for file-system benchmarking. *ACM Transactions on Storage (TOS)* 5, 4 (2009), 1-30;

[1.2] Agrawal, N., Bolosky, W., Douceur, J., and Lorch, J. A five-year study of file-system metadata. In *Proceedings of the 5th USENIX Conference on File and Storage Technologies* (2007), pp. 31-45;

[1.3] Ames, S., Gokhale, M., and Maltzahn, C. Design and implementation of a metadata-rich file system. Tech. Rep. UCSC-SOE-10-07, University of California, Santa Cruz, 2010;

[1.4] Barbara, D., Dumouchel, W., Faloutsos, C, Haas, P., Hellerstein, J., Ioannidis, Y., Jagadish, H., Johnson, T., Ng, R., Poosala, V., et al. The New Jersey data reduction report. *IEEE Data Eng. Bull.* 20, 4 (1997), 3-45;

[1.5] Beagle, http://beagle-project.org;

[1.6] Bethel, J. Sample allocation in multivariate surveys. *Survey methodology* 15, 1 (1989), 47-57;

[1.7] Brandt, S., Maltzahn, C, Polyzotis, N., and Tan, W.-C. Fusing data management services with file systems. In *Proceedings of the 4th Annual Workshop on Petascale Data Storage (PDSW '09)* (New York, N.Y., USA, 2009), ACM, pp. 42-46;

[1.8] Callan, J., And Connell, M. Query-based sampling of text databases. *ACM Trans. Inf. Syst.* 19 (April 2001), 97-130;

[1.9] Causey, B. Computational aspects of optimal allocation in multi-variate stratified sampling. *SIAM Journal on Scientific and Statistical Computing* 4 (1983), 322;

[1.10] Chaudhuri, S., Das, G., And Narasayya, V. Optimized stratified sampling for approximate query processing. *ACM Transactions on Database Systems (TODS)* 32, 2 (2007), 9;

[1.11] Chaudhuri, S., Das, G., And Srivastava, U. Effective use of block-level sampling in statistics estimation. In *Proceedings of the 2004 ACM SIGMOD international conference on Management of data* (2004), ACM, p. 298;

[1.12] Chromy, J. Design optimization with multiple objectives. In *Proceedings on the Research Methods of the American Statistical Association* (1987), pp. 194-199;

[1.13] Cnet. Security guide to customs-proofing your laptop. http://news.cnet.com/8301-13578_3-9892897-38.html (2009);

[1.14] Cochran, W. Sampling technique. New York: John Willey & Sons (1977);

[1.15] Cochran, W. *Sampling Techniques*. John Wiley & Sons, New York, 1977;

[1.16] Das, G. Survey of approximate query processing techniques (tutorial). In *International Conference on Scientific and Statistical Database Management (SSDBM '03)* (2003);

[1.17] Dasgupta, A., Das, G., And Mannila, H. A random walk approach to sampling hidden databases. In *Proceedings of the 2007 ACM SIGMOD international conference on Management of data (SIGMOD '07)* (2007), pp. 629-640;

[1.18] Dasgupta, A., Jin, X., Jewell, B., Zhang, N., And Das, G. Unbiased estimation of size and other aggregates over hidden web databases. In *Proceedings of the 2010 international conference on Management of data (SIGMOD)* (2010), pp. 855-866;

[1.19] Dasgupta, A., Zhang, N., And Das, G. Leveraging count information in sampling hidden databases. In *Proceedings of the 2009 IEEE International Conference on Data Engineering* (2009), pp. 329-340;

[1.20] Dasgupta, A., Zhang, N., Das, G., And Chaudhuri, S. Privacy preservation of aggregates in hidden databases: why and how? In *Proceedings of the 35th SIGMOD international conference on Management of data* (2009), pp. 153-164;

[1.21] David, H. A., And Nagaraja, H. N. *Order Statistics (3rd Edition)*. Wiley, New Jersey, 2003;

[1.22] Ellard, D., Ledlie, J., Malkani, P., And Seltzer, M. Passive nfs tracing of email and research workloads. In *Proceedings of the 2nd USENIX Conference on File and Storage Technologies (FAST '03)* (Berkeley, Calif., USA, 2003), USENIX Association, pp. 203-216;

[1.23] Garofalakis, M. N., And Gibbon, P. B. Approximate query processing: Taming the terabytes. In *Proceedings of the 27th International Conference on Very Large Data Bases (VLDB)* (2001);

[1.24] Google. Google desktop. http://desktop.google.com/;

[1.25] Hedley, Y. L., Younas, M., James, A., And Sanderson, M. A two-phase sampling technique for information extraction from hidden web databases. In *Proceedings of the 6th annual ACM international workshop on Web information and data management (WIDM '04)* (2004), pp. 1-8;

[1.26] Hedley, Y.-L., Younas, M., James, A. E., And Sanderson, M. Sampling, information extraction and summarisation of hidden web databases. *Data and Knowledge Engineering* 59, 2 (2006), 213-230;

[1.27] Hua, Y, Jiang, H., Zhu, Y, Feng, D., And Tian, L. SmartStore: a new metadata organization paradigm with semantic-awareness for next-generation file systems. In *Proceedings of the Conference on High Performance Computing Networking, Storage and Analysis (SC)* (2009), ACM, pp. 1-12;

[1.28] Huang, H. Zhang, N., Wang, W., Das, G., And Szalay, A. Just-in-time analytics on large file systems. In *Proceedings of the 9th USENIX conference on File and storage technologies* (2011), USENIX Association;

[1.29] Huston, L., Sukthankar, R., Wickremesinghe, R., Satya-Narayanan, M., Ganger, G., Riedel, E., And Ailamaki, A. Diamond: A storage architecture for early discard in interactive search. In *Proceedings of the 2004 USENIX File and Storage Technologies FAST Conference* (2004);

[1.30] Ilyas, I. F., Beskales, G., And Soliman, M. A. A survey of top-k query processing techniques in relational database systems. *ACM Computing Surveys* 40, 4 (2008), 1-58;

[1.31] Ipeirotis, P. G., And Gravano, L. Distributed search over the hidden web: hierarchical database sampling and selection. In *Proceedings of the 28th international conference on Very Large Data Bases (VLDB '02)* (2002), pp. 394-405;

[1.32] Kogge, P., Bergman, K., Borkar, S., Campbell, D., Carlson, W., Dally, W., Denneau, M., Franzon, P., Harrod, W., Hill, K., Et Al. Exascale computing study: technology challenges in achieving exascale systems. *DARPA Information Processing Techniques Office* 28 (2008);

[1.33] Leung, A. Organizing, indexing, and searching large-scale file systems. Tech. Rep. UCSC-SSRC-09-09, University of California, Santa Cruz, December 2009;

[1.34] Leung, A., Adams, I., And Miller, E. Magellan: a searchable metadata architecture for large-scale file systems. Tech. Rep. UCSC-SSRC-09-07, University of California, Santa Cruz, November 2009;

[1.35] Leung, A. W., Shao, M., Bisson, T., Pasupathy, S., And Miller, E. L. Spyglass: fast, scalable metadata search for large-scale storage systems. In *Proceedings of the 7th conference on File and Storage Technologies (FAST)* (Berkeley, Calif., USA, 2009), USENIX Association, pp. 153-166;

[1.36] Lillibridge, M., Eshghi, K., Bhagwat, D., Deolalikar, V., Trezise, G., And Camble, P. Sparse indexing: large scale, inline deduplication using sampling and locality. In *Proceedings of the 7th conference on File and Storage Technologies (FAST)* (Berkeley, Calif., USA, 2009), USENIX Association, pp. 111-123;

[1.37] Liu, L., Xu, L., Wu, Y., Yang, G., And Ganger, G. Smartscan: Efficient metadata crawl for storage management metadata querying in large file systems. *Carnegie Mellon University Parallel Data Lab Technical Report CMU-PDL-10-112* (2010);

[1.38] Lohr, S. Sampling: design and analysis. *Pacific Grove* (1999);

[1.39] Murphy, N., Tonkelowitz, M., And Vernal, M. The design and implementation of the database file system. http://citeseerx.ist.psu.edu/viewdoc/summary-?doi=10.1.1.11.8068;

[1.40] Nunez, J. High end computing file system and IO R&D gaps roadmap. *HEC FSIO R&D Conference* (August 2008);

[1.41] Olken, F., And Rotem, D. Simple random sampling from relational databases. In *Proceedings of the 12th International Conference on Very Large Data Bases* (1986), pp. 160-169;

[1.42] Olken, F., And Rotem, D. Random sampling from database files: a survey. In *Proceedings of the fifth international conference on Statistical and scientific database management* (1990), Springer-Verlag New York, Inc., pp. 92-111;

[1.43] Olson, M. The design and implementation of the Inversion file system. In *Proceedings of the Winter 1993 USENIX Technical Conference* (1993), pp. 205-217;

[1.44] Pike, R., Presotto, D., Dorward, S., Flandrena, B., Thompson, K., Trickey, H., And Winterbottom, P. Plan 9 from bell labs. *Computing systems* 8, 3 (1995), 221-254;

[1.45] Plan 9 File System Traces, http://pdos.csail.mit.edu/p9trace/;

[1.46] Seltzer, M., And Murphy, N. Hierarchical file systems are dead. In *Proceedings of the 12th conference on Hot topics in Operating Systems* (*HotOS* '09) (2009), pp. 1-1;

[1.47] Slashdot. Laptops can be searched at the border. http://yro.slashdot.org/article.pl?sid=08/04/22/1733251 (2008);

[1.48] Snia. Nfs traces. http://iotta.snia.org/traces/list/NFS (2010);

[1.49] Stahlberg, P., Miklau, G., And Levine, B. N. Threats to privacy in the forensic analysis of database systems. In *Proceedings of the 2007 ACM SIGMOD international conference on Management of data* (*SIGMOD* '07) (New York, N.Y., USA, 2007), ACM, pp. 91-102;

[1.50] Szalay, A. New challenges in petascale scientific databases. In *Proceedings of the 20th international conference on Scientific and Statistical Database Management* (*SSDBM* '08) (Berlin, Heidelberg, 2008), Springer-Verlag, pp. 1-1;

[1.51] Vitter, J. Random sampling with a reservoir. *ACM Transactions on Mathematical Software* (*TOMS*) 11, 1 (1985), 57;

[1.52] Zhu, Y., Jiang, H., Wang, J., And Xian, F. HBA: Distributed Metadata Management for Large Cluster-Based Storage Systems. *IEEE Transactions on Parallel and Distributed Systems* 19 (2008), 750-763.

What is claimed is:

1. A system for performing an aggregate query of a large structured hidden database or collection of structured hidden databases having information containing a plurality of attributes, wherein the hidden databases impose form user interfaces and a limit on the number of queries that can be performed by one IP address, the system comprising:
a processor in communication with the structured hidden database or collection of databases, said processor configured to identify a query plan having multiple levels with each level of the query plan representing one of the plurality of attributes, map the query plan to queries of the structured hidden database or collection of structured hidden databases, query the structured hidden database or collection of structured hidden databases based on the query plan to obtain an aggregate estimation of at least one of the plurality of attributes, identify a search result of a number of top tuples in the structured hidden database or collection of structured hidden databases, and restrict the number of top tuples in the search result when the number of tuples in the search result exceed a maximum number, with only incomplete knowledge of all attribute domains for the plurality of attributes.

2. The system of claim 1, wherein said database or collection of databases comprises all databases accessible over a global or local network.

3. The system of claim 1, wherein said attribute comprises one of age, occupation, race, gender, disabilities, mobility, home ownership, employment status, location and income.

4. The system of claim 1, wherein the query plan has a tree-like structure.

5. The system of claim 1, wherein the plurality of attributes comprise a first attribute and a second attribute and the aggregate estimation is a first aggregate estimation of the first attribute, and wherein said processor is further configured to infer a second aggregate estimation of the second attribute based on the first aggregate estimation.

6. The system of claim 5, wherein said processor infers the second aggregate by associating the first attribute to a location, and correlates the location to the second attribute.

7. The system of claim 6, wherein said processor determines the location based on an IP address associated with the first attribute.

8. The system of claim 5, wherein the processor infers a degree of interest associated with a second attribute based on an estimated degree of interest associated with a first attribute and a correlation between the first attribute and the second attribute.

9. The system of claim 1, wherein the processor is configured to perform steps comprising:
(a) determining a number of overflowing queries and a number of valid queries at a next level immediately below a root level of the query plan;
(b) randomly selecting an overflowing query from the next level to be a current query;
(c) determining the number of overflowing queries and valid queries in a level immediately below the next level of the query plan that satisfy the conditions of the current query;
(d) randomly selecting one of the overflowing queries in the level immediately below the next level of the query plan that satisfy the conditions of the current query to be the current query;
(e) repeating steps (c) and (d) until there are no overflowing queries in the level immediately below the next level of the query plan that satisfy the conditions of the current query; and
(f) estimating a number of total tuples in the database or collection of databases based on the determinations at steps (a) and (c).

10. The system of claim 9, wherein the processor includes a sampler module, and steps (a) and (c) are performed by the sampler module.

11. The system of claim 9, wherein the processor includes a calculator module, and step (f) is performed by the calculator.

12. The system of claim 9, wherein the step of randomly selecting is unbiased.

13. The system of claim 1, wherein the wherein the number of tuples are restricted by a top-k constraint.

14. The system of claim 1, wherein the restricting is based on a ranking function.

15. A system for performing an aggregate query of a hidden structured database or collection of hidden structured databases having a plurality of structured tuples stored therein, wherein the hidden databases impose form user interfaces and a limit on the number of queries that can be performed by one IP address, the system comprising a processor in communication with the hidden structured database or collection of hidden structured databases, the processor configured to represent the contents of the hidden structured database or collection of hidden structured databases as a tree having nodes, levels and branches, in which each node represents a query of the hidden structured database or collection of hidden structured databases, each level represents an attribute corresponding to the plurality of structured tuples, and each branch represents a value corresponding to one of the attributes, and estimate a count of all structured tuples in the hidden structured database or collection of hidden structured databases using a drill-down process, with only incomplete knowledge of all attribute domains for the attributes.

16. A non-transitory computer-readable medium having instructions for performing a query of a hidden structured database or collection of hidden structured databases having a plurality of structured tuples stored therein and defined by a plurality of attributes each having a domain of values corresponding thereto, wherein the hidden databases impose form interfaces and a limit on the number of queries that can be performed by one IP address, and wherein for each attribute, each tuple has a value corresponding to the attribute, and wherein the instructions are capable of being executed by a processor that is in communication with the hidden structured database or collection of hidden structured databases to perform the steps of:

(a) selecting a current attribute from among the plurality of attributes;

(b) selecting a current value from within the domain of the current attribute;

(c) querying the hidden structured database or collection of hidden structured databases for a set of top tuples that satisfy all previously performed overflowing queries and have the current value corresponding to the current attribute;

(d) if the set of top tuples satisfying the query of step (c) is empty,
  (i) designating the query of step (c) as an underflowing query; and
  (ii) replacing the current value with a next value, wherein the next value is in the domain of the current attribute, and wherein the next value is different from the current value and different from the current value of any previous step;

(e) if the set of top tuples satisfying the query of step (c) includes more tuples than a maximum limit:
  (i) designating the query of step (c) as an overflowing query;
  (ii) replacing the current attribute with a next attribute, wherein the next attribute is different from the current attribute and different from the current attribute of any previous step; and
  (iii) replacing the current value with a next value, wherein the next value is in the domain of the current attribute;

(f) repeating steps (c) through (e) until the set of top tuples satisfying the query of step (c) includes a positive number of top tuples that is not more than the maximum limit; and (g) estimating a size of the hidden structured database or collection of hidden structured databases based on the number of step (f) and a probability of performing the specific query from the most recent iteration of step (c), wherein steps (a)-(e) are performed with only incomplete knowledge of all attribute domains for the plurality of attributes.

17. The non-transitory computer-readable medium of claim 16, wherein the current attribute of step (a) and the next attribute of step (e) are randomly selected.

18. The non-transitory computer-readable medium of claim 16, wherein the current value of step (b) and the next values of steps (d) and (e) are randomly selected.

19. The non-transitory computer-readable medium of claim 16, wherein step (a) includes assigning an order to the values in the domain of the current attribute, wherein step (e) includes assigning an order to the values in the domain of the next attribute, and wherein step (d) includes selecting the next value based on the order of the values in the domain of the current attribute.

20. The non-transitory computer-readable medium of claim 16, wherein the medium includes instructions for performing a weight adjustment technique to reduce the variance of the estimation.

21. The non-transitory computer-readable medium of claim 16, wherein the medium includes instructions for performing a divide-and-conquer technique to reduce the variance of the estimation.

22. The non-transitory computer-readable medium of claim 16, wherein the medium includes instructions for estimating a sum of values for tuples within the hidden database or collection of hidden databases, the values corresponding to a selected attribute.

23. The non-transitory computer-readable medium of claim 16, wherein the medium includes instructions for estimating an average of values for tuples within the hidden database or collection of hidden databases, the values corresponding to a selected attribute.

* * * * *